US012652487B2

(12) United States Patent
Corynen et al.

(10) Patent No.: US 12,652,487 B2
(45) Date of Patent: Jun. 9, 2026

(54) LOUDSPEAKER

(71) Applicant: PSS BELGIUM NV, Dendermonde (BE)

(72) Inventors: David Corynen, Dendermonde (BE); Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 145 days.

(21) Appl. No.: 18/687,329

(22) PCT Filed: Aug. 10, 2022

(86) PCT No.: PCT/EP2022/072485
§ 371 (c)(1),
(2) Date: Feb. 28, 2024

(87) PCT Pub. No.: WO2023/030847
PCT Pub. Date: Mar. 9, 2023

(65) Prior Publication Data

US 2024/0357280 A1 Oct. 24, 2024

(30) Foreign Application Priority Data

Sep. 1, 2021 (GB) ..................................... 2112473

(51) Int. Cl.
*H04R 1/28* (2006.01)
*H04R 1/02* (2006.01)
*H04R 7/18* (2006.01)

(52) U.S. Cl.
CPC ........... *H04R 1/2803* (2013.01); *H04R 1/028* (2013.01); *H04R 7/18* (2013.01); *H04R 2400/11* (2013.01); *H04R 2499/13* (2013.01)

(58) Field of Classification Search
CPC .......... H04R 7/16; H04R 1/025; H04R 13/00; H04R 2400/11; H04R 7/18; H04R 9/022;
(Continued)

(56) References Cited

U.S. PATENT DOCUMENTS 4,054,748 A 10/1977 Balogh
4,161,995 A * 7/1979 Pohlmann ........... B60R 11/0217 181/149
(Continued)

FOREIGN PATENT DOCUMENTS

EP 3018915 B1 6/2018
GB 512610 A 9/1939
(Continued)

OTHER PUBLICATIONS

Saati, "Product News—Acoustex HD", [online] Retrieved from the Internet on Jan. 26, 2024, <URL: http://www.saati.com/sites/default/files/elemento-download/ACOUSTEX%20HD_4.pdf>, dated Jun. 20, 2019, 2 pages.
(Continued)

*Primary Examiner* — Carolyn R Edwards
*Assistant Examiner* — Julie X Dang
(74) *Attorney, Agent, or Firm* — NK Patent Law

(57) ABSTRACT

A loudspeaker including: a diaphragm having a first radiating surface and a second radiating surface, wherein the first radiating surface and the second radiating surface are located on opposite faces of the diaphragm; a drive unit configured to move the diaphragm based on an electrical signal; a loudspeaker support structure, wherein the diaphragm is suspended from the loudspeaker support structure via one or more loudspeaker suspension elements. The loudspeaker support structure comprises a self-supporting porous shell which encloses a volume configured to receive sound produced by the second radiating surface, wherein at least part of the self-supporting porous shell is provided by at least one self-supporting portion of porous material having a specific airflow resistance in the range 500-10000 Pa·s/m so as to allow sound produced by the second radiating surface to exit the volume enclosed by the shell.

13 Claims, 34 Drawing Sheets

(58) Field of Classification Search
CPC .... H04R 2499/13; H04R 9/043; H04R 1/028; H04R 1/2803
See application file for complete search history.

(56) References Cited

U.S. PATENT DOCUMENTS

| | | | | | |
|---|---|---|---|---|---|
| 5,658,656 | A * | 8/1997 | Whitney | H04R 1/023 | 428/307.3 |
| 6,681,024 | B2 * | 1/2004 | Klein | H04R 5/02 | 381/301 |
| 10,123,111 | B2 | 11/2018 | Gunness | | |
| 2002/0067842 | A1 | 6/2002 | Takahashi | | |
| 2005/0141745 | A1 * | 6/2005 | Yamada | D21J 7/00 | 381/423 |
| 2014/0064542 | A1 * | 3/2014 | Bright | H04R 1/086 | 381/359 |
| 2015/0289058 | A1 * | 10/2015 | Christoph | H04S 7/301 | 381/103 |
| 2016/0088386 | A1 * | 3/2016 | Crosswell | H04R 1/025 | 381/349 |
| 2016/0295331 | A1 * | 10/2016 | Fehervari | H04R 7/125 | |
| 2018/0115830 | A1 * | 4/2018 | Salvatti | H04R 9/04 | |
| 2023/0117408 | A1 * | 4/2023 | Vuine | H04R 1/025 | 381/398 |

FOREIGN PATENT DOCUMENTS

| | | | |
|---|---|---|---|
| JP | H0370395 | A | 3/1991 |
| JP | 2016165095 | A | 9/2016 |
| WO | 2019121266 | A1 | 6/2019 |
| WO | 2019192808 | A1 | 10/2019 |
| WO | 2019192816 | A1 | 10/2019 |
| WO | 2020126847 | A1 | 6/2020 |
| WO | 2020234316 | A1 | 11/2020 |
| WO | 2020234317 | A1 | 11/2020 |
| WO | 2020239766 | A1 | 12/2020 |
| WO | 2021185777 | A1 | 9/2021 |

OTHER PUBLICATIONS

Anonymous, Eco Speaker S002, XP055983142, [online] Retrieved from the Internet on Jan. 26, 2024, <URL: https://web.archive.org/web/20190413171924/https://yatama.com.au/product/s002/>, undated, 1 page.

Dumbliauskas, Saulius, Elegante Press: "All You Need to Know About Cardstock Paper Weight and Thickness", [online] Retrieved from the Internet on Jan. 30, 2024: <URL:https://www.elegantepress.com/blog/all-you-need-to-know-about-card-stock-paper-weight-and-thickness/>, published Jan. 28, 2018, 4 pages.

ISA/EP; International Search Report and Written Opinion for corresponding International Patent Application No. PCT/EP2022/072485, mailed Jan. 23, 2023, 22 pages.

* cited by examiner

LOUDSPEAKER

CROSS-REFERENCE TO RELATED APPLICATIONS

This application is a U.S. National Phase Application of International Patent Application No. PCT/EP2022/072485 entitled "LOUDSPEAKER", filed 10 Aug. 2022, which claims priority to GB2112473.0, filed 1 Sep. 2021.

FIELD OF THE INVENTION

The present invention relates to loudspeakers.

BACKGROUND

There is an ongoing trend in the automotive industry to integrate loudspeaker in car-seats to create local sound zones for each passenger. This allows for personalized messages and individual music choice for each individual passenger. For increased speech intelligibility and quality of music reproduction it is desirable to have high acoustic contrast between the seats. In this way, the sound produced at one seat does not disturb the listening experience of the listener in other seats. Bringing the speakers as close to the listener's ears as possible is one way to increase acoustic contrast.

There is, however, a natural limit to how close the loudspeakers can be mounted to the listener's ears. For example, integrating loudspeakers 1*a*, 1*b* in forward-protruding wings of a car headrest, i.e. so the loudspeakers are alongside the head of a user as shown in FIG. 1*a*, can lead to decreased freedom of motion, decreased field of view and listening fatigue. These negative effects of proximity of a closed structure partially surrounding the head is known as "jail effect" and are preferably avoided for the comfort of the passenger.

If the loudspeakers 1*a*, 1*b* are mounted in a headrest further away from a user's ears as shown in FIG. 1*b*, the acoustic contrast is decreased.

The loudspeakers 1*a*, 1*b* of FIGS. 1*a*, 1*b* have a traditional loudspeaker design, in which a magnet unit (loudspeaker driver) is mounted in a closed box which separates sound produced by a first (forward-facing) radiating surface from interfering with sound produced by a second (backward-facing) radiating surface. This gives the loudspeaker monopole characteristic leading to the sound being radiated omnidirectionally (i.e. with similar amplitude in all directions) when the diameter of the diaphragm is small compared to the wavelength of sound being produced, as is approximately true for this sort of application (where the diameter of the diaphragm is typically in the range of 20-80 mm; and the wavelength is the classic telephone speech band of 300 Hz-3 kHz).

Mounting the loudspeaker in a closed box causes the cavity to act as an additional spring which increases the loudspeaker resonance frequency of the loudspeaker since the diaphragm can't move so easily. At substantially below resonance frequency, mounting the loudspeaker in a closed box causes the radiated SPL (sound pressure level) to be lower for a constant voltage input. At the resonance frequency, mounting the loudspeaker in a closed box causes the SPL to increase. In other words, the transfer function (=SPL as a function of frequency at constant voltage) decreases at substantially below the resonance frequency, and increases at the resonance frequency.

To increases the ratio of radiated on-axis vs total radiated power, it is a well-known technique to use a loudspeaker 1 without cabinet as shown in FIG. 2*a*. This causes two distinct lobes to front and back leading to a figure of eight radiation pattern with decreased radiation ("necking") at the sides. As the acoustic path length between first (forward-facing) and second (backward-facing) radiating surfaces is very short, the overall efficiency is low due to the acoustic short circuit (a flow from positive to negative pressure at each point in time leading to cancelation and decreased electro-acoustical conversion efficiency; or more colloquially, anti-sound from the back reaching and cancelling the sound at the front). A remedy to the low output efficiency is to increase of the path length between front and back of the diaphragm, e.g. by extending the cabinet shown in FIG. 2*a* in a rearward direction (not shown). However, this requires a large mechanical structure and does not solve the issue with the strong rear lobe effectively being as loud as the front lobe.

Loudspeakers whose diaphragms are large compared to the wavelength of sound they produce are directional. For Studio and Pro-Audio applications where the aim is to produce sound in the far-field (>1 meter), this is easy to achieve in the classic telephone speech band of 300 Hz-3 kHz, but difficult at low frequencies.

For pro-audio and studio applications and listening in the far-field of the loudspeaker it is known, at low frequencies, that a defined leakage of an otherwise closed but large cabinet can decrease the rear radiation lobe and lead to a cardioid radiation characteristic focusing the radiated sound power towards the listener. An example of this arrangement is shown in FIG. 2*b*. Here, a loudspeaker 1 driver is mounted with the back radiating into a cavity which is then ventilated via a flow resisting element 35. The combination of volume and flow resistance leads to an additional phase shift on top of the physical path length between front and rear of the diaphragm. Choosing the location of the flow resistive opening and the cabinet dimensions for such an arrangement is typically optimized for about one octave at bass frequencies, e.g. between 60 Hz and 120 Hz. At higher frequencies, the path length between sound produced by the first (forward-facing) and second (backward-facing) radiating surfaces becomes large compared to the wavelength and the radiation characteristic of the loudspeaker arrangement shown in FIG. 2*b* approaches that of a monopole.

For an arrangement of the type shown in FIG. 2*b*, the cabinet orifice area equipped with the flow resisting element 35 is typically sized similar to the radiating surface area of the loudspeaker driver. The materials typically used are thick sheets of foam, felt or the like. The present inventors have observer that high volume displacement through the flow resistance element can lead to unwanted blowing noise created by vortices at the pores or fibers of the flow resistance. As loudspeakers are typically listened to in the far-field and the flow resistance is often mounted at the back this is not a major concern for pro-audio and studio applications.

Loudspeakers for far-field listening application are typically equipped with a strong motor system for high mid-band sensitivity. This goes hand in hand with high electrical damping at the resonance frequency decreasing the output. Qes (electrical Q factor) values for such loudspeakers are typically in the range of 0.3 to 0.6.

The present inventors have observed another, typically undesired, property of the arrangement shown in FIG. 2*b* is the decrease in Qms (mechanical Q factor) of the built-in loudspeaker vs the loudspeaker drive unit alone. The friction at the flow resistance influences the back-radiation impedance of the loudspeaker, increases the mechanical losses and so decreases the output around the loudspeaker resonance frequency. While the Qms for the unboxed speaker may be >10 when built into a box with flow resistance Qms may drop to values below 1.

U.S. Pat. No. 4,054,748B discloses a directional loudspeaker incorporating phase shifting members.

US2002/0067842A1 discloses a speaker apparatus in which damping material is attached to an opening section (see claim 4, FIG. 7B).

EP3018915B1 discloses a directional loudspeaker for use in the mid-frequency range of the audio spectrum.

U.S. Ser. No. 10/123,111 B2 discloses a passive cardioid acoustical system.

PCT/EP2021/056561, extracts from which are enclosed as an Annex, disclosed a loudspeaker including:

- a diaphragm having a first radiating surface and a second radiating surface, wherein the first radiating surface and the second radiating surface are located on opposite faces of the diaphragm;
- a drive unit configured to move the diaphragm based on an electrical signal;
- a loudspeaker support structure, wherein the diaphragm is suspended from the loudspeaker support structure via one or more loudspeaker suspension elements;
- wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material.

A loudspeaker having such properties has been found by the inventors of PCT/EP2021/056561 to be capable of delivering sound in a mid-high frequency range (e.g. 300 Hz-3 kHz) that is highly directional, whilst suppressing blowing noises that might otherwise be distracting for a user whose ear(s) are located at a listening position that is near to the loudspeaker, e.g. as might be the case when the loudspeaker is mounted in a headrest.

However, the present inventors found that making loudspeakers according to the teaching of PCT/EP2021/056561 was a challenge, because PCT/EP2021/056561 envisages regions of porous material having the form of a material having a specific airflow resistance covering one or more openings in a rigid structure.

The present inventors have made loudspeakers according to the teaching of PCT/EP2021/056561 in which a cloth having a specific airflow resistance was used to cover one or more openings in a plastic frame. However, the present inventors found that assembling such a loudspeaker on an industrial scale is labor intensive or requires expensive assembly equipment, because many joints (between the cloth and the frame) must be made and the whole assembly must be airtight (in the sense of wanting controlled airflow defined by the choice of airflow resistance) to avoid blowing noises. If glue is used to provide the joints, there is a risk that a slight fracture or bad glue connection at one of the joints holding the cloth in place, then a buzzing noise can generated during sound reproduction, owing to the porous material and frame acting like a drum. If the cloth was instead overmolded with the plastic frame to avoid the issues with glue, then it was still challenging to place the cloth in a machine tool since the cloth did not allow for 3D shaping (it only allowed for 2D shaping). The present invention has been devised in light of the above considerations.

SUMMARY OF THE INVENTION

In a first aspect, the present invention provides:

A loudspeaker including:

- a diaphragm having a first radiating surface and a second radiating surface, wherein the first radiating surface and the second radiating surface are located on opposite faces of the diaphragm;
- a drive unit configured to move the diaphragm based on an electrical signal;
- a loudspeaker support structure, wherein the diaphragm is suspended from the loudspeaker support structure via one or more loudspeaker suspension elements;
- wherein the loudspeaker support structure comprises a self-supporting porous shell which encloses a volume configured to receive sound produced by the second radiating surface, wherein at least part of the self-supporting porous shell is provided by at least one self-supporting portion of porous material having a specific airflow resistance in the range 500-10000 Pa·s/m so as to allow sound produced by the second radiating surface to exit the volume enclosed by the shell.

A loudspeaker having a shell configured in this way has been found by the present inventors to be capable of delivering sound in a mid-high frequency range (e.g. 300 Hz-3 kHz) that is highly directional, whilst suppressing blowing noises that might otherwise be distracting for a user whose ear(s) are located at a listening position that is near to the loudspeaker, e.g. as might be the case when the loudspeaker is mounted in a headrest. An understanding of why incorporating at least one portion of porous material into a shell (enclosing a volume configured to receive sound produced by the second radiating surface) enables a loudspeaker according to the present invention to achieve these effects can be understood from extracts from PCT/EP2021/056561, enclosed as an Annex.

In the context of this invention, a shell can be understood as porous if it includes at least one portion of porous material which allows sound produced by the second radiating surface to exit the volume enclosed by the shell by passing through the porous material.

In the context of this invention, a shell can be understood as being "self-supporting" if the shell is configured to retain its shape without being supported by some additional supporting structure, e.g. an additional plastic frame.

In the context of this invention, a portion of porous material may be understood as being "self-supporting" if the portion of porous material is configured to retain its shape without being supported by some additional (e.g. non-porous) supporting structure, e.g. a plastic frame. Here we note for completeness that PCT/EP2021/056561 (extracts from which are enclosed as an Annex) did not disclose a shell that incorporated a portion of porous material that was "self-supporting" in this way, since the regions of porous material envisioned by PCT/EP2021/056561 had the form of a porous material having a specific airflow resistance (e.g. a cloth) that covered one or more openings in a rigid structure (e.g. a plastic frame), but which was not disclosed as being able to retain its shape, without being supported by the rigid structure.

By having a self-supporting porous shell which encloses a volume configured to receive sound produced by the second radiating surface, with at least part of the porous shell being provided by at least one self-supporting portion of porous material, the manufacture of a loudspeaker is hugely simplified compared to with a plastic frame/cloth implementation of the teaching of PCT/EP2021/056561 (see background section, above), since it is no longer necessary to form many joints between a plastic frame and a cloth having a specific airflow resistance. By avoiding the need for these joints, it is easier to achieve airtightness, and it is easier to avoid a "buzzing" noise.

In the context of the invention, "airtightness" may be understood to mean that airflow from the volume enclosed by the self-supporting porous shell to outside the loudspeaker when the loudspeaker is in use should be substantially through the porous material of the shell. In other words, undefined air leakage (outside the shell) should be avoided, since these generally make audible fizzing noises and add colouration to the sound.

Also, the at least one self-supporting portion of porous material may be formed of a material (e.g. paper) which is cheaper and more environmentally friendly than a typical high-end cloth which may be used in a plastic frame/cloth implementation of the teaching of PCT/EP2021/056561 (see background section, above).

Here we note that there are a variety of materials having a specific airflow resistance which cover the full range of 500-10000 Pa·s/m, which can be formed as a self-supporting portion of porous material. Towards the lower end of this range (e.g. ~500-3000 Pa·s/m) a felted fabric may be used to form a self-supporting portion of porous material. Towards the upper end of this range (e.g. ~1500-10000 Pa·s/m) paper may be used to form self-supporting portion of porous material (the present inventors believe that paper does probably need a specific airflow resistance of ~1500 Pa·s/m or more to be self-supporting).

The loudspeaker may be configured for use with an ear of a user located at a listening position that is near to the loudspeaker. For example, the loudspeaker may be configured for use with an ear of a user located at a listening position that is 50 cm or less (more preferably 40 cm or less, more preferably 30 cm or less, more preferably 25 cm or less, more preferably 20 cm or less, more preferably 15 cm or less) from the first radiating surface of the diaphragm.

The loudspeaker may be configured to be mounted in a seat assembly, e.g. by being mounted in a headrest included in a seat assembly (e.g. as discussed in connection with the second aspect of the invention, below). The seat assembly may be configured for use in a vehicle. Mounting the loudspeaker in a seat assembly is one way in which the loudspeaker could be configured for user with an ear of a user located at a listening position that is near to the loudspeaker, e.g. as described above.

Specific airflow resistance reflects the air resistance per surface area of a material, and is dependent on a number of factors such as thickness and the choice of material (two pieces of material having different thicknesses may have the same specific airflow resistance). The specific airflow resistance of the region of porous material may be measured in accordance with ISO 9053.

ISO 9053 sets out standard methods (Method A or Method B) for conducting airflow measurements to measure Airflow Resistance—R [Pa·s/m$^3$], Specific Airflow Resistance—Rs [Pa·s/m], and Airflow Resistivity—r [Pa·s/m$^2$] for a material sample having a given surface area (S) and thickness (t). Such measurements are discussed in more detail in WO2020/234317 (under the heading "Airflow resistance measurements").

The volume enclosed by the self-supporting porous shell is preferably at least 5 cm$^3$, more preferably at least 8 cm$^3$, more preferably at least 10 cm$^3$, and in some examples could be 20 cm$^3$ or more. This is significantly more than the volume typically enclosed by a headphone loudspeaker, for example.

The volume enclosed by the self-supporting porous shell is preferably 5 litres (5000 cm$^3$) or less, more preferably 1 litre (1000 cm$^3$) or less, more preferably 500 cm$^3$ or less, more preferably 100 cm$^3$ or less. In some cases, the volume enclosed by the self-supporting porous shell may be 50 cm$^3$ or less. This is significantly less than the volume typically enclosed by the loudspeakers typically used in pro-audio applications, such as that shown in FIG. 2*b*, for example, but may be useful for incorporation of the loudspeaker into a headrest (see below).

The effective radiating area of the diaphragm $S_D$ may be in the range 5 cm$^2$-50 cm$^2$.

As is known in the art, for a diaphragm having a circular perimeter which is suspended from a loudspeaker support structure by a roll suspension having an outer diameter $d_o$ and an inner diameter $d_i$, the effective radiating area of the diaphragm may be estimated as $$S_D = \pi\left(\frac{d}{2}\right)^2,$$

where d is the half-diameter of the roll suspension $(d_o+d_i)/2$.

Alternatively, or for more complex diaphragm geometries, the effective radiating area of the diaphragm $S_D$ could be measured using known techniques, see e.g. "Dynamical Measurement of the Effective Radiating area SD", Klippel GmbH (https://www.klippel.de/fileadmin/klippel/Files/Know_How/Application_Notes/AN_32_Effective_Radiation_Area.pdf).

Preferably, the surface area of the outwardly facing surface(s) of the at least one self-supporting portion of porous material is at least 80% of the effective radiating area of the diaphragm $S_D$, more preferably at least 100% of the effective radiating area of the diaphragm $S_D$, more preferably at least 200% of the effective radiating area of the diaphragm $S_D$. In some cases, the surface area of the outwardly facing surface (s) of the at least one self-supporting portion of porous material could be 500% or more of the effective radiating area of the diaphragm $S_D$. Having a larger surface area helps to reduce blowing noises.

From the above considerations, it can be seen that for a loudspeaker suitable for mounting in a headrest, the surface area of the outwardly facing surface(s) of the at least one self-supporting portion of porous material may be in the range 10 cm$^2$ to 250 cm$^2$, and in some cases may be in the range 10 cm$^2$ to 100 cm$^2$.

The loudspeaker is preferably a mid-high frequency loudspeaker configured to produce sound across a designated frequency band. The designated frequency band may include at least 500 Hz-2 kHz, more preferably 300 Hz-3 kHz, in some cases the designated frequency band may include 300 Hz-20 kHz, or even 150 Hz to 20 kHz.

The drive unit may be an electromagnetic drive unit that includes a magnet unit configured to produce a magnetic field in an air gap, and a voice coil attached to the diaphragm (typically via an intermediary coupling element, such as a voice coil former). In use, the voice coil may be energized (have a current passed through it based on the electrical signal) to produce a magnetic field which interacts with the magnetic field produced by the magnet unit and which causes the voice coil (and therefore the diaphragm) to move relative to the magnet unit along a principal axis of the loudspeaker. The magnet unit may include a permanent magnet. The voice coil may be configured to sit in the air gap when the diaphragm is at rest. Such drive units are well known.

The resonance frequency of the loudspeaker may be in the range 150 Hz to 500 Hz. Such resonance frequencies are desirable for a mid-high frequency loudspeaker as defined above.

The magnet unit may have a magnetic flux density in the air gap in the range 0.1 T to 0.5 T. This is weaker than would be required for far-field applications, but as can be seen from the discussions below, can provide a loudspeaker having a smooth frequency response at small listening distances.

Preferably, the loudspeaker has a Qes (electrical Q factor) that is 5 or more, more preferably more than 10. This defines a "weak" motor which, as can be seen from the experimental data below, can be beneficial for a loudspeaker used in close proximity to the ear of a user.

Preferably, the loudspeaker has a Qms (mechanical Q factor) that is 2 or less. This defines the damping provided by the at least one self-supporting portion of porous material (plus contributions from other damping elements) which, as can be seen from the experimental data below, can be beneficial for a loudspeaker used in close proximity to the ear of a user.

Qes and Qms are well-defined parameters for characterizing a loudspeaker that are well-known in the art, and defined for example in the well-known papers by Thiele ("Loudspeakers in Vented Boxes, Parts I and II") and Small, R. H. ("Direct-Radiator Loudspeaker System Analysis").

Another known parameter is Qts (total Q factor) which is calculated as:

$$Qts=(Qms\times Qes)/(Qms+Qes)$$

The directivity of a loudspeaker can be defined via the following parameters, as defined in Acoustics, Beranek, L. L, McGraw-Hill, 1954:

- Directivity factor Q(f): This is the ratio of the intensity on a designated axis of a sound radiator at a stated distance r to the intensity that would be produced at the same position by point source if it were radiating the same total acoustic power as the radiator.
- Directivity index DI(f: This is expressed in dB as a value of the expression DI=10 log(Q).

Preferably a loudspeaker according to the first aspect of the invention has a directivity index within a designated frequency band (e.g. as defined above, e.g. 300 Hz-3 kHz) that is 3 dB or more, more preferably 3.5 dB or more, more preferably 4 dB or more. In some cases, the directivity index within a designated frequency band (e.g. as defined above, e.g. 300 Hz-3 kHz) may be 4.8 dB or more. The directivity index may be measured at a listening distance (distance to source) of 1 meter.

A perfect theoretical cardioid has a directivity index of 4.8 dB so a directivity index of 3 dB or more, or 4 dB or more, is a significantly directional loudspeaker. Here, we note for completeness that a loudspeaker can be more directional than a perfect theoretical cardioid and thus have a directivity index of substantially more than 4.8 dB, e.g. as shown in the experimental data of FIGS. 16 and 17 discussed below—such loudspeakers may be referred to as having "hyper cardioid" directivity. A loudspeaker would typically have a directivity index above 4.8 dB when the diaphragm becomes large compared with the wavelength.

A loudspeaker with a directivity index of around 4.8 dB (corresponding to a perfect theoretical cardioid) within a designated frequency band (e.g. as defined above, e.g. 300 Hz-3 kHz) may be preferred in some cases.

For avoidance of any doubt, the loudspeaker could have a glitch that causes the directivity index to drop below 4 dB at some single frequency within the designated frequency band (e.g. where a circumference of the loudspeaker support structure is in the range of the wavelength) whilst still being above 4 dB for substantially the entire designated frequency band. To avoid such glitches, the directivity index of the loudspeaker could be measured at the "standard" centre frequencies within the designated frequency band for ⅓$^{rd}$ octave bands as shown in FIG. 17 below, preferably in accordance with ISO 266 (which would mean measuring the directivity index at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the directivity index of the loudspeaker could be measured across the full designated frequency band with a ⅓rd octave smoothing as shown in FIG. 16 below.

Nonetheless, it is preferable for the loudspeaker to have a directivity index within a designated frequency band (e.g. as defined above, e.g. 300 Hz-3 kHz) that is above 4 dB for the entire designated frequency band (with no glitches).

Preferably, a loudspeaker according to the first aspect of the invention has, within a designated frequency band (e.g. as defined above, e.g. 300 Hz-3 kHz), an SPL (sound pressure level) measured on a principal radiating axis that is at least 6 dB higher than the SPL measured at the same listening distance (distance to source) at 180° to the principal radiating axis, for substantially the entire designated frequency band. In other words, a rearwards facing lobe (SPL positioned 180°) should be at least −6 dB relative to a forwards facing lobe over the designated frequency band. For these measurements, the SPL may be measured at a listening distance of 1 meter.

For avoidance of any doubt, the loudspeaker could have a glitch that causes the SPL difference (on principal axis vs 180° to the principal radiating axis) to drop below 6 dB at some single frequency within the designated frequency band whilst still being at least 6 dB for substantially the entire designated frequency band. To avoid such glitches, the SPL values of the loudspeaker could be measured at the "standard" centre frequencies within the designated frequency band for ⅓$^{rd}$ octave bands, preferably in accordance with ISO 266 (which would mean measuring the SPL values at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the SPL values could be measured across the full designated frequency band with a ⅓$^{rd}$ octave smoothing.

Nonetheless, it is preferable for the loudspeaker to have, within a designated frequency band (e.g. as defined above, e.g. 300 Hz-3 kHz), an SPL measured on a principal radiating axis that is at least 6 dB higher than the SPL measured at the same listening distance at 180° to the principal radiating axis, for the entire designated frequency band. (with no glitches).

Preferably, the loudspeaker has a directivity index within a designated frequency band (e.g. as defined above, e.g. 300 Hz-3 kHz) that is 4 dB or more for substantially the entire designated frequency band AND has within that designated frequency band, an SPL measured on a principal radiating axis that is at least 6 dB higher than the SPL measured at the same listening distance at 180° to the principal radiating axis, for substantially the entire designated frequency band.

In some examples, the/each self-supporting portion of porous material may have a specific airflow resistance in the range 1500-5000 Pa·s/m, since a lower specific airflow resistance may allow for a high directivity with fewer corrugations or even no corrugations. However, different specific airflow resistances may be appropriate in different circumstances, so there is no single preferred range of specific airflow resistance values (see e.g. discussion under the heading "Design considerations", below). The choice of porous material (and its specific airflow resistance) will depend on design requirements regarding e.g. size and performance of the loudspeaker. Design considerations that may be taken into account when making a loudspeaker according to the present disclosure are discussed in detail below.

Preferably, the self-supporting porous shell is formed entirely of the at least one self-supporting portion of porous material, i.e. with no non-porous elements being included in the self-supporting porous shell. This helps to lower the total acoustic resistance (Ra).

Here we note that it is possible for the self-supporting porous shell to be formed of more than one self-supporting portions of porous material. For simplicity, the multiple portions of porous material may be formed of the same porous material, but it is possible for different porous materials to be used for the different portions of porous material, with each self-supporting portion of porous material having a specific airflow resistance in the required range (e.g. 500-10000 Pa·s/m).

However, in some examples, the self-supporting porous shell may include one or more portions of non-porous material, or portions of porous material having a specific airflow resistance outside the required range (e.g. 500-10000 Pa·s/m), though this is not necessarily preferred as it increases the total acoustic resistance (Ra) of the shell.

Preferably, the self-supporting porous shell is formed entirely of a single self-supporting portion of porous material, i.e. with no other elements being included in the self-supporting porous shell. This helps to simplify manufacture, and also helps to simplify the attainment of airtightness, as well as to lower the total acoustic resistance (Ra).

The ability of a portion of porous material to be self-supporting will depend partly on the choice of material(s) used (material strength), and the shape of the shell (geometrical strength). A skilled person would appreciate that the specific material and shape used will vary according to design requirements regarding e.g. size and performance of the loudspeaker. Design considerations that may be taken into account when making a loudspeaker according to the present disclosure are discussed in detail below.

Preferably, the/each self-supporting portion of porous material is formed from a non-woven material, such as paper or a felted fabric. The non-woven material may have a density of below 1 g/cm$^3$.

If the/each self-supporting portion of porous material is formed from paper, then the paper may have a density in the range 0.5 g/cm$^3$-1 g/cm$^3$ and/or a thickness in the range 0.3 mm-2 mm.

If the/each self-supporting portion of porous material is formed from a felted fabric, then the felted fabric may have a density in the range 0.3 g/cm$^3$-0.8 g/cm$^3$ and/or a thickness in the range 1 mm-10 mm.

A felted fabric may, for example, be wool felt or needle felt. The needle felt may comprise synthetic fibres.

In some examples, the/each self-supporting portion of porous material may be formed from a woven fabric, e.g. baked (optionally with resins or other additives to increase strength) in a tooling to be shaped.

In some examples, the/each self-supporting portion of porous material may be formed from a compressed foam.

In some examples, the/each self-supporting portion of porous material may be formed from thermoplastic fibres, e.g. a melt blown thermoplastic.

Preferably, the/each self-supporting portion of porous material is formed from paper. Paper (as the choice for the/each self-supporting porous portion) is preferred, since it is cheap, environmentally friendly, and can easily be formed in a desired 3D shape whilst still being self-supporting.

More preferably, the self-supporting porous shell is formed of a single portion of paper. This is a particularly easy and inexpensive way to provide the self-supporting porous shell, albeit that paper may need to have a specific airflow resistance in the range 1500-10000 Pa·s/m in order to be self-supporting.

The drive unit may be configured to move the diaphragm along a principal axis of the loudspeaker (based on the electrical signal).

Preferably, the at least one self-supporting portion of porous material includes a portion of porous material which curves around the principal axis, and preferably surrounds the principal axis (e.g. a cone, hemisphere or closed cylinder as shown in FIG. 27). Such shapes would help to provide geometrical stiffness to the self-supporting porous portion and therefore the shell, e.g. so as to inhibit deformation during handling and operation.

In some examples, the at least one self-supporting portion of porous material includes a portion of porous material which includes one or more corrugations. The one or more corrugations may take the form e.g. of a plurality of folds or dimples. The one or more corrugations may in some examples take the form of an accordion fold, which for the purpose of this disclosure may be understood as a series of alternating folds which create multiple panels of similar size.

Corrugations can be useful since they allow a shell enclosing a given enclosed volume to increase its total surface area $S_r$, and hence decrease its total acoustic resistance $R_a$, without increasing the enclosed volume. This is useful, because directivity performance is closely related to total acoustic resistance $R_a$, and in some cases a lower total acoustic resistance $R_a$ may be needed to obtain a desired directivity performance (see e.g. discussion under the heading "Design considerations", below).

If the volume enclosed by the self-supporting shell is as described in the previous paragraph, including one or more corrugations in the at least one self-supporting portion of porous material may be particularly useful to obtain good cardioid performance, e.g. in the self-supporting porous shell is formed of a material with a relatively high specific airflow resistance (e.g. paper).

In some examples (referred to herein as "frame and shell" examples), the loudspeaker support structure may comprise a frame (e.g. a rigid frame, e.g. of plastic) from which the diaphragm is suspended, and the self-supporting porous shell, wherein the self-supporting porous shell is attached to the frame. With this configuration, it can be easier to manufacture the loudspeaker, and also to easily change the enclosed volume for a given loudspeaker, by simply switching out the self-supporting porous shell.

In some “frame and shell” examples, the frame may include one or more projections which are positioned so as to inhibit deformation of the at least one self-supporting porous portion from external forces, e.g. as may occur during manufacture and use of the loudspeaker. Although such projections may be present, it is important that the at least one self-supporting porous portion is able to retain its shape without being supported by the one or more projections, in the absence of external forces, e.g. as may occur during manufacture and use of the loudspeaker.

In some “frame and shell” examples, the frame may include a groove which extends around the principal axis of the loudspeaker, wherein the groove is configured to facilitate attachment of the shell to the frame. The shell may fit into the groove, and be attached to the frame at the groove (e.g. via glue), e.g. at a periphery of an open side of the shell.

In some “frame and shell” examples, a magnet unit of the drive unit may be attached to the frame. In some cases, the magnet unit may be attached to the frame with no direct contact between the self-supporting porous shell and the magnet unit. In other cases, the magnet unit may be attached to the frame as well as to the self-supporting porous shell.

In some examples (referred to herein as “shell as frame” examples), the diaphragm may be suspended from the self-supporting porous shell, without the need for an additional frame. Here the shell can be viewed as providing the function of a frame. This may help to provide a very low cost loudspeaker, particularly if the self-supporting porous shell is formed entirely of the at least one self-supporting portion (preferably a single self-supporting portion) of porous material, albeit that the self-supporting porous shell may not provide the same rigidity as a dedicated frame (as in the “frame and shell” examples).

In some “shell as frame” examples where the self-supporting porous shell is formed entirely of the at least one self-supporting portion (preferably a single self-supporting portion) of porous material, the at least one self-supporting portion may include a roll suspension ledge to facilitate the attachment of a roll suspension to the shell. The loudspeaker may include a roll suspension which attaches to the roll suspension ledge and to the diaphragm (e.g. directly), so as to suspend the diaphragm from the shell.

In some “shell as frame” examples where the self-supporting porous shell is formed entirely of the at least one self-supporting portion (preferably a single self-supporting portion) of porous material, the at least one self-supporting portion may include a spider suspension ledge to facilitate the attachment of a spider suspension to the shell. The loudspeaker may include a spider suspension which attaches to the spider suspension ledge and to the diaphragm (e.g. indirectly, via a voice coil former), so as to suspend the diaphragm from the shell.

In some “shell as frame” examples where the self-supporting porous shell is formed entirely of the at least one self-supporting portion (preferably a single self-supporting portion) of porous material, the at least one self-supporting portion may include a flat region to facilitate the attachment of a magnet unit to the shell. The loudspeaker may include a magnet unit which attaches to the flat region so as to attach the magnet unit to the shell.

In some “shell as frame” examples, the at least one self-supporting portion of porous material may include one or more corrugations. These may be useful to increase the surface area of the shell (and therefore decrease the total acoustic resistance Ra), which is particularly relevant if a roll suspension, spider suspension and/or magnet unit are attached to the shell (effectively reducing the surface area of the porous shell through which air can flow).

The self-supporting porous shell may include one or more cut-outs to facilitate an electrical connection to a voice coil of the loudspeaker.

A skilled person would recognise that the volume enclosed by the self-supporting porous shell may be bounded by one or more other elements, such as the diaphragm and a roll suspension.

A second aspect of the invention may provide a seat assembly including one or more loudspeakers according to the first aspect of the invention.

The seat assembly may include a headrest, with the one or more loudspeakers being mounted in the headrest of the seat assembly. In some examples, the headrest may be removable from the remainder of the seat assembly. In other examples, the headrest may be integral with the remainder of the seat assembly. In some seats (e.g. shell seats for cars) the headrest can be integral with the remainder of the seat such that it is unclear where the backrest ends and the headrest starts.

The one or more loudspeakers being mounted in a headrest of a seat assembly is not a requirement of the invention since, for example, the one or more loudspeakers could be mounted in a seat assembly without a headrest, or could be mounted in a part of the seat assembly that is not a headrest (e.g. a backrest of the seat, e.g. an upper portion of such a backrest).

The seat assembly is preferably configured to allow sound produced by the first radiating surface of the/each loudspeaker according to the first aspect of the invention to propagate out of the seat assembly, e.g. via open or acoustically transparent portions.

Similarly, the seat assembly is preferably configured to allow sound produced by the second radiating surface of the/each loudspeaker according to the first aspect of the invention to propagate out of the headrest, e.g. via open or acoustically transparent portions.

The seat assembly may include:

a first loudspeaker according to the first aspect of the invention, wherein the first loudspeaker is located within the headrest for use with a first ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the first loudspeaker;

a second loudspeaker according to the first aspect of the invention, wherein the second loudspeaker is located within the headrest for use with a second ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the second loudspeaker.

The seat assembly may include one or more additional loudspeakers.

For example, the seat assembly may include one or more bass loudspeakers for producing sound at bass frequencies. Bass frequencies may include frequencies across the range 60-80 Hz, more preferably frequencies across the range 50-100 Hz, more preferably frequencies across the range 40-100 Hz. In some cases, the bass loudspeaker may additionally be for producing sound at higher frequencies than stated here, e.g. up to (or even beyond) 250 Hz, or 300 Hz.

This may be useful if the loudspeaker(s) according to the first aspect of the invention is not good at producing sound below such frequencies.

Example loudspeakers which may be used as bass loudspeakers within the seat assembly are described, for example, in in WO2019/121266, WO2019/192808, WO2019/192816, WO2020/234316, WO2020/234317. Further disclosures relevant to providing a suitable bass loudspeaker are also disclosed in WO2020/126847 and WO2020/239766.

If the seat assembly includes one or more bass loudspeakers, then the loudspeakers according to the first aspect of the invention may be used as mid-high frequency units, e.g. operating over a frequency band that includes 300 Hz-3 kHz, more preferably 300 Hz-20 kHz.

If the seat assembly does not include one or more bass loudspeakers, then the loudspeakers according to the first aspect of the invention may be used as full-range frequency units (albeit within potentially limited low-frequency capability), e.g. operating over a frequency band that includes 60 Hz-3 kHz, more preferably 60 Hz-20 kHz.

A headrest of the seat assembly (if present, see above) may have a rigid headrest frame, e.g. including one or more mounting pins for mounting and rigidly attaching the headrest frame to a rigid seat frame as described below (such mounting pins are conventional in car headrests, where typically two mounting pins are used). The loudspeaker support structure of the/each loudspeaker according to the first aspect of the invention may be part of or fixedly attached to the rigid headrest frame.

Preferably, the seat assembly is configured to position a user who is sat down in a seat portion of the seat assembly such that an ear of the user is located at a listening position as described above.

Preferably, the seat assembly is configured to position a user who is sat down in a seat portion of the seat assembly such that a first ear of the user is located at a first listening position as described above whilst a second ear of the same user is located at a second listening position as described above.

The seat assembly may have a rigid seat frame. The loudspeaker support structure of the/each loudspeaker according to the first aspect of the invention may be part of or fixedly attached to the rigid seat frame.

The seat assembly may be configured for use in a vehicle such as a car (in which case the seat assembly may be referred to as a "car seat") or an aeroplane (in which case the seat assembly may be referred to as a "plane seat").

The seat assembly could be a seat for use outside of a vehicle. For example, the seat assembly could be configured for use at home, e.g. as a seat for use with computer games, a seat for use in studio monitoring or home entertainment.

In a third aspect, the present invention may provide a headrest as defined above in connection with a seat assembly according to the second aspect of the Annex (without requiring any other aspect of the seat assembly). The headrest may be configured to be mounted in a seat assembly, e.g. a seat assembly according to the second aspect of the invention.

In a fourth aspect, the present invention may provide a method suitable for making a loudspeaker according to the first aspect of the invention.

The method may include:

- providing a diaphragm having a first radiating surface and a second radiating surface, wherein the first radiating surface and the second radiating surface are located on opposite faces of the diaphragm;
- providing a drive unit configured to move the diaphragm based on an electrical signal;
- providing a loudspeaker support structure, wherein the loudspeaker support structure comprises a self-supporting porous shell, wherein at least part of the self-supporting porous shell is provided by at least one self-supporting portion of porous material having a specific airflow resistance in the range 500-10000 Pa·s/m;
- suspending the diaphragm from the loudspeaker support structure via one or more loudspeaker suspension elements with the self-supporting porous shell which enclosing a volume configured to receive sound produced by the second radiating surface.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION

Figure 1A:
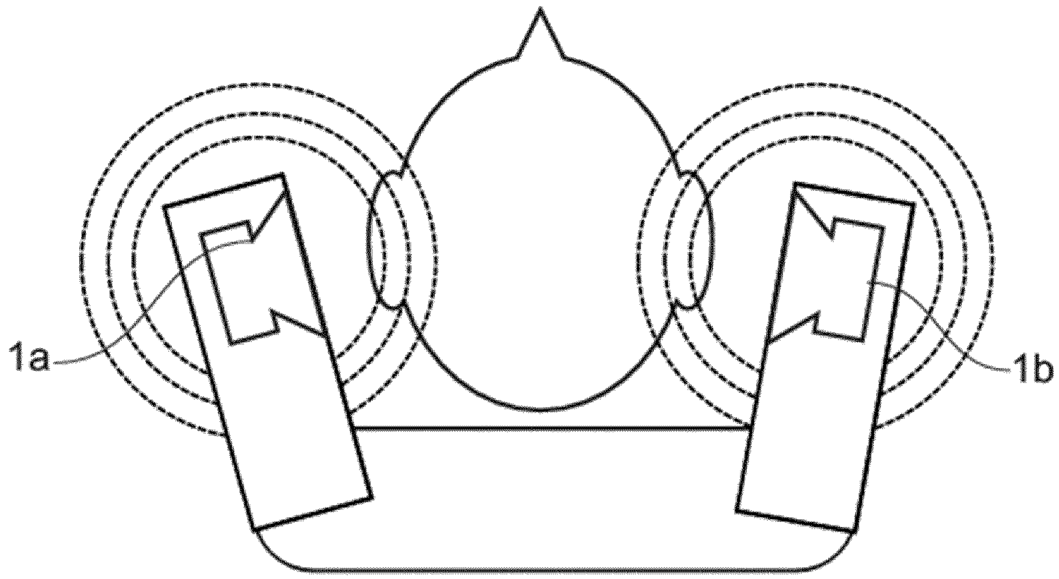
FIG. 1*a* illustrates loudspeakers 1*a*, 1*b* integrated in the forward-protruding wings of a car headrest, as described in the Annex (below).

Aspects and embodiments of the present invention will now be discussed with reference to the accompanying figures. Further aspects and embodiments will be apparent to those skilled in the art. All documents mentioned in this text are incorporated herein by reference.

In the examples that follow, alike features have been given corresponding reference numerals, and corresponding descriptions may apply except where such a description is clearly impermissible or expressly avoided.

Figure 18A:
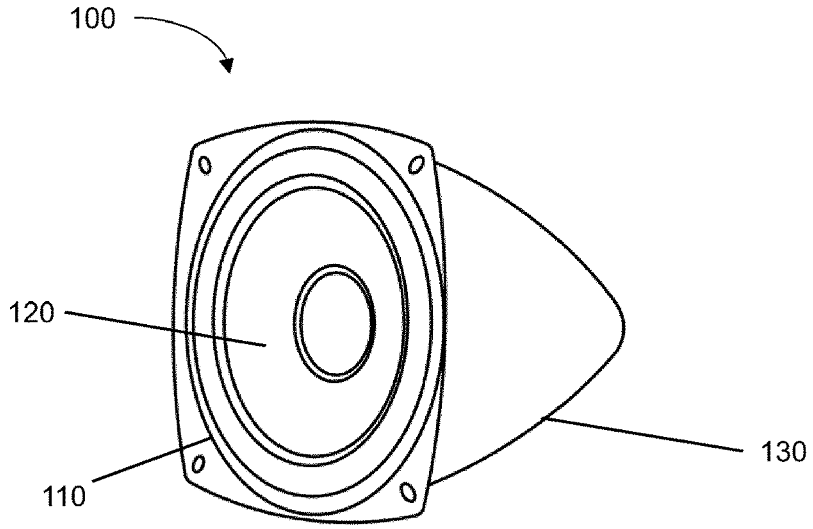
FIGS. 18*a-c* show a first example loudspeaker.

FIG. 18*a* shows a first example loudspeaker 100.

The loudspeaker 100 of FIG. 18*a* is a "frame and shell" loudspeaker, in which a loudspeaker support structure includes a frame 110 from which a diaphragm 120 is suspended, and a self-supporting porous shell 130 which encloses a volume configured to receive sound produced by a second radiating surface of the diaphragm 120.

In this example, the self-supporting porous shell 130 is entirely formed of a single piece of paper having a specific airflow resistance in the range 1500-10000 Pa·s/m so as to allow sound produced by the second radiating surface to exit the volume enclosed by the shell 130. The shell 130 is attached to the frame 110 by glue.

Figure 18B:
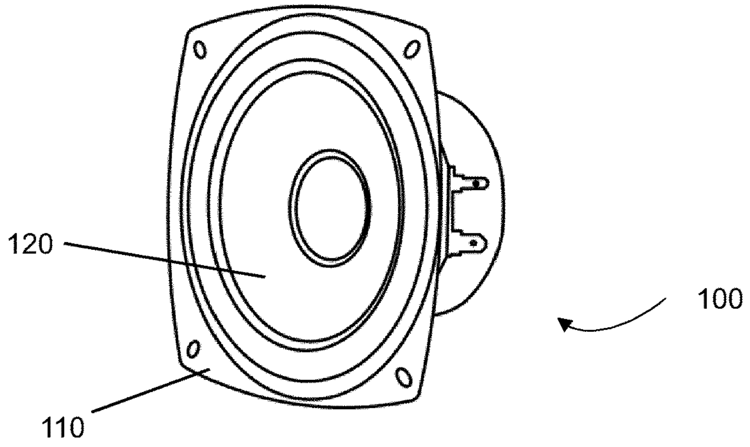

FIG. 18*b* shows the loudspeaker 100 of FIG. 18*a* with the shell 130 omitted.

Figure 18C:
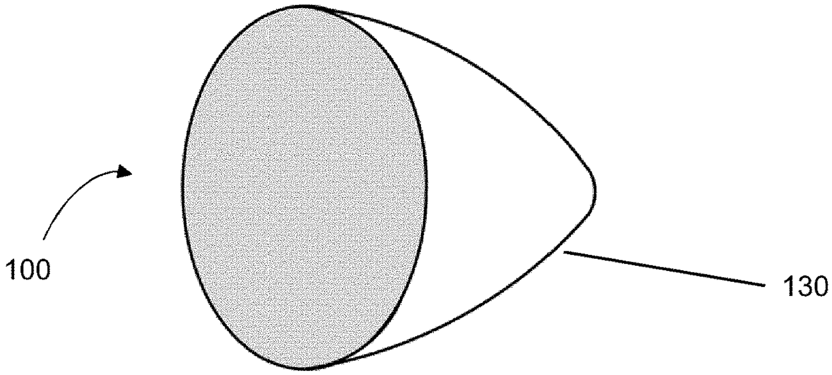

FIG. 18*c* shows the shell 130 from the loudspeaker 100 of FIG. 18*a*.

Figure 19A:
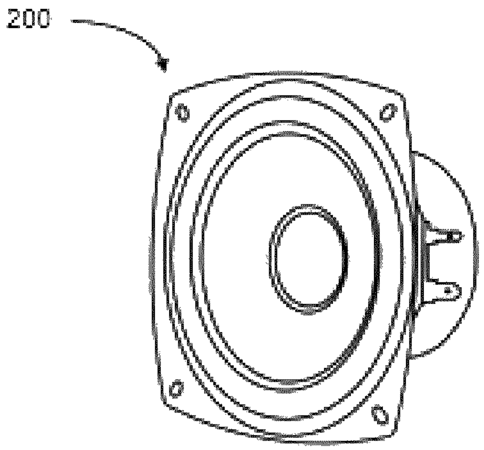
FIGS. 19*a-c* show a second example loudspeaker.

FIG. 19*a* shows a second example loudspeaker 200.

The second example loudspeaker 200 is the same as the first example loudspeaker, except that the self-supporting porous shell includes a plurality of folds 232, which take the form of an accordion fold. As explained elsewhere in this disclosure, such corrugations can be useful since they allow a shell enclosing a given enclosed volume to increase its surface area, without increasing the enclosed volume.

Figure 19B:
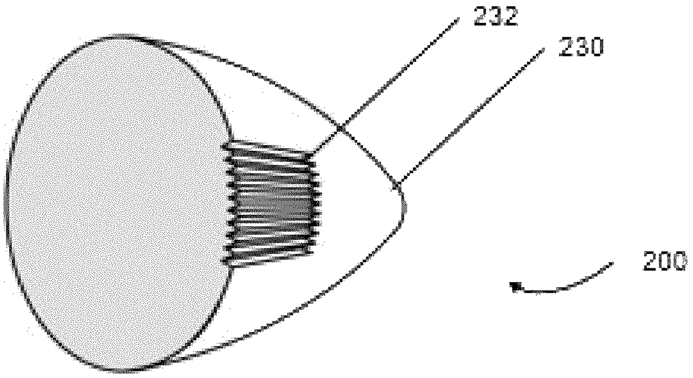

FIG. 19*b* shows the loudspeaker 200 of FIG. 19*a* with the shell 230 omitted.

Figure 19C:
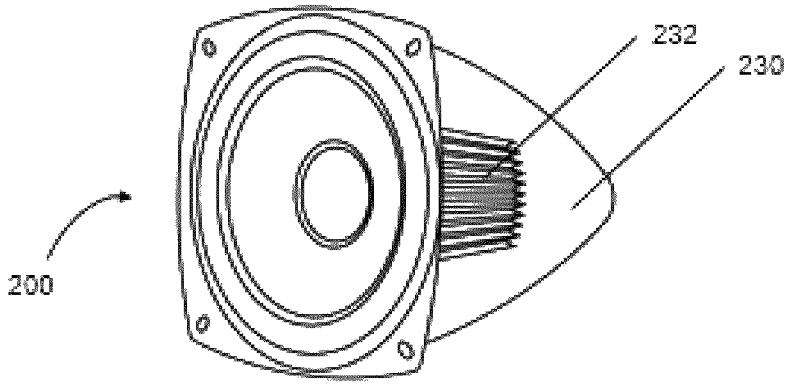

FIG. 19*c* shows the shell 230 from the loudspeaker 200 of FIG. 19*a*.

Figure 20:
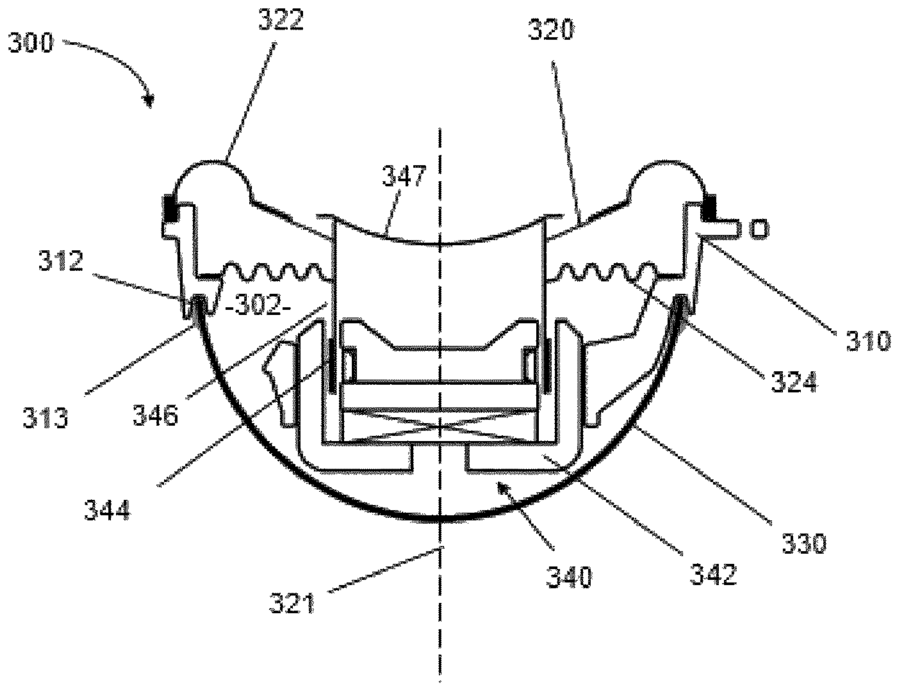
FIG. 20 shows a third example loudspeaker.

FIG. 20 shows a third example loudspeaker 300 (in cross-section).

The loudspeaker 300 of FIG. 20 is another "frame and shell" loudspeaker, in which a loudspeaker support structure includes a frame 310 from which a diaphragm 320 is suspended, and a self-supporting porous shell 330 which encloses a volume 302 configured to receive sound produced by a second radiating surface of the diaphragm 320.

In this example, the self-supporting porous shell 330 is entirely formed of a single piece of paper having a specific airflow resistance in the range 1500-10000 Pa·s/m so as to allow sound produced by the second radiating surface to exit the volume enclosed by the shell 330. The frame 310 includes a groove 312 which extends circumferentially around a principal axis 321 of the loudspeaker 300. The shell 330 fits into the groove, where it is attached to the frame by glue 313.

In this example, the diaphragm is suspended from the frame by two suspensions, including a roll suspension 322 and a spider suspension 324.

In this example, a drive unit 340 of the loudspeaker is an electromagnetic drive unit that includes a magnet unit 342 configured to produce a magnetic field in an air gap, and a voice coil 344 attached to the diaphragm 320 via a voice coil former 346. In use, the voice coil 344 may be energized (have a current passed through it based on the electrical signal) to produce a magnetic field which interacts with the magnetic field produced by the magnet unit 342 and which causes the voice coil 344 (and therefore the diaphragm 320) to move relative to the magnet unit along the principal axis 321 of the loudspeaker. The magnet unit may include a permanent magnet. The voice coil may be configured to sit in the air gap when the diaphragm is at rest. The voice coil former 346 is covered by a dust cap 347. Such drive units are well known (and are used in other examples disclosed herein, except where otherwise specified).

In this example, the magnet unit 342 is attached to the frame via a projection 314 on the frame which suspends the magnet unit between the self-supporting porous shell 330 and the spider suspension 324, with no direct contact between the magnet unit 342 and the self-supporting porous shell 330.

Figure 21:
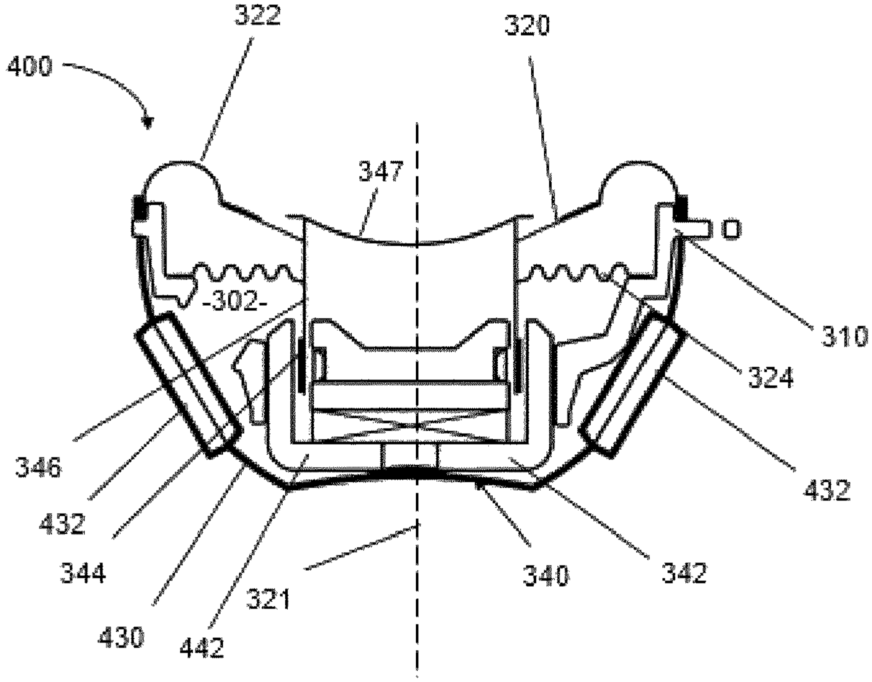
FIG. 21 shows a fourth example loudspeaker.

FIG. 21 shows a fourth example loudspeaker 400 (in cross-section).

Figure 22:
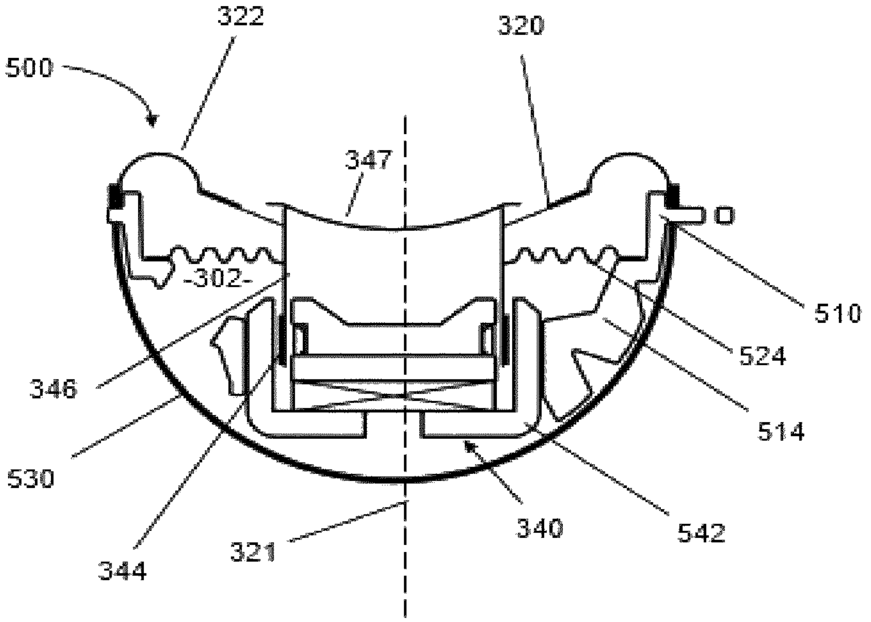
FIG. 22 shows a fifth example loudspeaker.

The loudspeaker 400 of FIG. 21 closely corresponds in most respects to the loudspeaker 300 of FIG. 20, except that in the case of the loudspeaker 400 of FIG. 21:

The self-supporting porous shell 430 includes folds 432 to increase surface area thereof The magnet unit 442, as well as being attached to the frame, is also attached to the a suitably shaped region of the self-supporting porous shell, which helps to increase sturdiness (albeit at the expense of some loss of surface area through which air can flow, though in this example that loss is compensated by the folds 432) FIG. 22 shows a fifth example loudspeaker 500 (in cross-section).

The loudspeaker 500 of FIG. 22 closely corresponds in most respects to the loudspeaker 300 of FIG. 20, except that in the case of the loudspeaker 500 of FIG. 22:

The frame 510 includes a projection 514 which is positioned so as to inhibit deformation of the shell from external forces, e.g. as may occur during manufacture and use of the loudspeaker. This projection 514 also serves to attach the magnet unit 542 to the frame thereby suspending the magnet unit between the self-supporting porous shell 530 and the spider suspension 524, with no direct contact between the magnet unit 542 and the self-supporting porous shell 530

Figure 23:
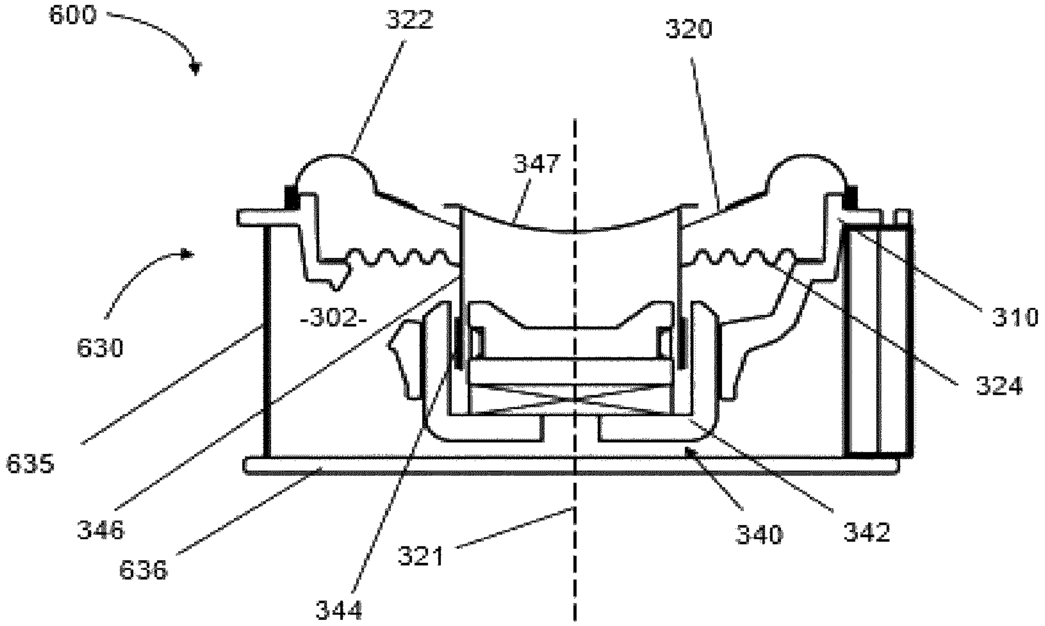
FIG. 23 shows a sixth example loudspeaker.

FIG. 23 shows a sixth example loudspeaker 600 (in cross-section).

The loudspeaker 600 of FIG. 23 closely corresponds in most respects to the loudspeaker 300 of FIG. 20, except that in the case of the loudspeaker 600 of FIG. 23:

The self-supporting porous shell 630 is provided by a self-supporting portion of porous material 635 and a non-porous lid 636. Here, the self-supporting portion of porous material has the form of a cylindrical tube 635 of felt material having a specific airflow resistance in the range ~500-3000 Pa·s/m. The cylindrical tube 635 of felt material may be formed by cutting a tube of felt material or by folding a straight piece of felt around cylindrical shape. The cylindrical tube 635 is self-supporting, in that it is configured to retain its shape without being supported by some additional (e.g. non-porous) supporting structure (e.g. the lid 636). This is important, because it helps to simplify manufacture of the loudspeaker 600. The lid 636 is present here to ensure airtightness, which in this context means that airflow from the volume 302 enclosed by the self-supporting porous shell 630 to outside the loudspeaker 600 when the loudspeaker is in use should be substantially through the porous material of the self-supporting porous shell 630.

Figure 24:
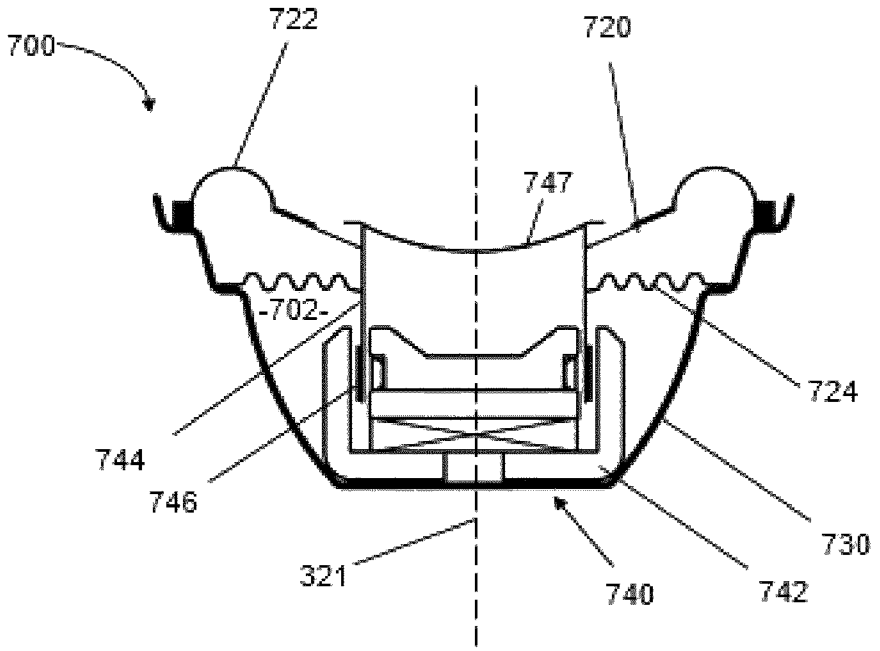
FIG. 24 shows a seventh example loudspeaker.

FIG. 24 shows a seventh example loudspeaker 700 (in cross-section).

The loudspeaker 700 of FIG. 24 is a "shell as frame" loudspeaker, in which the diaphragm 720 is suspended from the self-supporting porous shell 730, without the need for an additional frame.

In this example, the self-supporting porous shell 730 is entirely formed of a single piece of paper having a specific airflow resistance in the range 1500-10000 Pa·s/m so as to allow sound produced by the second radiating surface to exit the volume 702 enclosed by the shell 730.

In this example, the diaphragm 720 is suspended from the frame by two suspensions, including a roll suspension 722 and a spider suspension 724.

The roll suspension 722 attaches to a roll suspension ledge formed in the shell 730 and to the diaphragm (directly), so as to suspend the diaphragm from the shell.

The spider suspension 724 attaches to a spider suspension ledge formed in the shell 730 and to the diaphragm 747 (indirectly, via the voice coil former 744), so as to suspend the diaphragm 720 from the shell.

The magnet unit 742 is attached to a flat region at the base of the shell 730, so as to attach the magnet unit 742 to the shell 730.

Figure 25:
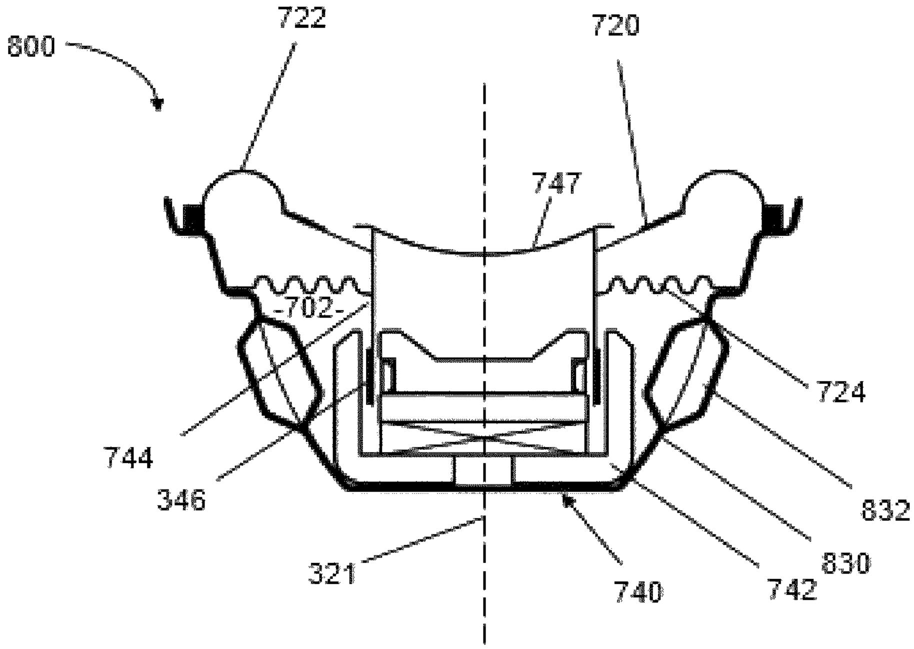
FIG. 25 shows an eighth example loudspeaker.

FIG. 25 shows an eighth example loudspeaker 800 (in cross-section).

The loudspeaker 800 of FIG. 25 closely corresponds in most respects to the loudspeaker 700 of FIG. 24, except that in the case of the loudspeaker 800 of FIG. 25:

- The self-supporting porous shell 830 includes folds 832 to increase surface area thereof Here we note that the "shell as frame" loudspeaker 700 of FIG. 24 may be extremely low cost to produce, owing to the avoidance of a separate frame. However, attachment between the roll suspension 722, spider suspension 724 and magnet unit 742 and the shell 730 means that the surface area of the shell decreases, and therefore the total acoustic resistance increases, which may lead to undesirable acoustic performance. This can be compensated for, without increasing the volume 702 by the addition of folds 832 as shown in FIG. 25.

In this example, a drive unit 740 of the loudspeaker is an electromagnetic drive unit that includes a magnet unit 742 configured to produce a magnetic field in an air gap, and a voice coil 744 attached to the diaphragm 720 via a voice coil former 746. In use, the voice coil 744 may be energized (have a current passed through it based on the electrical signal) to produce a magnetic field which interacts with the magnetic field produced by the magnet unit 742 and which causes the voice coil 744 (and therefore the diaphragm 720) to move relative to the magnet unit along the principal axis 321 of the loudspeaker. The magnet unit may include a permanent magnet. The voice coil may be configured to sit in the air gap when the diaphragm is at rest. The voice coil former 746 is covered by a dust cap 747. Such drive units are well known (and are used in other examples disclosed herein, except where otherwise specified).

Each of the loudspeakers 100-800 shown in FIGS. 18-25 is capable of delivering sound in a mid-high frequency range (e.g. 300 Hz-3 kHz) that is highly directional, whilst suppressing blowing noises that might otherwise be distracting for a user whose ear(s) are located at a listening position that is near to the loudspeaker.

Figure 1B:
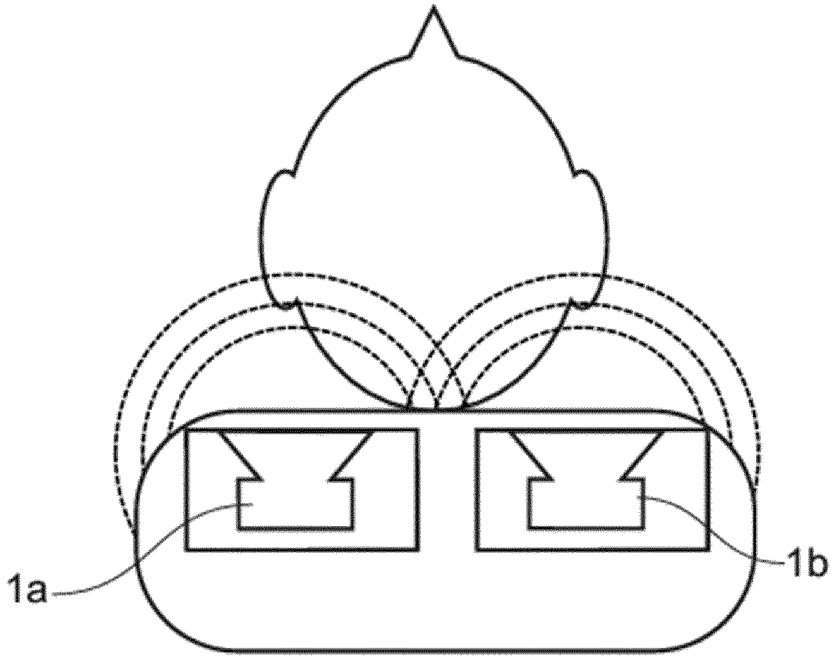
FIG. 1*b* illustrates loudspeakers 1*a*, 1*b* integrated in a car headrest without forward protruding wings, as described in the Annex (below).

As such, any of the loudspeakers 100-800 shown in FIGS. 18-25 may be incorporated into a headrest of a seat assembly, e.g. to be used as the first and second loudspeakers 1*a*, 1*b* shown in FIG. 1*a* or 1*b*, preferably such that:

- a first loudspeaker 1*a* is located within the headrest for use with a first ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the first loudspeaker;
- a second loudspeaker 1*b* is located within the headrest for use with a second ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the second loudspeaker.

A skilled person would appreciate that a wide variety of design choices are available within the context of this present invention, such as:

- Whether to implement the loudspeaker in a "frame and shell" or "shell as frame" configuration
- Whether to form the self-supporting porous shell entirely of a single self-supporting portion of porous material, or to incorporate multiple portions of porous material or non-porous materials in the shell
- The choice of porous material(s) used in the shell (e.g. paper, felted fabric, foam) and the specific airflow resistance of such materials
- The size and shape of the porous shell (e.g. in order to fit the loudspeaker in a headrest, where space available may be limited)
- The desired acoustic performance of the loudspeaker, which may e.g. require the shell to provide a certain SPL and/or directivity index, e.g. across a defined frequency range
- How robust the shell needs to be during handling and use With these factors in mind, we will now discuss a number of design considerations that a skilled person may wish to take into account when implementing a loudspeaker according to the present invention.

Design Considerations

The total acoustic resistance ($R_a$) of a self-supporting porous shell is dependent on the specific airflow resistance ($R_s$) of the material (or materials) that form the porous shell, and on the total surface area ($S_r$) of the porous shell:

$$R_a = \frac{R_s}{S_r}$$

The cardioid or directivity performance of the loudspeaker is dependent on the total acoustic resistance ($R_a$), and the loudspeaker may therefore be designed with a target total acoustic resistance ($R_a$) in mind.

The relationship between directivity performance and total acoustic resistance ($R_a$) is not straightforward. This can be understood e.g. with reference to the discussion of FIGS. 8*a-d* in the Annex, which illustrates that if the total acoustic resistance ($R_a$) is very low, then loudspeaker performance may approximate that of a dipole (see e.g. FIG. 8*a*), yet if the total acoustic resistance ($R_a$) is very high, then loudspeaker performance may approximate that of a closed box (see e.g. FIG. 8*d*). Yet, if the total acoustic resistance ($R_a$) is somewhere between these two extremes, then a strong directivity performance can be achieved (see e.g. the cardioid directivity pattern of FIG. 8*c* or the hyper cardioid directivity pattern of FIG. 8*b*).

As can be seen from the above relationship, the total acoustic resistance ($R_a$) can be varied by changing the specific airflow resistance ($R_s$) of the material (or materials) that form the porous shell, or the total surface area ($S_r$) of the porous shell.

Figure 26:
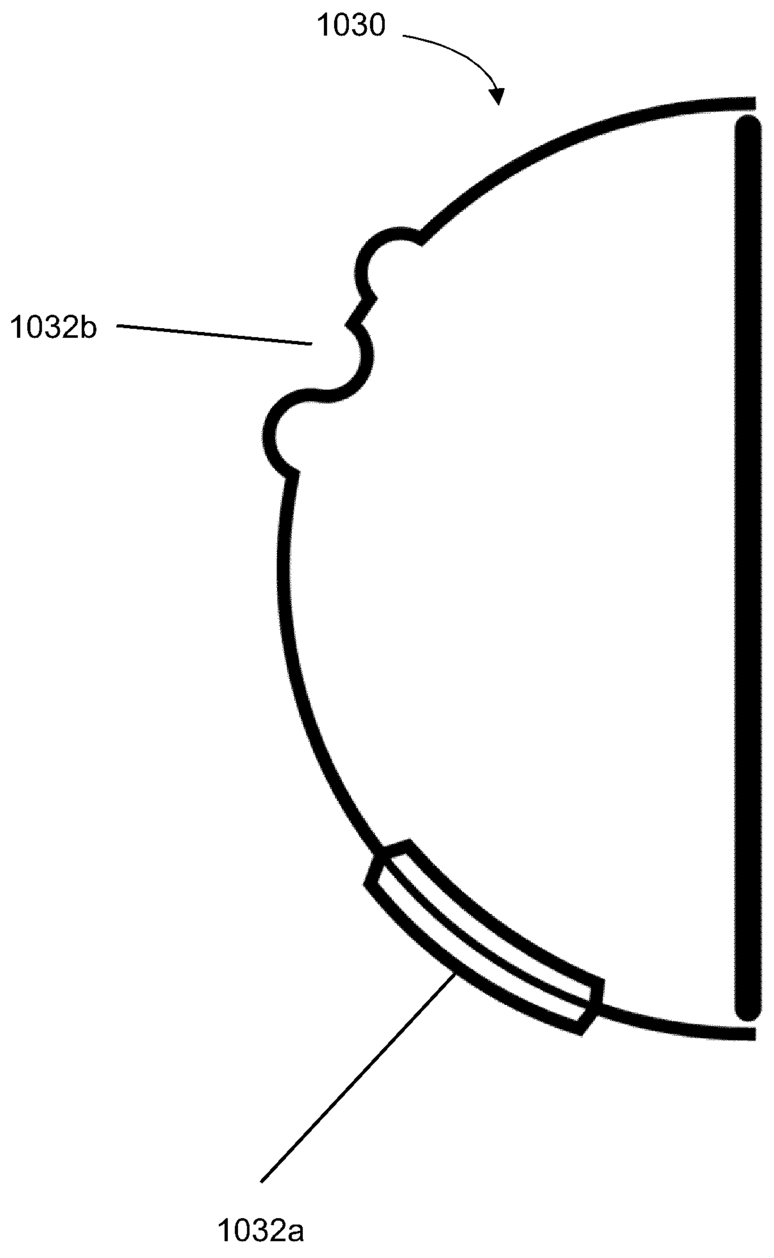
FIGS. 26-30 illustrate design considerations that may be taken into account when designing a loudspeaker according to the present invention.
Figure 27A:
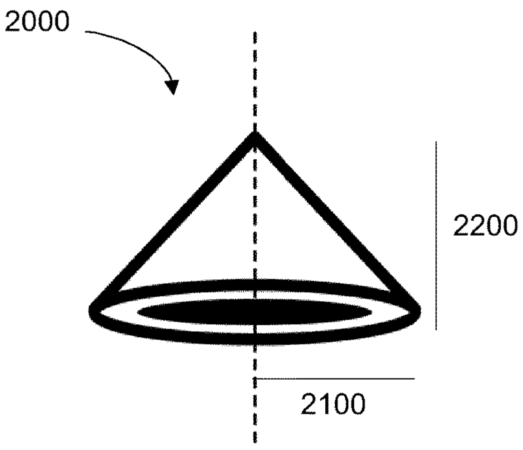
Figure 27B:
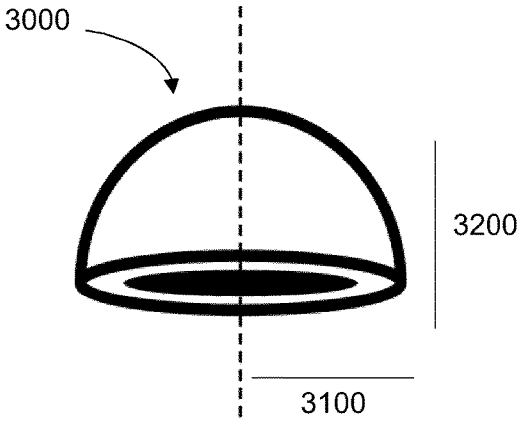
Figure 27C:
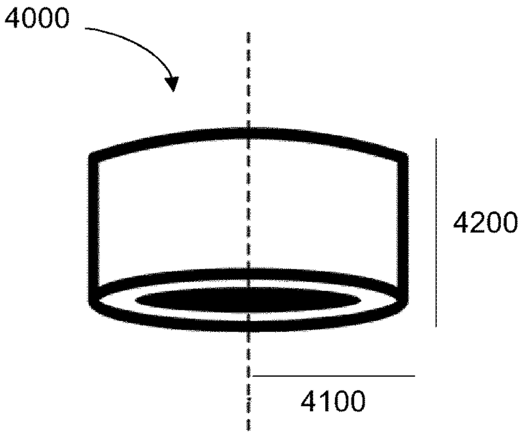
Figure 27D:
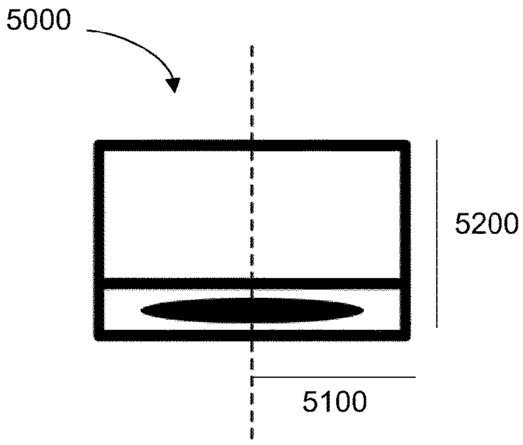

Porous materials that are capable of forming a self-supporting porous shell tend to have relatively high specific airflow resistances ($R_s$), meaning that a larger surface area ($S_r$) of the porous shell may be required to provide the desired total acoustic resistance (Ra). Depending on design considerations for the product in which the loudspeaker is to be implemented (e.g. the need to fit in a particular space such as a headrest), it may not be possible to increase the surface area ($S_r$) of the porous shell 1030 by simply increasing the enclosed volume ($V_a$). Rather, it may be useful to introduce corrugations 1032 such as pleats 1032*a*, folds or dimples 1032*b* in the shell 1030 to increase the surface area ($S_r$) while maintaining a particular enclosed volume ($V_a$). This is as illustrated in FIG. 26.

As an illustrative example, it may be determined that the required specific airflow resistance ($R_s$) to form the shell with a particular total acoustic resistance (Ra) as a basic shape (i.e. one without corrugations) is ~900 Pa·s/m, while the preferred material (e.g. paper) for forming the shell may only be available with a specific airflow resistance ($R_s$) of 1800 Pa·s/m or higher. Introducing corrugations can enable the surface area to be increased (doubled in this example), such that it is possible to form the shell with the desired total acoustic resistance ($R_a$).

Different specific airflow resistances may be appropriate in different circumstances, depending e.g. on application requirements. But in general terms, when extending the effective frequency range in which a high directivity is required towards lower frequencies (e.g. below 300 Hz), a lower specific airflow resistance may be appropriate (to the extent permitted by materials capable of forming a self-supporting porous shell). Use of materials with a lower specific airflow resistance for lower frequency loudspeakers may go hand in hand with an increased loudspeaker size generally required by loudspeakers configured to generate sound at lower frequencies at an adequate SPL [note that, to generate lower frequency sound at an adequate SPL, a larger volume displacement is required, hence relatively more air needs to pass through the shell to keep up with the radiated acoustic energy from the front of the loudspeaker]. A lower specific airflow resistance is one way to provide more airflow through the shell but, as noted above, more airflow through the shell can also be increased by introducing corrugations into our shell.

In order to design a self-supporting porous shell, and to determine how much (if any) corrugation is required, the skilled person can determine the surface area to volume ratio of the intended shape, where the basic shape provides the surface area to volume ratio minimum, and use this as a starting point to calculate the increase required by introduction of corrugations. Examples of such basic shapes are illustrated in FIGS. 27*a*-27*d*. In general, for practical application in a loudspeaker, height h is greater than or equal to radius r (i.e.

$$\frac{h}{r} \geq 1).$$

For example, a cone 2000 (FIG. 27*a*) with radius 2100 r and height 2200 h has a surface area (S) of $S=\pi r\sqrt{h^2+r^2}$, and a volume (V) of $V=\frac{1}{3}\pi r^2 h$, meaning that:

$$\frac{S}{V} = \frac{3\sqrt{h^2+r^2}}{r \cdot h}$$

that when h=r, $$\frac{S}{V} = \frac{3\sqrt{2}}{r}$$

or $$\frac{S \cdot r}{V} = 3\sqrt{2}$$

and that (for fixed radius, r):

$$h \to \infty, \frac{S \cdot r}{V} \to 3$$

$$h \to 0, \frac{S \cdot r}{V} \to \infty$$

Also for example, a hemisphere 3000 (FIG. 27*b*) with radius 3100 r and height 3200 h=r has a surface area (S) of $S=2\pi r^2$, and a volume (V) of $V=\frac{2}{3}\pi r^3$, meaning that:

$$\frac{S}{V} = \frac{3}{r}$$

or $$\frac{S \cdot r}{V} = 3$$

If the hemisphere 3000 is instead an oblate or prolate hemispheroid, such that h<r or h>r respectively, for fixed radius, r:

$$h \to \infty, \frac{S \cdot r}{V} \to 2.35$$

$$h \to 0, \frac{S \cdot r}{V} \to \infty$$

Also for example, a cylinder 4000 having one end closed (FIG. 27*c*) with radius 4100 r and height 4200 h has a surface area (S) of $S=\pi r(2h+r)$, and a volume (V) of $V=\pi r^2 h$, meaning that:

$$\frac{S}{V} = \frac{2h+r}{r \cdot h}$$

that when h=r, $$\frac{S}{V} = \frac{3}{r}$$

-continued or $$\frac{S \cdot r}{V} = 3$$

and that (for fixed radius, r):

$$h \to \infty, \frac{S}{V} \to 2$$

$$h \to 0, \frac{S}{V} \to \infty$$

Also for example, a cuboid 5000 having one end closed (FIG. 27*d*) with radius 5100 r and height 5200 h has a surface area (S) of S=4 r(2 h+r), and a volume (V) of 4 $r^2$ h, meaning that:

$$\frac{S}{V} = \frac{2h + r}{r \cdot h}$$

that when h=r, $$\frac{S}{V} = \frac{3}{r}$$

or $$\frac{S \cdot r}{V} = 3$$

and that (for fixed radius, r):

$$h \to \infty, \frac{S}{V} \to 2$$

$$h \to 0, \frac{S}{V} \to \infty$$

Figure 28A:
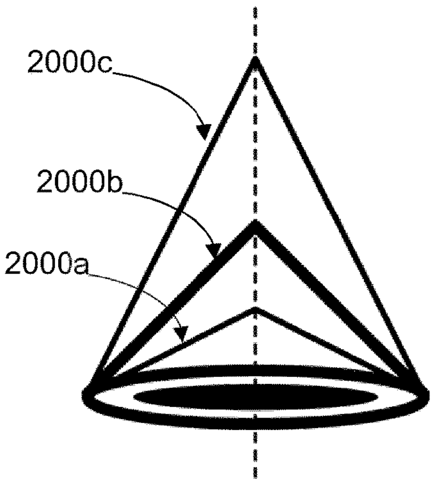
Figure 28B:
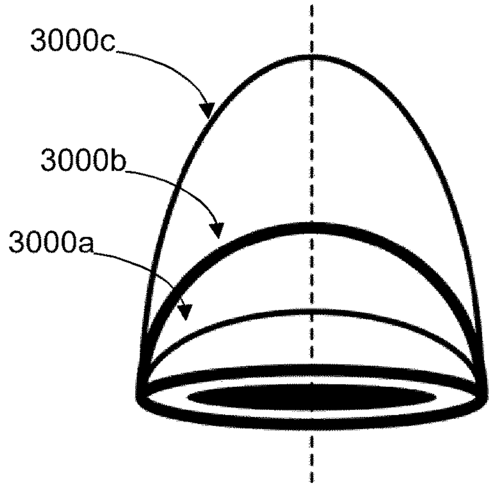
Figure 28C:
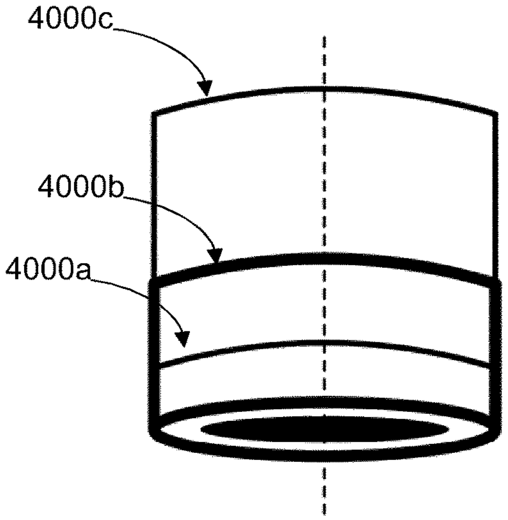
Figure 28D:
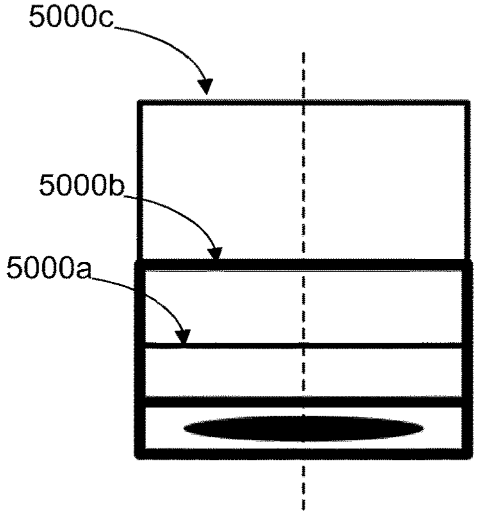

Varying h/r for the described basic shapes is illustrated in FIG. 28*a*-28*d*. FIG. 28*a* illustrates a cone 2000*a* with h<r, a cone 2000*b* with h=r, and a cone 2000*c* with h>r. FIG. 28*b* illustrates an oblate hemispheroid 3000*a* with h<r, a hemisphere 3000*b* with h=r, and a prolate hemispheroid 3000*c* with h>r. FIG. 28*c* illustrates a cylinder 4000*a* with h<r, a cylinder 4000*b* with h=r, and a cylinder 4000*c* with h>r. FIG. 28*d* illustrates a cuboid 5000*a* with h<r, a cuboid 5000*b* with h=r, and a cuboid 5000*c* with h>r.

Figure 29:
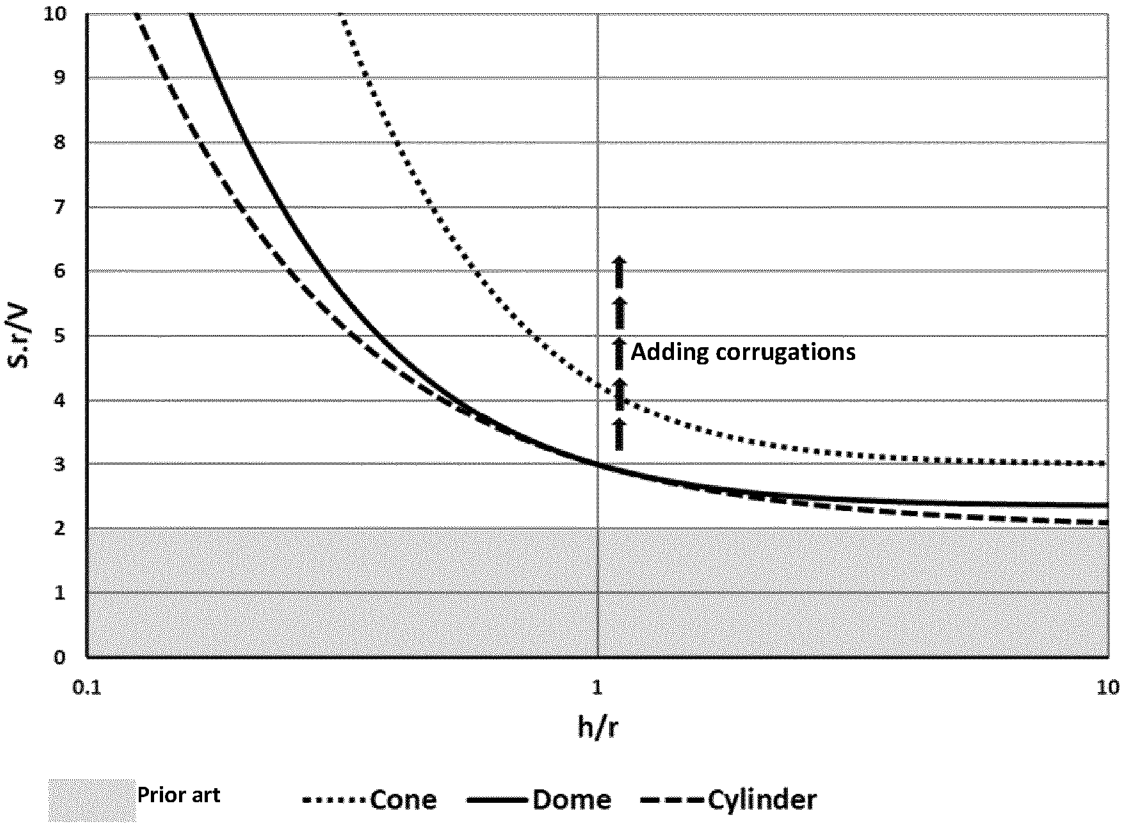

Plotting S·r/V against h/r therefore provides the maximum surface area to volume ratio that can be achieved without the use of corrugations (or alternatively the minimum surface area to volume ratio that can be achieved for that shape)—see FIG. 29. The shaded area indicates that any examples of loudspeakers with porous shells found by the inventors in prior art documents have $$\frac{S \cdot r}{V} \le 2,$$

as can be possible where materials with higher porosity (but which are typically not self-supporting) are used. The skilled person can therefore use these factors in determining the desired configuration for the self-supporting porous shell to achieve a particular total acoustic resistance $R_a$.

For many applications, it will be desirable to configure the self-supporting porous shell such that $$\frac{S \cdot r}{V} \ge 2$$

and preferably $$\frac{S \cdot r}{V} \ge 3,$$

which will often only be possible through use of corrugations unless h<<r.

When accounting for the design of a specific loudspeaker system, the effective radius (r) of the self-supporting porous shell can be related to the effective radiating surface area (D) of the diaphragm of the loudspeaker. A square loudspeaker having radius r has surface area D=4 $r^2$, such that $$r = \sqrt{\frac{D}{4}}.$$

Thus, the inequality $$\frac{S \cdot r}{V} \ge 2$$

described above can, for a square loudspeaker, be restated as:

$$\frac{S \cdot \sqrt{\frac{D}{4}}}{V} \ge 2$$

Figure 30A:
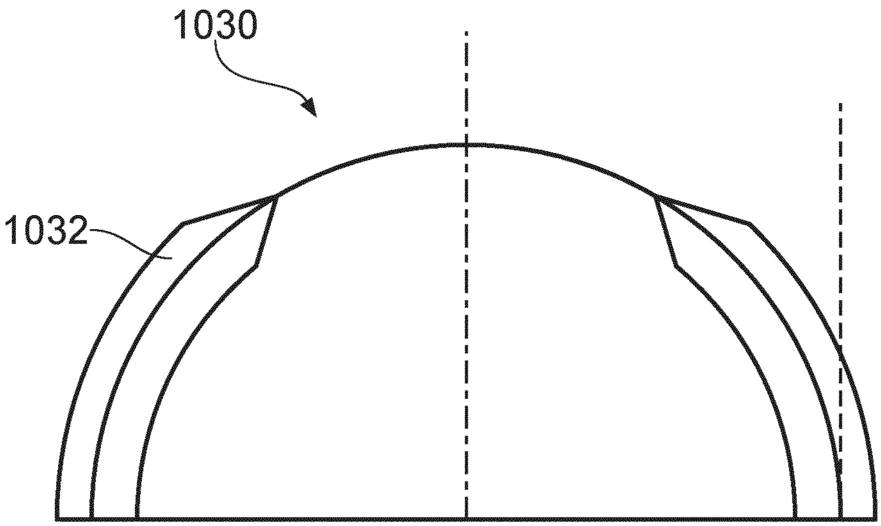
Figure 30B:
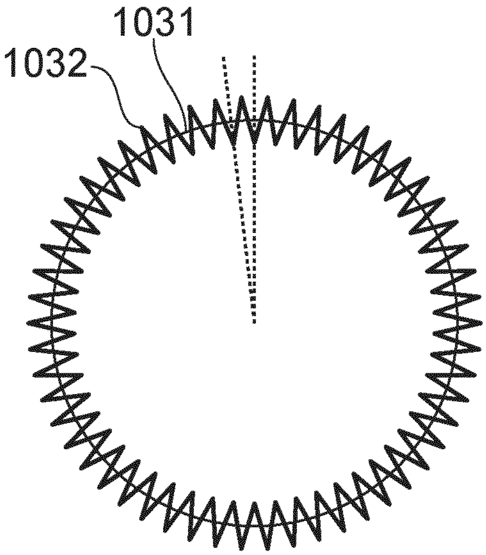
Figure 30C:
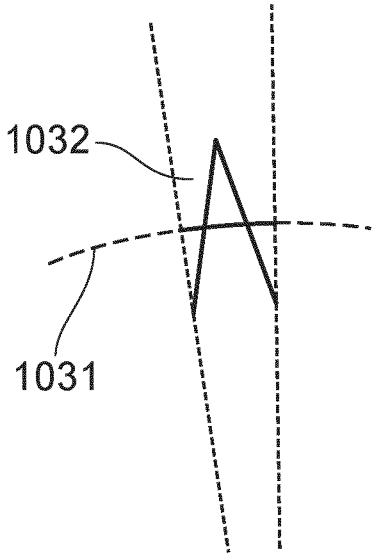

To achieve the desired $$\frac{S \cdot r}{V} \ge 2 \text{ or } \frac{S \cdot \sqrt{\frac{D}{4}}}{V} \ge 2,$$

therefore, it is possible to introduce corrugations, which can significantly increase S without the need to increase either r or V. An effect of introducing corrugations is as illustrated in FIGS. 30*a*-30*c*, where it is seen that a corrugated surface 1032 can increase the surface area by a factor of ~2, preferably a factor of ~3, more preferably a factor of at least 4 by increasing the effective circumference of the self-supporting porous shell when compared to an equivalent non-corrugated surface 1031.

The skilled person can therefore select a proportion of the total surface area that is corrugated and/or a depth of form of the corrugations to provide a significant increase in surface area of the self-supporting porous shell, as may be required to provide the desired $$\frac{S\cdot r}{V}\geq 2 \text{ or } \frac{S\cdot\sqrt{\frac{D}{4}}}{V}\geq 2.$$

The above design considerations, among other factors, may therefore be taken into account when designing a loudspeaker according to the present invention.

EXPERIMENTAL DATA

To demonstrate the utility of the present invention in the context of loudspeaker design, the present inventors have undertaken a series of experimental implementations of loudspeakers that either conform to the present invention, or simulate a loudspeaker setup in accordance with the present invention.

Figure 31A:
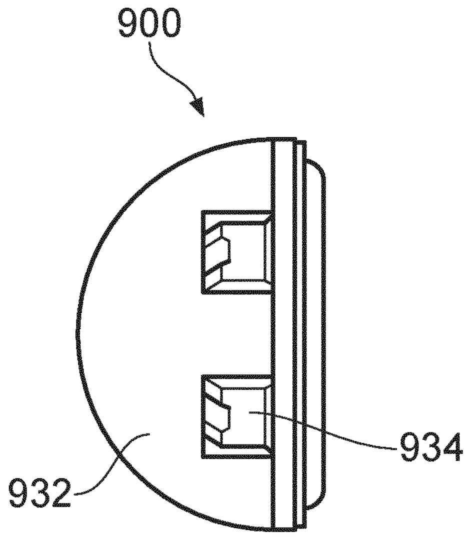
FIGS. 31-41*b* illustrate experimental data collected in relation to the present invention.
Figure 31B:
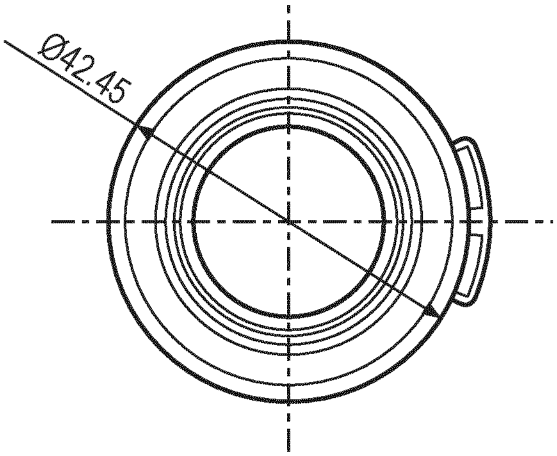
Figure 31C:
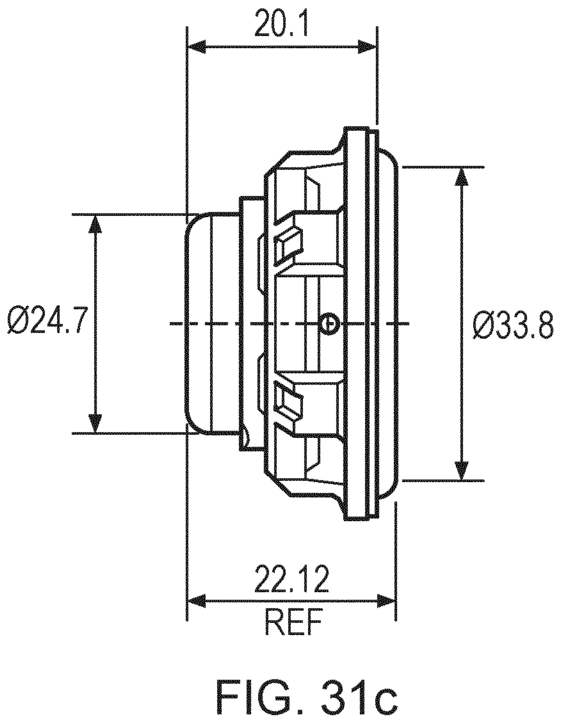

FIG. 31*a* illustrates a side view of an experimental loudspeaker 900 used for the tests, which includes a self-supporting shell 932.

FIGS. 32*b-d* show, respectively, a front view of the experimental loudspeaker 900 with the self-supporting shell 932 omitted, a side view of the experimental loudspeaker 900 with the self-supporting shell 932 omitted, and a side view of the self-supporting shell 932. The loudspeaker has impedance Re=3.40, resonance frequency Fs=205 Hz, effective surface area Sd=9 $cm^2$, moving mass Mms=1 g, magnetic field strength BL=2.6 Tm, and Q-factor Qms=1.65.

Figure 31D:
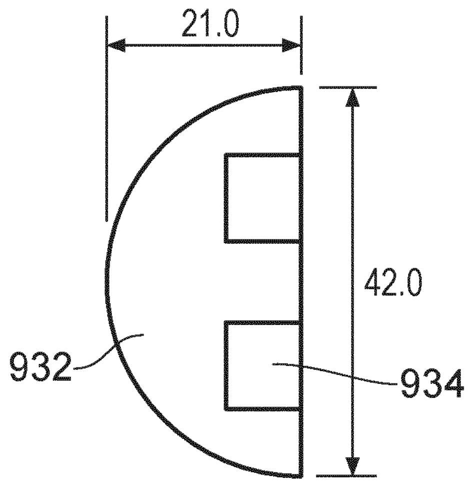

As shown in FIGS. 31*a* and 31*d*, the self-supporting shell 932 used in these experiments is a hemisphere with external radius 21 mm, and includes cutouts 934 for receiving the connectors of the loudspeaker. The surface area is reduced by these cutouts, which have dimension 9.2 mm×8.2 mm. Therefore, the surface area of the self-supporting shell 932 is $S=2\pi r^2-2*0.92*0.82=26.2\ cm^2$. The effective volume of the self-supporting shell 932 includes: (i) the hemispherical volume of the shell $$\frac{2\pi r^3}{3}=19.4\ \text{cm}^3$$

which is reduced by the presence of the rigid elements of the loudspeaker (which occupy ~6.7 $cm^3$); and (ii) a volume available between the self-supporting shell 932 and the actuating face of the diaphragm which is ~3.6 $cm^3$. The effective volume of the self-supporting shell 932 is therefore $$V=\frac{2\pi r^3}{3}+3.6-6.7=(19.4+3.6-6.7)\ \text{cm}^3=16.3\ \text{cm}^3.$$

The radius of the loudspeaker is 17 mm. Thus, for the experimental loudspeaker 900 shown in FIGS. 31*a-d*:

$$\frac{S\cdot r}{V}=\frac{26.2\ \text{cm}^2\cdot 1.7\ \text{cm}}{16.3\ \text{cm}^3}=2.7$$

In addition, a time delay $\Delta T_r$ may be calculated for each experimental loudspeaker where $\Delta T_r$ (in seconds) is given by:

$$\Delta T_r=\frac{R_s V}{S\rho_0 c^2}$$

where $R_s$ is the specific airflow resistance (Pa·s/m), $\rho_0$ is the density of air (1.2 kg/$m^3$) and c is the speed of sound (343 m/s).

Time delay $\Delta T_r$ is a parameter that can be viewed as representing an amount of monopole component seen in the performance of the loudspeaker where a larger $\Delta T_r$ results in a greater monopole component (i.e. the more monopole like the performance of the loudspeaker, noting that $\Delta T_r\rightarrow\infty$ would be equivalent to a monopole loudspeaker). By way of example, a loudspeaker which has a self-supporting shell with a relatively high resistivity would have a higher $\Delta T_r$ than an equivalent loudspeaker whose self-supporting shell has a relatively low resistivity. Thus, $\Delta T_r$ is influenced by the resistivity of the self-supporting shell $R_s$, surface area of the self-supporting shell S, and the volume V of the self-supporting shell as illustrated by the above equation.

A dipole component seen in the performance of the loudspeaker will in general be influenced by the size of the diaphragm and the size of the baffle which define a path-length, D, for sound waves being emitted from a front radiating surface of the diaphragm to reach a rear radiating surface of the diaphragm. Dipole pathlength D is discussed e.g. in pages 32-35 of WO2019/121266. Without wishing to be bound by theory, the inventor has found that when $\Delta T_r$ is set to approximately match (e.g. fall within ±50%) the dipole pathlength (converted into units of time by dividing by c), i.e. when $\Delta T_r$ is set to be ~D/c, improved cardioid performance can be achieved for the loudspeaker. Again without wishing to be bound by theory, it is believed that this is because when the monopole component of a loudspeaker ($\Delta T_r$) is configured to match the dipole component of the loudspeaker (D/c), the resulting sound produced by the loudspeaker contains ~50% monopole component and ~50% dipole component, resulting in a theoretical cardioid (see theoretical discussion of FIGS. 42*a-c*, below).

Therefore, a target value of $\Delta T_r$ which approximately corresponds to the dipole pathlength, i.e. $\Delta T_r$ (target)~D/c, may be calculated to assist in design of a loudspeaker with good cardioid performance, though it is only one factor that may be considered in practice by a loudspeaker designer seeking to implement a loudspeaker according to the present disclosure.

The target time-delay for the loudspeaker of FIGS. 31*a-d* has been calculated as $\Delta T_r$ (target)=D/c=0.08 ms.

Figure 32:
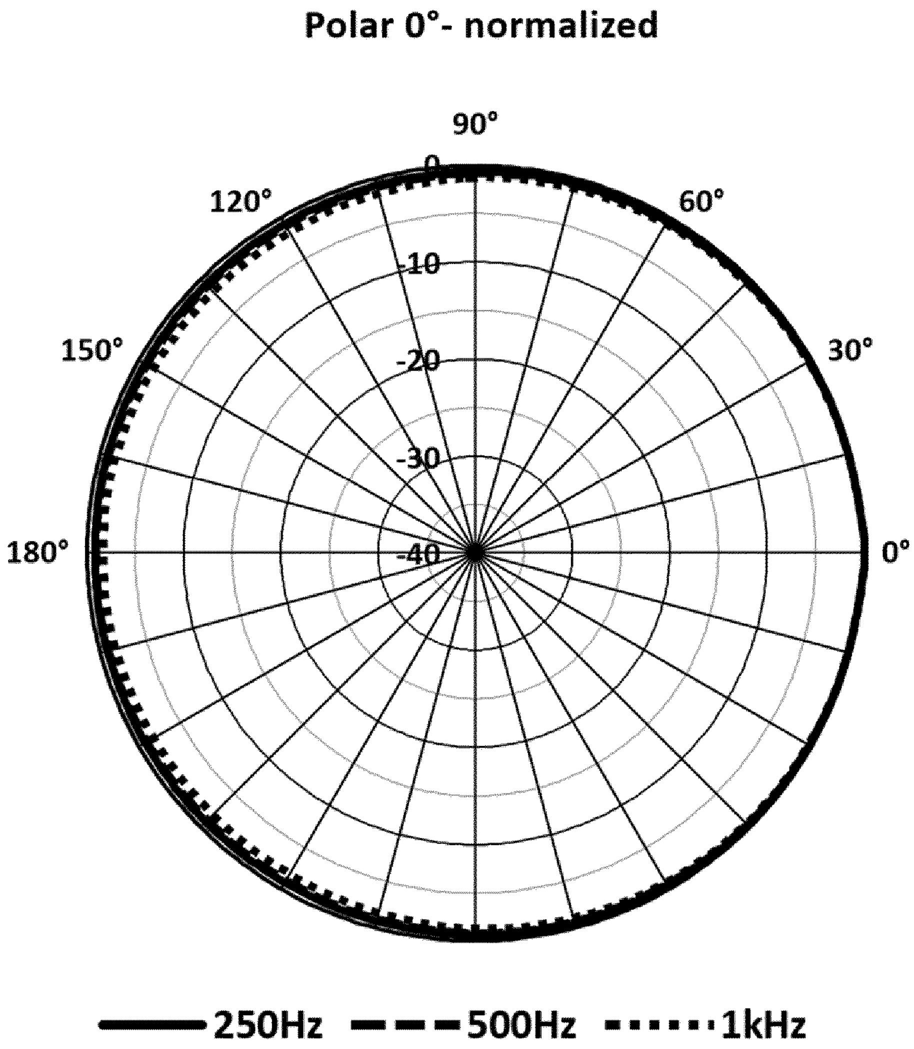
Figure 33:
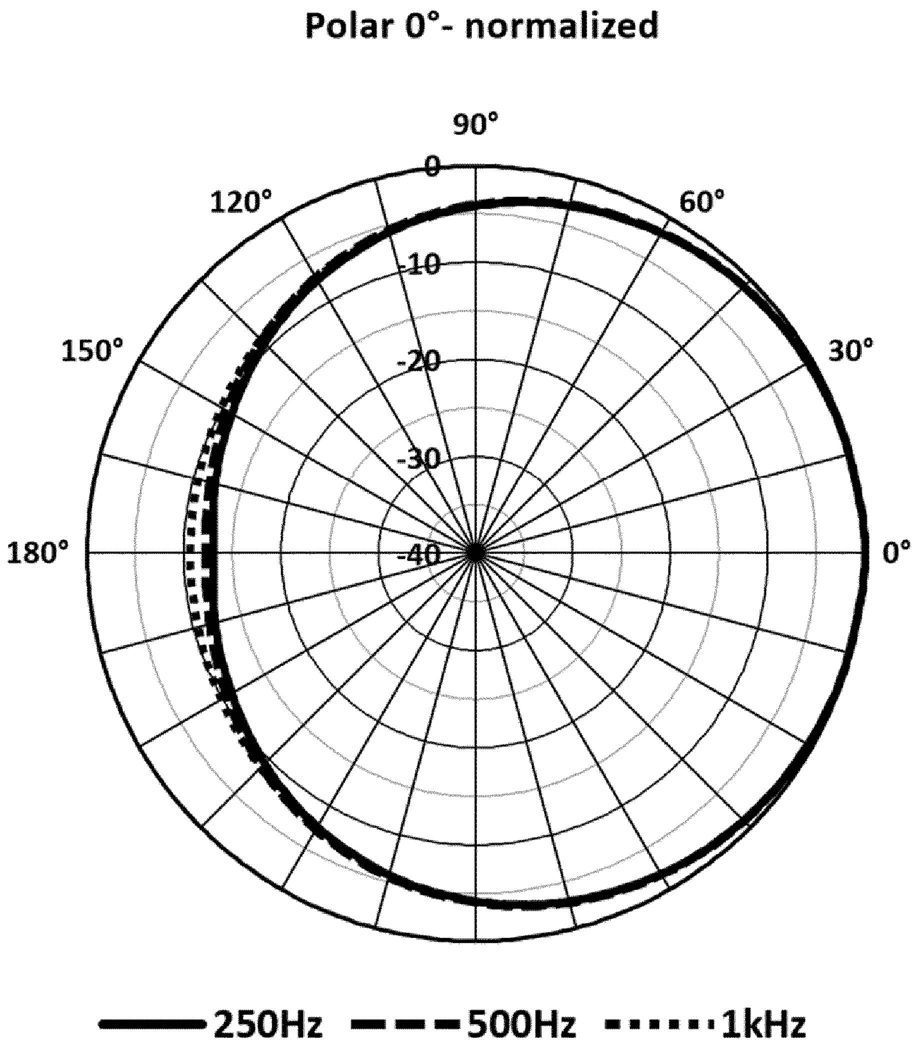

FIG. 32 shows the ("closed shell") directivity performance of the experimental loudspeaker 900 where the self-supporting shell was formed from a portion of non-porous material with very high specific airflow resistance, i.e. $R_s\rightarrow\infty$ Pa·s/m. The non-porous material used to obtain the results shown in FIG. 32 was a hard plastic (a printed shell from a PC-ABS type of plastic). As shown in FIG. 33, the loudspeaker having a non-porous self-supporting shell with $R_s\rightarrow\infty$ Pa·s/m provided very little directivity, with directivity index 0.7 dB at 250 Hz, 0.9 dB at 500 Hz, and 1.3 dB at 1 kHz.

FIG. 33 shows the directivity performance of the experimental loudspeaker 900 where the self-supporting shell was formed from a portion of porous material with $R_s\approx3600$ Pa·s/m. The porous material used to obtain the results shown in FIG. 32 was paper with $R_s\approx3600$ Pa·s/m. The actual time delay calculated for this experimental loudspeaker was calculated as $\Delta T_r$(actual)=0.16 ms, as compared with $\Delta T_r$ (target)=0.08 ms. As shown in FIG. 33, the loudspeaker having a self-supporting porous shell with $R_s \approx 3600$ Pa·s/m provided directional behaviour, albeit with subcardioid performance, due to the relatively high value of $R_s$ (and mismatch in actual time delay vs target time delay), but nevertheless demonstrated useful directivity with directivity index 3.8 dB at 250 Hz, 3.6 dB at 500 Hz, and 3.7 dB at 1 kHz. It is believed (e.g. based on the experimental results shown in FIGS. 8*a-d* as described in the Annex) that further improved directional behaviour, e.g. cardioid performance, could be obtained with this self-supporting shell, were corrugations introduced to increase the surface area, or if the self-supporting shell were formed from a more porous material having a lower value of $R_s$. Here we note for completeness that the frequencies here are the centre frequencies of the respective octave bands, i.e. the results shown here are obtained by averaging the SPL from the different frequencies present in the respective octave band, meaning the 250 Hz octave band contains frequencies from 177 Hz to 354 Hz, the 500 Hz octave band=354 Hz to 707 Hz, the 1 kHz octave band=707 Hz to 1414 Hz.

Figure 34:
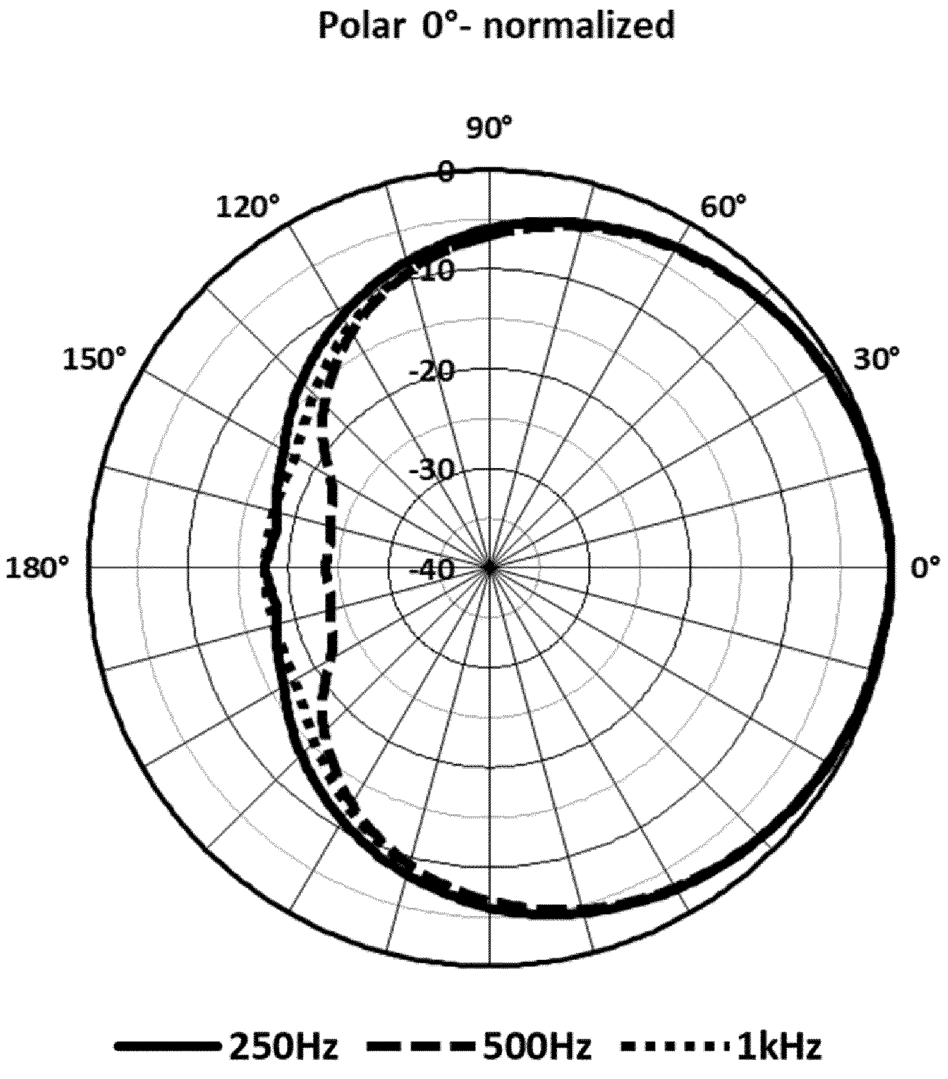

FIG. 34 shows the directivity performance of the experimental loudspeaker 900 where the self-supporting shell was formed from a portion of porous material with $R_s \approx 2300$ Pa·s/m. The porous material used to obtain the results shown in FIG. 34 was paper with $R_s \approx 2300$ Pa·s/m. The time delay calculated for this loudspeaker was $\Delta T_r$(actual)=0.10 ms, as compared with $\Delta T_r$ (target)=0.08 ms. As shown in FIG. 34, the loudspeaker having a self-supporting porous shell with $R_s \approx 2300$ Pa·s/m provided improved directional behaviour with improved cardioid performance, due to the lower value of $R_s$ and time delay $\Delta T_r$ being closer to the target time delay (0.08 ms). The directivity indexes were 5.0 dB at 250 Hz, 5.3 dB at 500 Hz, and 5.2 dB at 1 kHz.

Figure 35:
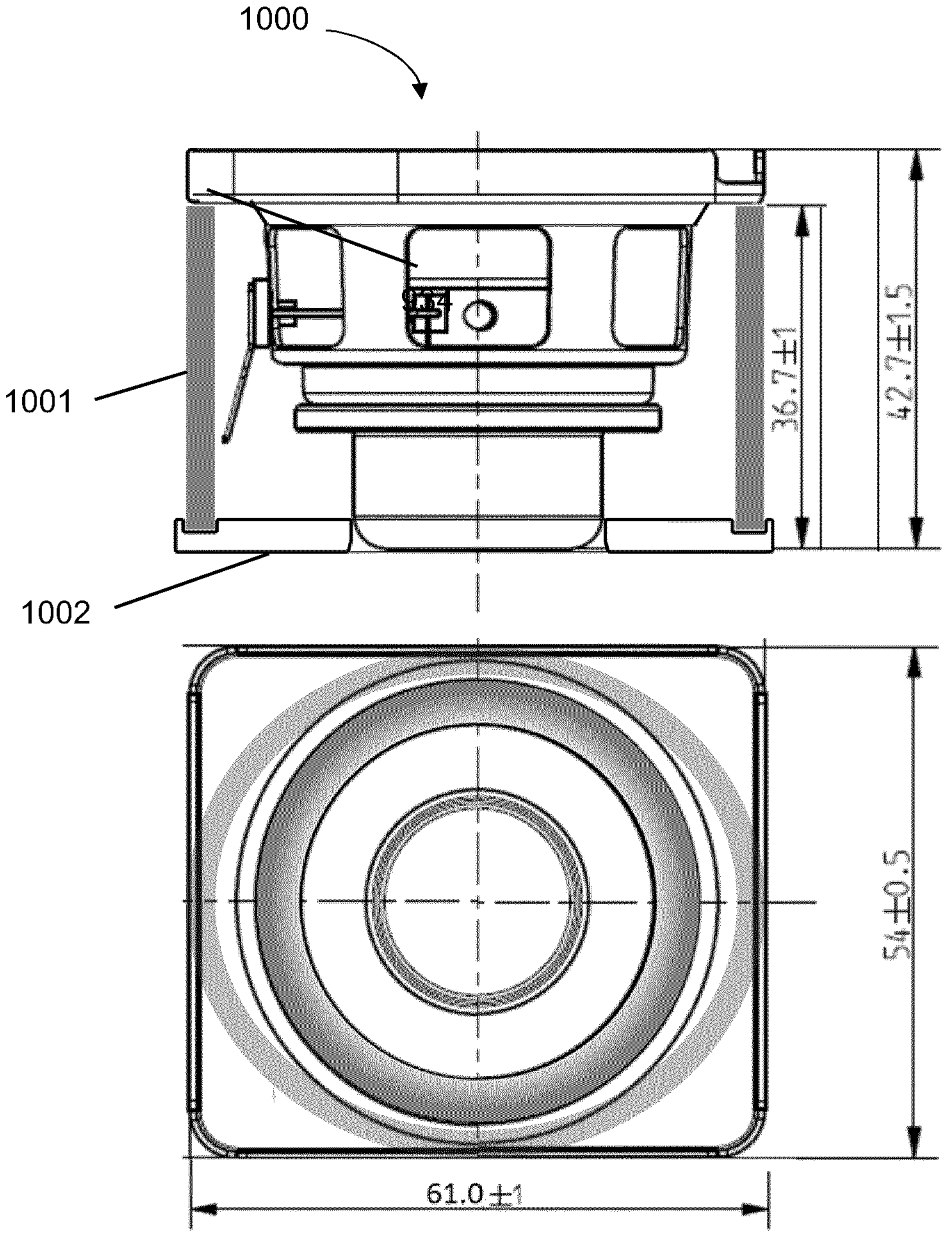

FIG. 35 illustrates a side view and a top view of an experimental loudspeaker 1000 used for additional tests. The experimental loudspeaker 1000 incudes a shell comprises regions of self-supporting porous material 1001 attached to a rigid plastic bottom plate 1002 to form a cylindrical self-supporting shell. The loudspeaker has impedance Re=3.4Ω, resonance frequency Fs=210 Hz, effective surface area Sd=14 $cm^2$, moving mass Mms=1.4 g, magnetic field strength BL=2.9 Tm, compliance Cms=0.4 mm/N, and Q-factor Qms=4.0.

The self-supporting porous material 1001 of the experimental speaker 1000 was felt with $R_s \approx 1300$ Pa·s/m which was glued in place to the loudspeaker frame and rigid bottom plate 1002 to form the cylindrical self-supporting shell. The effective inner radius of the self-supporting shell was 2.575 cm and the effective height was 3.4 cm. Accordingly, the effective volume V=60 $cm^3$, the surface area S=55 $cm^3$ $\Delta T_r$ (target)=0.09 ms, and $\Delta T_r$ (actual)=0.10 ms.

Figure 36:
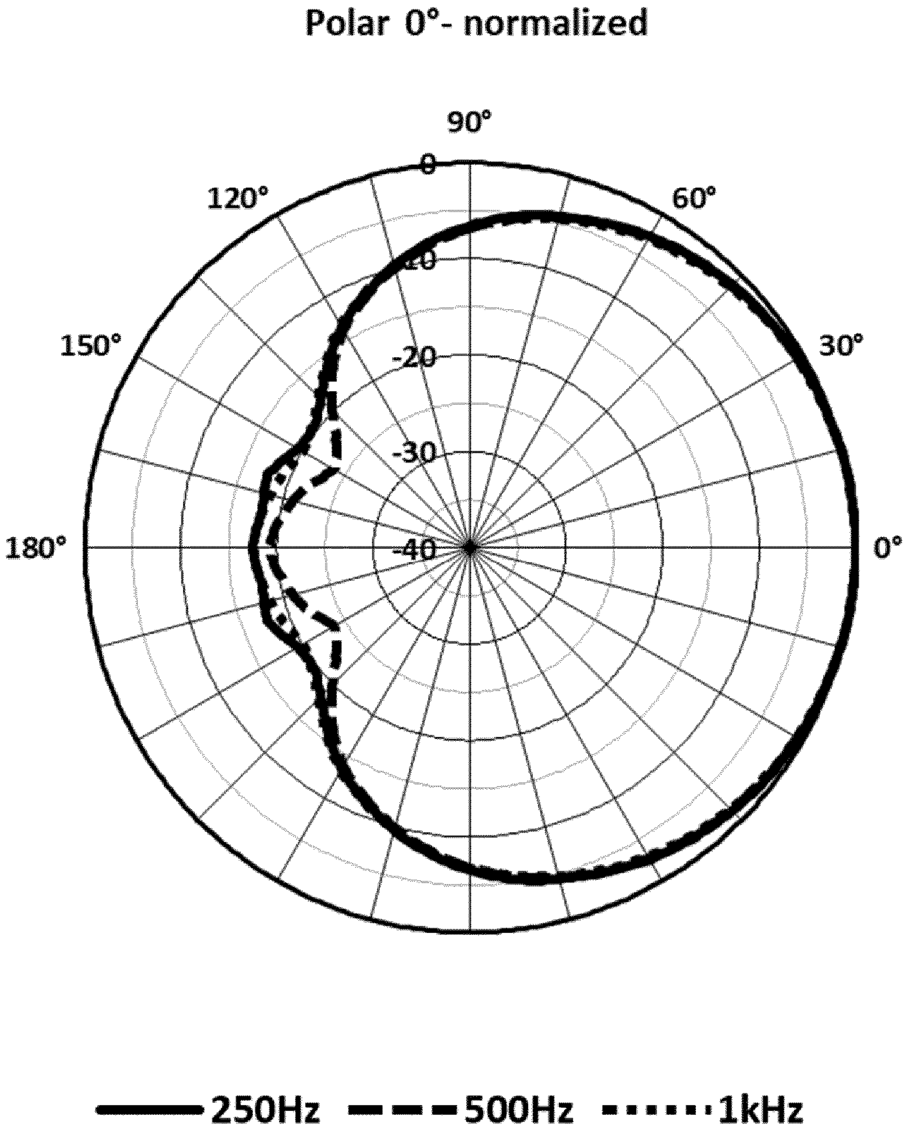

FIG. 36 shows the directivity performance of the experimental loudspeaker 1000 of FIG. 35. As shown in FIG. 36, the loudspeaker having a self-supporting porous shell with $R_s \approx 1300$ Pa·s/m provided directional behaviour with improved cardioid performance, due, it is thought, to the lower value of $R_s$ and $\Delta T_r$(actual) being closer to $\Delta T_r$ (target), and the directivity indexes were 5.1 dB at 250 Hz, 5.2 dB at 500 Hz, and 5.3 dB at 1 kHz.

Figure 37A:
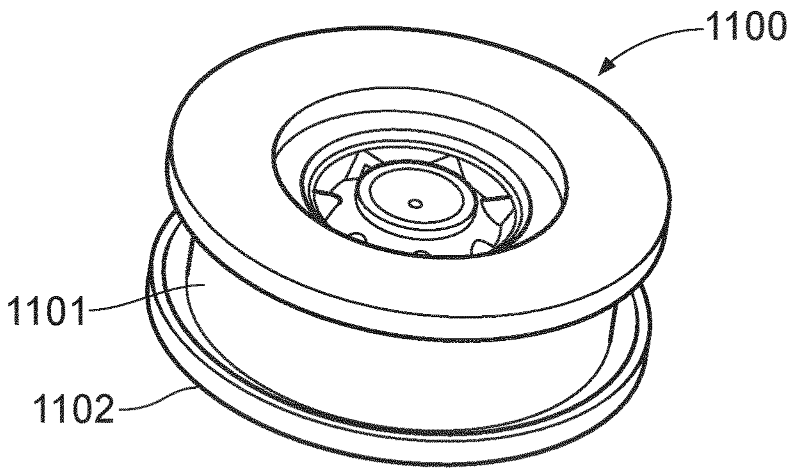
Figure 37B:
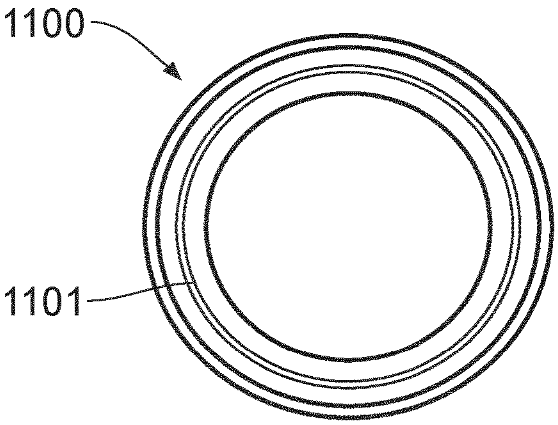
Figure 37C:
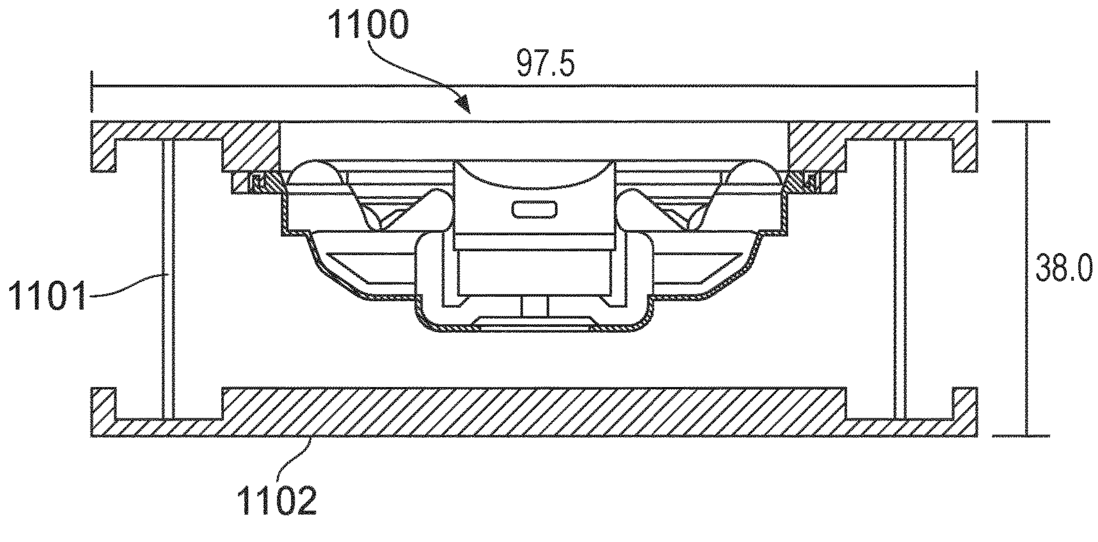

FIGS. 37*a-c* show a perspective view, a plan view, and a cross-sectional view of another experimental loudspeaker 1100. The experimental loudspeaker 1100 incudes a shell comprises regions of self-supporting porous material 1101 attached to a rigid plastic bottom plate 1102 to form a cylindrical self-supporting shell. The loudspeaker has impedance Re=3.80, resonance frequency Fs=145 Hz, effective surface area Sd=19.6 $cm^2$, moving mass Mms=2.0 g, magnetic field strength BL=2.1 Tm, compliance Cms=0.6 mm/N, and Q-factor Qms=4.2.

In this example, the self-supporting porous material 1101 was made of paper with $R_s \approx 4000$ Pa·s/m which was glued in place to the loudspeaker frame and rigid bottom plate 2002. The effective inner radius of the self-supporting shell was 4.25 cm and the effective height was 3.0 cm. Accordingly, the effective volume V=120 $cm^3$, the surface area S=80 $cm^3$, $\Delta T_r$ (target)=0.16 ms, and $\Delta T_r$ (actual)=0.43 ms.

Figure 38A:
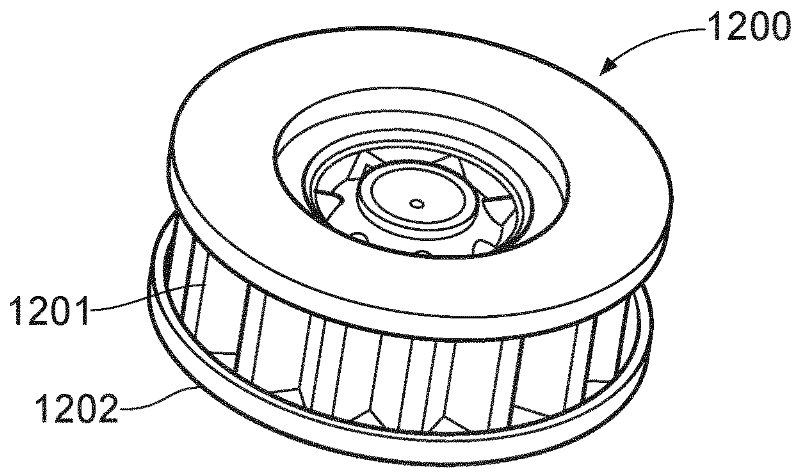
Figure 38B:
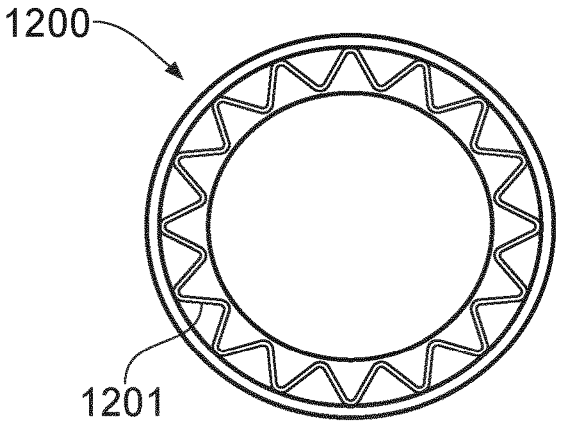
Figure 38C:
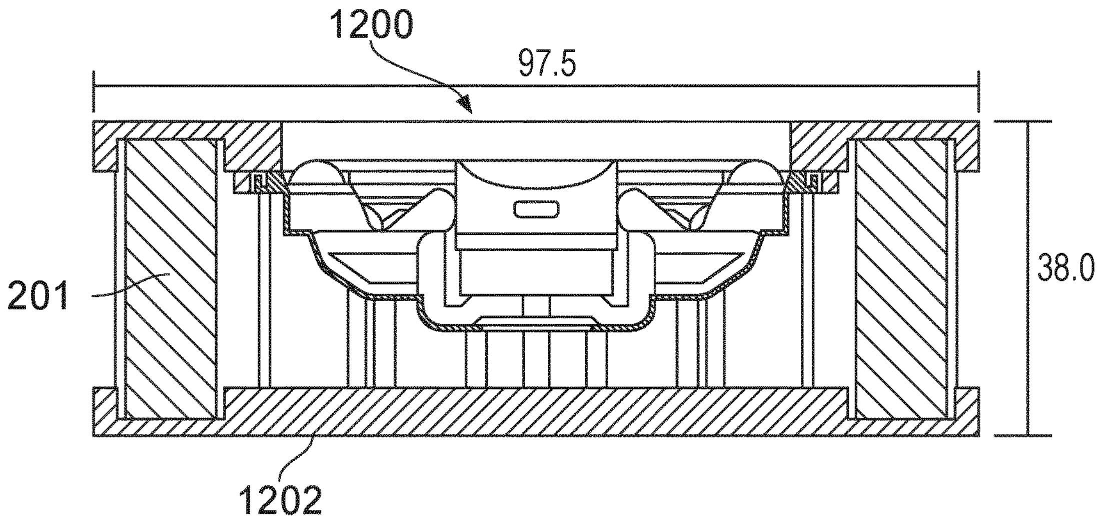

FIGS. 38*a-c* show a perspective view, a plan view, and a cross-sectional view of another experimental loudspeaker 1200 having a cylindrical self-supporting shell comprising regions of self-supporting porous material 1201 attached to a rigid plastic bottom plate 1202. However, in this example the self-supporting porous material 1201 is made of paper which has been folded to form pleats. The loudspeaker inside the self-supporting shell has the same parameters as the loudspeaker from FIGS. 37*a-c*. As described below in relation to FIGS. 40*a-b* and FIGS. 41*a-b* two different experimental loudspeakers were constructed in this way with different values for $R_s$ and different numbers of folds.

Figure 39A:
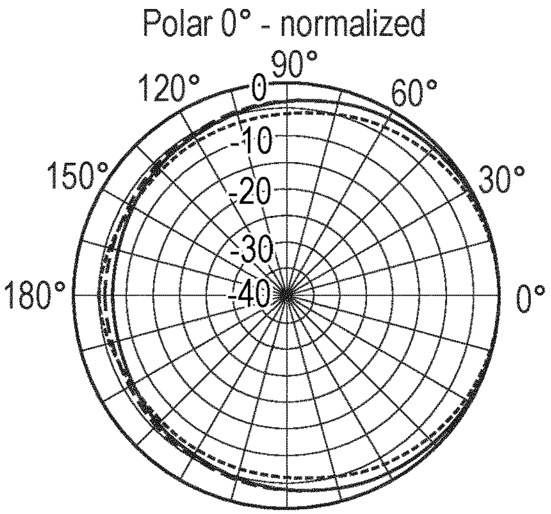

FIG. 39*a* shows the directivity performance of the experimental loudspeaker 1100 of FIGS. 37*a-c* as measured using a prototype. As shown in FIG. 36, the loudspeaker having a self-supporting paper porous shell with $R_s \approx 4000$ Pa·s/m provided some directional behaviour albeit with limited cardioid performance, due to the higher value of $R_s$ and $\Delta T_r$(actual) relatively different to $\Delta T_r$ (target). The directivity indexes from the measured results of FIG. 39*a* are 3.0 dB at 250 Hz, 2.7 dB at 500 Hz, and 4.1 dB at 1 kHz.

Figure 39B:
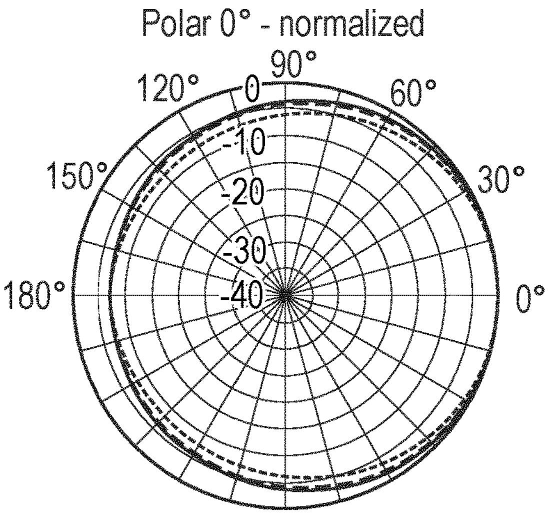

FIG. 39*b* shows the directivity performance obtained from a simulation of the experimental loudspeaker 1100 from FIGS. 37*a-c*. The directivity indexes from the simulated results of FIG. 39*b* are 2.8 dB at 250 Hz, 3.0 dB at 500 Hz, and 4.2 dB at 1 kHz. As can be seen from the comparison of FIG. 39*a* and FIG. 39*b*, and the directivity indices, the simulated results (FIG. 39*b*) are similar to the measured results (FIG. 39*a*) for the loudspeaker 2000 of FIGS. 37*a-c*.

Figure 40A:
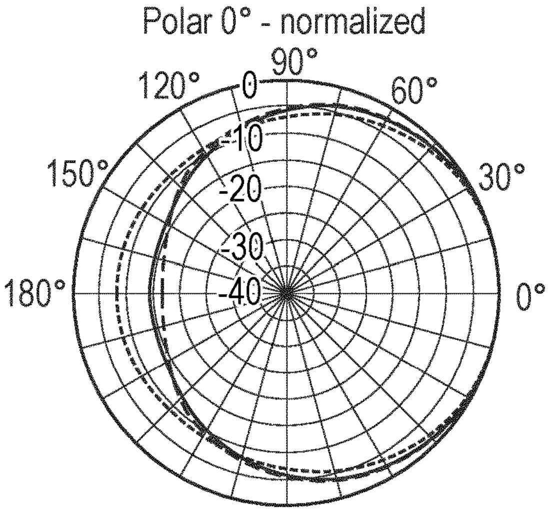

FIG. 40*a* shows the directivity performance of the experimental loudspeaker 1200 of FIGS. 38*a-c* where the self-supporting porous material was made from paper with specific air resistivity $R_s \approx 4000$ Pa·s/m. The paper was 0.9 mm thick and folded into 27 folds so that there were 54 faces of paper 9 mm deep and 54 corners 1.8 mm wide. The pleated paper is represented by the shaded region 1201 shown in FIG. 38*c*. Accordingly, the effective volume V=120 $cm^3$, the surface area S=175 $cm^3$, $\Delta T_r$(target)=0.21 ms, and $\Delta T_r$(actual)=0.16 ms. The directivity indexes from the measured results of FIG. 40*a* are 4.8 dB at 250 Hz, 4.7 dB at 500 Hz, and 5.4 dB at 1 kHz.

Figure 40B:
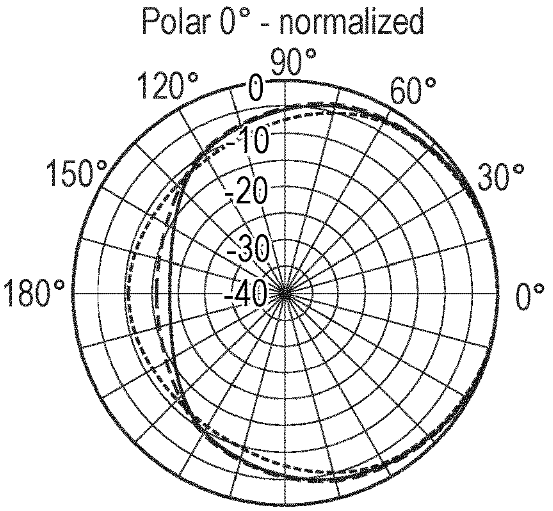

FIG. 40*b* shows the directivity performance obtained from a simulation of the experimental loudspeaker 3000 of FIG. 40*a*. In order to practically model the experimental loudspeaker with 27 folds in the porous material, the simulated loudspeaker was approximated using a lower value of surface area S. To maintain a similar $\Delta T_r$(actual) to the prototype loudspeaker, the specific air resistivity of the porous material was also reduced to compensate for the lower value of S according to the following:

$$\Delta T_R(actual) \propto \frac{R_s}{S_r} = \frac{4000}{175} \cong \frac{1800}{80}$$

The directivity indexes from the simulated results were 4.5 dB at 250 Hz, 4.7 dB at 500 Hz, and 5.4 dB at 1 kHz. Therefore, as can be seen from the comparison of FIG. 40*a* and FIG. 40*b* the simulated results are similar to the measured results for this loudspeaker.

Figure 41A:
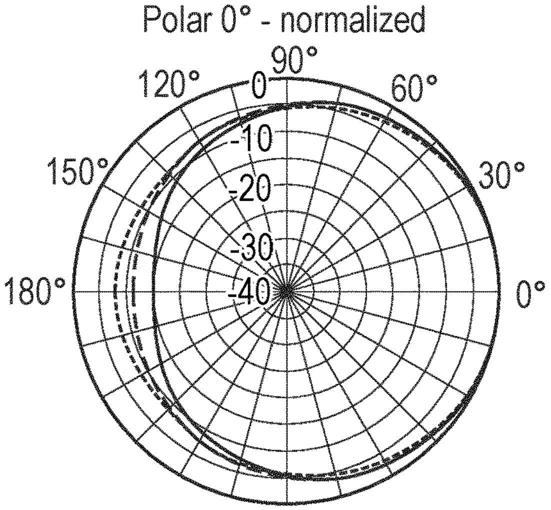

The measured and simulated results of FIG. 40*a*, FIG. 40*b* demonstrate that the experimental loudspeaker having folds in the porous material displayed more directional behaviour than the experimental loudspeaker of FIG. 37*a-c* which did not have folds in the porous material By contrast, FIG. 41*a* shows the directivity performance of the experimental loudspeaker 1200 of FIGS. 38*a-c* where the self-supporting porous material was made from paper with a much higher specific air resistivity $R_s \approx 11400$ Pa·s/m. The paper for this experiment was also folded much more tightly than the paper which led to the results of FIGS. 40*a-b*. The paper was 0.5 mm thick and folded into 75 folds so that there were 150 faces of paper 7 mm deep and 150 corners 1 mm wide. The effective volume V=120 $cm^3$, the surface area S=360 $cm^3$, $\Delta T_r$(target)=0.16 ms, and $\Delta T_r$(actual)=0.27 ms.

As shown in FIG. 41*a* this experimental loudspeaker displayed less directional behaviour than the results of FIG. 40*a-b* owing to the larger value for $R_s$ and difference between the $\Delta T_r$(actual) and $\Delta T_r$(target). However, some directional performance and cardioid behaviour can be seen showing that providing folds in the paper can provide a means to compensate for a very large value of $R_s$ in terms of cardioid performance. The directivity indexes from the measured results of FIG. 41*a* are 4.0 dB at 250 Hz, 3.7 dB at 500 Hz, and 4.5 dB at 1 kHz.

Figure 41B:
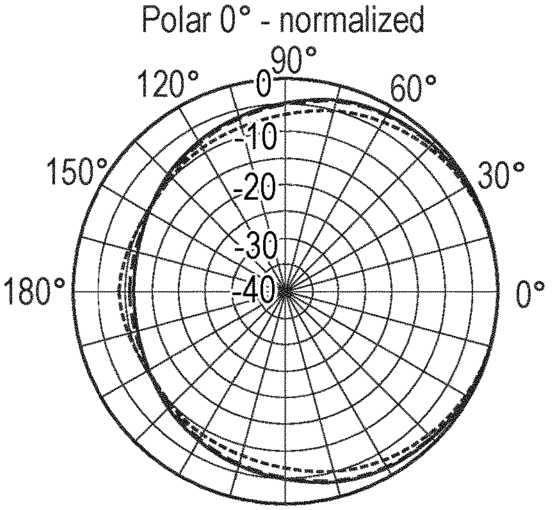

FIG. 41*b* shows the directivity performance obtained from a simulation of the experimental loudspeaker 1200 of FIG. 41*a*. Similarly, to the simulation for FIG. 40*b* the surface area S and specific air resistivity $R_s$ of the porous material were proportionately reduced in the simulation according to the following equation to make modelling of the loudspeaker more practical and less computer intensive.

$$\Delta T_R \propto \frac{R_s}{S_r} = \frac{1140}{360} \cong \frac{2500}{80}$$

The directivity indexes from the simulated results were 3.7 dB at 250 Hz, 3.9 dB at 500 Hz, and 4.9 dB at 1 kHz. As can be seen from the comparison of FIG. 41*a* and FIG. 41*b* the simulated results are similar to the measured results for this loudspeaker. The measured and simulated results of FIGS. 41 *a-b* demonstrate that providing folds in the self-supporting porous material can help to compensate for a high specific air resistivity $R_s$ of that porous material.

Figure 42A:
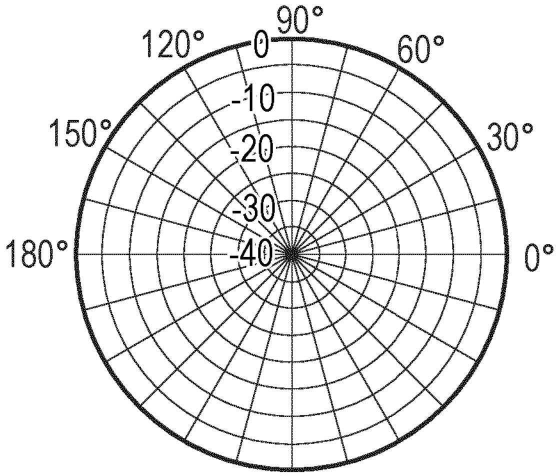
FIGS. 42*a-c* shows theoretical directivity performance of a monopole loudspeaker, a dipole loudspeaker and a cardioid loudspeaker.
Figure 42B:
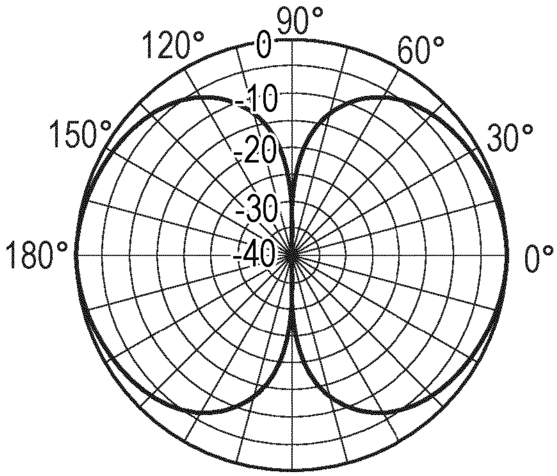
Figure 42C:
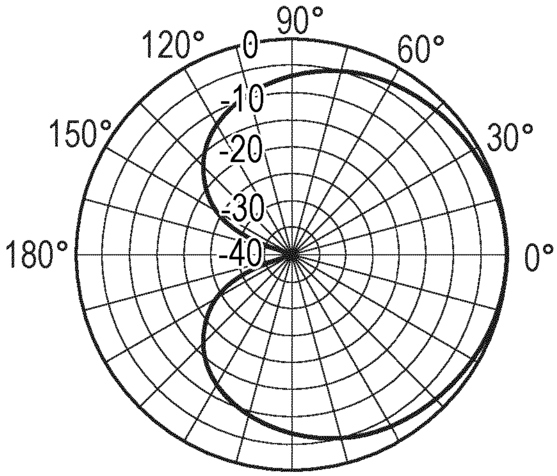

FIGS. 42*a-c* shows theoretical directivity performance of a monopole loudspeaker (FIG. 42*a*: monopole=1), a dipole loudspeaker (FIG. 42*b*: dipole=cos (α)) and a cardioid loudspeaker (FIG. 42*c*: cardioid=0.5+0.5·cos (α)).

With reference to FIG. 42*a*, the monopole loudspeaker radiates sound which is even in volume and in-phase in all directions (for example as seen for a loudspeaker with a self-supporting shell with $R_s \to \infty$ Pa·s/m). Hence, the resulting sound has a relative magnitude of 1 a predetermined distance from the diaphragm in all directions. With reference to FIG. 42*b*, the 360° directivity of the dipole loudspeaker behaves according the cosine function cos(a) (for example as seen for a loudspeaker with a self-supporting shell with $R_s \to 0$ Pa·s/m), where a is the radiating direction in degrees.

Thus, the resulting sound has an in-phase lobe and an out-of-phase lobe wherein there is cancellation of sound between these lobes at α=900 and α=270°.

With reference to FIG. 42*c*, summing equal amounts (50%) of the monopole and dipole components in all directions results in theoretical cardioid performance, wherein the magnitude of the sound a given distance from the loudspeaker is given by 0.5+0.5 cos(α). This is because the in-phase lobe of the dipole component sums to 1 (at α=0°) while the out-of-phase lobe cancels (sums to 0) with the monopole component (at α=180°). As shown in FIG. 42*c*, the cardioid loudspeaker has good directional performance in the front facing direction (i.e. at 0°). Without wishing to be bound by theory, such performance can be obtained by setting a monopole time delay $\Delta T_r$ (which, in accordance with the equation provided above, is influenced by Rs, V and S of the self-supporting shell) to closely match the dipole pathlength (influenced by size of the diaphragm and the baffle) such that close to equal amounts of monopole and dipole components are summed in all directions resulting in more cardioid like performance and better performance of the loudspeaker in terms of directionality.

CONCLUDING STATEMENTS

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

ISO 9053-1:2018 published October 2018
ISO 266:1997 published March 1997
"Dynamical Measurement of the Effective Radiating area SD", Klippel GmbH
Acoustics, Beranek, L. L, McGraw-Hill, 1954
Thiele, A. N., "Loudspeakers in Vented Boxes, Parts I and II", *J. Audio Eng. Soc.*, vol. 19, pp. 382-392 (May 1971); pp. 471-483 (June 1971).
Small, R. H., "Direct-Radiator Loudspeaker System Analysis", *J. Audio Eng. Soc.*, vol. 20, pp. 383-395 (June 1972).
"Fabric solutions for Acoustic devices and components" (Sefar) https://www.sefar.com/en/609/Product-Finder/Filter-Components/Acoustic/Fabric-solutions-for-Acoustic-devices-and-components.pdf?Folder=6916771
"Product News-Acousstex HD" (Saati) http://www.saati.com/sites/default/files/elemento-download/ACOUSTEX%20HD_4.pdf
WO2019/121266
WO2019/192808
WO2019/192816
WO2020/126847
WO2020/239766
WO2020/234316
WO2020/234317

Annex—Extracts from PCT/EP2021/056561

This Annex contains extracts from PCT/EP2021/056561, which are included as relevant background to the present invention.

SUMMARY

In a first aspect, the present Annex provides:

A loudspeaker including:

- a diaphragm having a first radiating surface and a second radiating surface, wherein the first radiating surface and the second radiating surface are located on opposite faces of the diaphragm;
- a drive unit configured to move the diaphragm based on an electrical signal;
- a loudspeaker support structure, wherein the diaphragm is suspended from the loudspeaker support structure via one or more loudspeaker suspension elements;
- wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material.

A loudspeaker having such properties has been found by the present inventors to be capable of delivering sound in a mid-high frequency range (e.g. 300 Hz-3 kHz) that is highly directional, whilst suppressing blowing noises that might otherwise be distracting for a user whose ear(s) are located at a listening position that is near to the loudspeaker, e.g. as might be the case when the loudspeaker is mounted in a headrest.

The loudspeaker may be configured for use with an ear of a user located at a listening position that is near to the loudspeaker. For example, the loudspeaker may be configured for use with an ear of a user located at a listening position that is 50 cm or less (more preferably 40 cm or less, more preferably 30 cm or less, more preferably 25 cm or less, more preferably 20 cm or less, more preferably 15 cm or less) from the first radiating surface of the diaphragm.

The loudspeaker may be configured to be mounted in a seat assembly, e.g. by being mounted in a headrest included in a seat assembly (e.g. as discussed in connection with the second aspect of the invention, below). The seat assembly may be configured for use in a vehicle. Mounting the loudspeaker in a seat assembly is one way in which the loudspeaker could be configured for user with an ear of a user located at a listening position that is near to the loudspeaker, e.g. as described above.

Specific airflow resistance reflects the air resistance per surface area of a material, and is independent of thickness (two pieces of material having different thicknesses may have the same specific airflow resistance). The specific airflow resistance of the region of porous material may be measured in accordance with ISO 9053.

ISO 9053 sets out standard methods (Method A or Method B) for conducting airflow measurements to measure Airflow Resistance—R [Pa·s/m$^3$], Specific Airflow Resistance—Rs [Pa·s/m], and Airflow Resistivity—r [Pa·s/m$^2$] for a material sample having a given surface area (S) and thickness (t). Such measurements are discussed in more detail in WO2020/234317 (under the heading "Airflow resistance measurements").

In some cases, the one or more regions of porous material have a specific airflow resistance in the range 300-4000 Pa·s/m.

Preferably, the one or more regions of porous material have a specific airflow resistance in the range 500-3000 Pa·s/m. As can be seen from the experimental data below, this has range has been found especially preferable to provide sound in a mid-high frequency range (e.g. 300 Hz-3 kHz) that is highly directional, whilst suppressing blowing noises.

A skilled person would appreciate that useful embodiments can be found across the full range of specific airflow resistance values referred to above, albeit other elements of the loudspeaker would need to be adapted accordingly. For example, at the lower end of the range of specific airflow resistance values (e.g. 300 or 500 Pa·s/m), the enclosed volume of the supporting structure and the surface area of porous material would need to be small enough to avoid the loudspeaker acting as a dipole (see FIG. 8*a*, below). At the upper end of the range of specific airflow resistance values (e.g. 3000 or 5000 Pa·s/m), the enclosed volume of the supporting structure and the surface area of porous material would need to be large enough to avoid the loudspeaker acting as a closed box (see FIG. 8*d*, below) The loudspeaker support structure preferably includes a rigid frame from which the diaphragm is suspended via one or more loudspeaker suspension elements.

The one or more regions of porous material may be formed by a material having a specific airflow resistance in an above-stated range (e.g. 300-5000 Pa·s/m, or 500-3000 Pa·s/m) which covers one or more openings in the rigid structure.

Preferably, the magnet unit is directly attached to, or forms at least part of, the rigid frame from which the diaphragm is suspended via one or more loudspeaker suspension elements.

Examples in which the magnet unit forms at least part of the rigid frame from which the diaphragm is suspended are particularly preferred, as it helps ensure a compact loudspeaker, which is advantageous where the loudspeaker is to be mounted in a headrest.

In examples in which the magnet unit forms at least part of, the rigid frame from which the diaphragm is suspended, one or more (of the one or more) regions of porous material may be formed by a material having a specific airflow resistance in an above-stated range (e.g. 300-5000 Pa·s/m, or 500-3000 Pa·s/m) which covers one or more openings in the magnet unit.

The volume enclosed by the loudspeaker support structure is preferably at least 5 $cm^3$, more preferably at least 8 $cm^3$, more preferably at least 10 $cm^3$, and in some examples could be 20 $cm^3$ or more. This is significantly more than the volume typically enclosed by a headphone loudspeaker, for example.

The volume enclosed by the loudspeaker support structure is preferably less than 5 litres, more preferably less than 1 litre, more preferably less than 100 $cm^3$. This is significantly less than the volume typically enclosed by the loudspeakers typically used in pro-audio applications, such as that shown in FIG. 2*b*, for example.

The effective radiating area of the diaphragm $S_D$ may be in the range 5 $cm^2$-50 $cm^2$.

As is known in the art, for a diaphragm having a circular perimeter which is suspended from a loudspeaker support structure by a roll suspension having an outer diameter $d_o$ and an inner diameter $d_i$, the effective radiating area of the diaphragm may be estimated as $$S_D = \pi\left(\frac{d}{2}\right)^2,$$

where d is the half-diameter of the roll suspension $(d_o+d_i)/2$.

Alternatively, or for more complex diaphragm geometries, the effective radiating area of the diaphragm $S_D$ could be measured using known techniques, see e.g. "Dynamical Measurement of the Effective Radiating area SD", Klippel GmbH (https://www.klippel.de/fileadmin/klippel/Files/Know_How/Application_Notes/AN_32_Effective_Radiation_Area.pdf).

Preferably, the surface area of the one or more regions of porous material (combined surface area, if there are multiple regions) is at least 80% of the effective radiating area of the diaphragm $S_D$, more preferably at least 100% of the effective radiating area of the diaphragm $S_D$, more preferably at least 200% of the effective radiating area of the diaphragm $S_D$. In some cases, the surface area of the one or more regions of porous material could be 500% or more of the effective radiating area of the diaphragm $S_D$. Having a larger surface area of the one or more regions of porous material helps to reduce blowing noises.

From the above considerations, it can be seen that for a loudspeaker suitable for mounting in a headrest, the surface area of the one or more regions of porous material (combined surface area, if there are multiple regions) may be in the range 10 $cm^2$ to 250 $cm^2$, and in some cases may be in the range 10 $cm^2$ to 100 $cm^2$.

The loudspeaker is preferably a mid-high frequency loudspeaker configured to produce sound across a designated frequency band. The designated frequency band may include at least 500 Hz-2 kHz, more preferably 300 Hz-3 kHz, in some cases the designated frequency band may include 300 Hz-20 kHz, or even 150 Hz to 20 kHz.

The drive unit may be an electromagnetic drive unit that includes a magnet unit configured to produce a magnetic field in an air gap, and a voice coil attached to the diaphragm (typically via an intermediary coupling element, such as a voice coil former). In use, the voice coil may be energized (have a current passed through it based on the electrical signal) to produce a magnetic field which interacts with the magnetic field produced by the magnet unit and which causes the voice coil (and therefore the diaphragm) to move relative to the magnet unit along a principal axis of the loudspeaker. The magnet unit may include a permanent magnet. The voice coil may be configured to sit in the air gap when the diaphragm is at rest. Such drive units are well known.

The resonance frequency of the loudspeaker may be in the range 150 Hz to 500 Hz. Such resonance frequencies are desirable for a mid-high frequency loudspeaker as defined above.

The magnet unit may have a magnetic flux density in the air gap in the range 0.1 T to 0.5 T. This is weaker than would be required for far-field applications, but as can be seen from the discussions below, can provide a loudspeaker having a smooth frequency response at small listening distances.

Preferably, the loudspeaker has a Qes (electrical Q factor) that is 5 or more, more preferably more than 10. This defines a "weak" motor which, as can be seen from the experimental data below, can be beneficial for a loudspeaker used in close proximity to the ear of a user.

Preferably, the loudspeaker has a Qms (mechanical Q factor) that is 2 or less. This defines the damping provided by the one or more regions of porous material (plus contributions from other damping elements) which, as can be seen from the experimental data below, can be beneficial for a loudspeaker used in close proximity to the ear of a user.

Qes and Qms are well-defined parameters for characterizing a loudspeaker that are well-known in the art, and defined for example in the well-known papers by Thiele ("Loudspeakers in Vented Boxes, Parts I and II") and Small, R. H. ("Direct-Radiator Loudspeaker System Analysis").

Another known parameter is Qts (total Q factor) which is calculated as:

$$Qts = (Qms \times Qes)/(Qms + Qes)$$

The directivity of a loudspeaker can be defined via the following parameters, as defined in Acoustics, Beranek, L. L, McGraw-Hill, 1954:

Directivity factor Q(f): This is the ratio of the intensity on a designated axis of a sound radiator at a stated distance r to the intensity that would be produced at the same position by point source if it were radiating the same total acoustic power as the radiator.

Directivity index DI(f: This is expressed in dB as a value of the expression DI=10 log(Q).

Preferably a loudspeaker according to the first aspect of the Annex has a directivity index within a designated frequency band (e.g. as defined above, e.g. 300 Hz-3 kHz)

that is 3 dB or more, more preferably 3.5 dB or more, more preferably 4 dB or more. In some cases, the directivity index within a designated frequency band (e.g. as defined above, e.g. 300 Hz-3 kHz) may be 4.8 dB or more. The directivity index may be measured at a listening distance (distance to source) of 1 meter.

A perfect theoretical cardioid has a directivity index of 4.8 dB so a directivity index of 3 dB or more, or 4 dB or more, is a significantly directional loudspeaker. Here, we note for completeness that a loudspeaker can be more directional than a perfect theoretical cardioid and thus have a directivity index of substantially more than 4.8 dB, e.g. as shown in the experimental data of FIGS. 16 and 17 discussed below—such loudspeakers may be referred to as having "hyper cardioid" directivity. A loudspeaker would typically have a directivity index above 4.8 dB when the diaphragm becomes large compared with the wavelength.

A loudspeaker with a directivity index of around 4.8 dB (corresponding to a perfect theoretical cardioid) within a designated frequency band (e.g. as defined above, e.g. 300 Hz-3 kHz) may be preferred in some cases.

Figure 16:
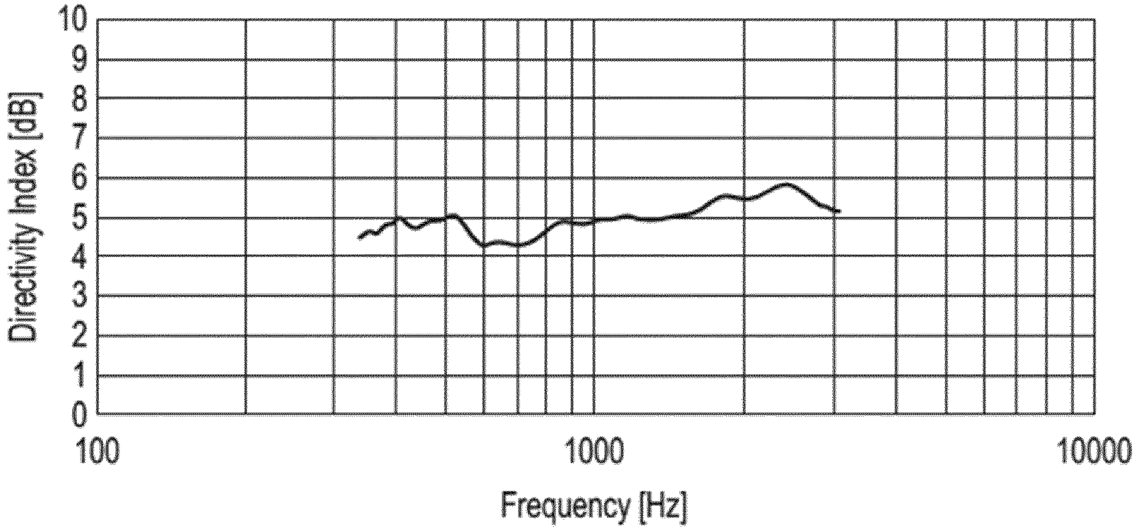
Figure 17:
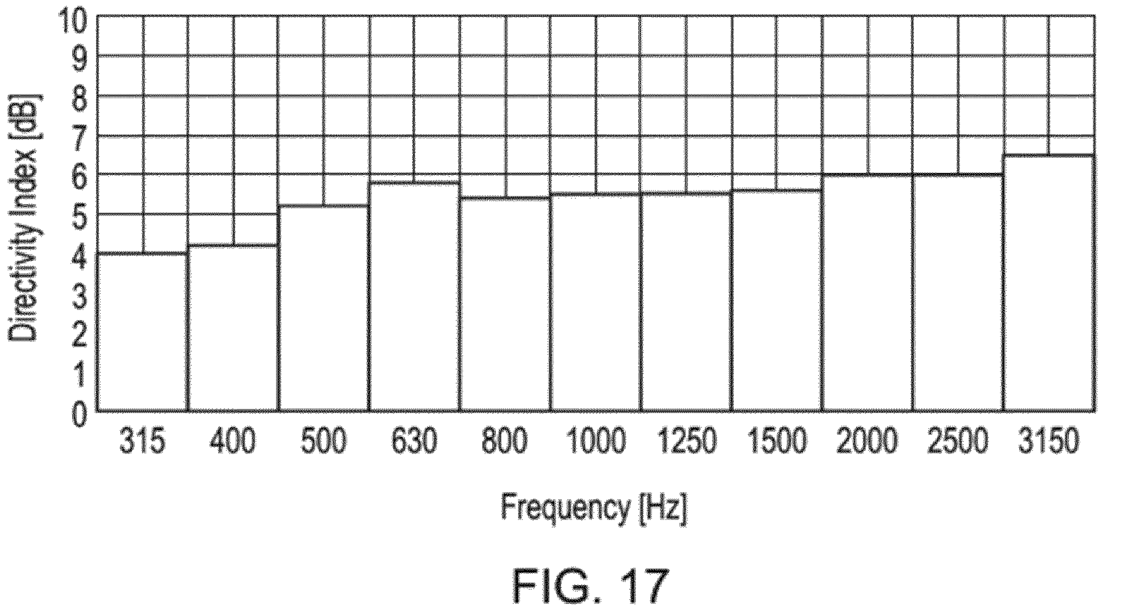

For avoidance of any doubt, the loudspeaker could have a glitch that causes the directivity index to drop below 4 dB at some single frequency within the designated frequency band (e.g. where a circumference of the loudspeaker support structure is in the range of the wavelength) whilst still being above 4 dB for substantially the entire designated frequency band. To avoid such glitches, the directivity index of the loudspeaker could be measured at the "standard" centre frequencies within the designated frequency band for ⅓$^{rd}$ octave bands as shown in FIG. 17 below, preferably in accordance with ISO 266 (which would mean measuring the directivity index at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the directivity index of the loudspeaker could be measured across the full designated frequency band with a ⅓rd octave smoothing as shown in FIG. 16 below.

Nonetheless, it is preferable for the loudspeaker to have a directivity index within a designated frequency band (e.g. as defined above, e.g. 300 Hz-3 kHz) that is above 4 dB for the entire designated frequency band (with no glitches).

Preferably, a loudspeaker according to the first aspect of the Annex has, within a designated frequency band (e.g. as defined above, e.g. 300 Hz-3 kHz), an SPL (sound pressure level) measured on a principal radiating axis that is at least 6 dB higher than the SPL measured at the same listening distance (distance to source) at 180° to the principal radiating axis, for substantially the entire designated frequency band. In other words, a rearwards facing lobe (SPL positioned 180°) should be at least −6 dB relative to a forwards facing lobe over the designated frequency band. For these measurements, the SPL may be measured at a listening distance of 1 meter.

For avoidance of any doubt, the loudspeaker could have a glitch that causes the SPL difference (on principal axis vs 180° to the principal radiating axis) to drop below 6 dB at some single frequency within the designated frequency band whilst still being at least 6 dB for substantially the entire designated frequency band. To avoid such glitches, the SPL values of the loudspeaker could be measured at the "standard" centre frequencies within the designated frequency band for ⅓$^{rd}$ octave bands, preferably in accordance with ISO 266 (which would mean measuring the SPL values at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the SPL values could be measured across the full designated frequency band with a ⅓$^{rd}$ octave smoothing.

Nonetheless, it is preferable for the loudspeaker to have, within a designated frequency band (e.g. as defined above, e.g. 300 Hz-3 kHz), an SPL measured on a principal radiating axis that is at least 6 dB higher than the SPL measured at the same listening distance at 180° to the principal radiating axis, for the entire designated frequency band. (with no glitches).

Preferably, the loudspeaker has a directivity index within a designated frequency band (e.g. as defined above, e.g. 300 Hz-3 kHz) that is 4 dB or more for substantially the entire designated frequency band AND has within that designated frequency band, an SPL measured on a principal radiating axis that is at least 6 dB higher than the SPL measured at the same listening distance at 180° to the principal radiating axis, for substantially the entire designated frequency band.

A second aspect of the Annex may provide a seat assembly including one or more loudspeakers according to the first aspect of the Annex.

The seat assembly may include a headrest, with the one or more loudspeakers being mounted in the headrest of the seat assembly. In some examples, the headrest may be removable from the remainder of the seat assembly. In other examples, the headrest may be integral with the remainder of the seat assembly. In some seats (e.g. shell seats for cars) the headrest can be integral with the remainder of the seat such that it is unclear where the backrest ends and the headrest starts.

The one or more loudspeakers being mounted in a headrest of a seat assembly is not a requirement of the Annex since, for example, the one or more loudspeakers could be mounted in a seat assembly without a headrest, or could be mounted in a part of the seat assembly that is not a headrest (e.g. a backrest of the seat, e.g. an upper portion of such a backrest).

The seat assembly is preferably configured to allow sound produced by the first radiating surface of the/each loudspeaker according to the first aspect of the Annex to propagate out of the seat assembly, e.g. via open or acoustically transparent portions.

Similarly, the seat assembly is preferably configured to allow sound produced by the second radiating surface of the/each loudspeaker according to the first aspect of the Annex to propagate out of the headrest, e.g. via open or acoustically transparent portions.

The seat assembly may include:

- a first loudspeaker according to the first aspect of the Annex, wherein the first loudspeaker is located within the headrest for use with a first ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the first loudspeaker;
- a second loudspeaker according to the first aspect of the Annex, wherein the second loudspeaker is located within the headrest for use with a second ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the second loudspeaker.

The seat assembly may include one or more additional loudspeakers.

For example, the seat assembly may include one or more bass loudspeakers for producing sound at bass frequencies. Bass frequencies may include frequencies across the range 60-80 Hz, more preferably frequencies across the range 50-100 Hz, more preferably frequencies across the range 40-100 Hz. In some cases, the bass loudspeaker may additionally be for producing sound at higher frequencies than stated here, e.g. up to (or even beyond) 250 Hz, or 300 Hz. This may be useful if the loudspeaker(s) according to the first aspect of the Annex is not good at producing sound below such frequencies.

Example loudspeakers which may be used as bass loudspeakers within the seat assembly are described, for example, in in WO2019/121266, WO2019/192808, WO2019/192816, WO2020/234316, WO2020/234317. Further disclosures relevant to providing a suitable bass loudspeaker are also disclosed in WO2020/126847 and WO2020/239766.

If the seat assembly includes one or more bass loudspeakers, then the loudspeakers according to the first aspect of the Annex may be used as mid-high frequency units, e.g. operating over a frequency band that includes 300 Hz-3 kHz, more preferably 300 Hz-20 kHz.

If the seat assembly does not include one or more bass loudspeakers, then the loudspeakers according to the first aspect of the Annex may be used as full-range frequency units (albeit within potentially limited low-frequency capability), e.g. operating over a frequency band that includes 60 Hz-3 kHz, more preferably 60 Hz-20 kHz.

A headrest of the seat assembly (if present, see above) may have a rigid headrest frame, e.g. including one or more mounting pins for mounting and rigidly attaching the headrest frame to a rigid seat frame as described below (such mounting pins are conventional in car headrests, where typically two mounting pins are used). The loudspeaker support structure of the/each loudspeaker according to the first aspect of the Annex may be part of or fixedly attached to the rigid headrest frame.

Preferably, the seat assembly is configured to position a user who is sat down in a seat portion of the seat assembly such that an ear of the user is located at a listening position as described above.

Preferably, the seat assembly is configured to position a user who is sat down in a seat portion of the seat assembly such that a first ear of the user is located at a first listening position as described above whilst a second ear of the same user is located at a second listening position as described above.

The seat assembly may have a rigid seat frame. The loudspeaker support structure of the/each loudspeaker according to the first aspect of the Annex may be part of or fixedly attached to the rigid seat frame.

The seat assembly may be configured for use in a vehicle such as a car (in which case the seat assembly may be referred to as a "car seat") or an aeroplane (in which case the seat assembly may be referred to as a "plane seat").

The seat assembly could be a seat for use outside of a vehicle. For example, the seat assembly could be configured for use at home, e.g. as a seat for use with computer games, a seat for use in studio monitoring or home entertainment.

In a third aspect, the present Annex may provide a headrest as defined above in connection with a seat assembly according to the second aspect of the Annex (without requiring any other aspect of the seat assembly). The headrest may be configured to be mounted in a seat assembly, e.g. a seat assembly according to the second aspect of the Annex.

In a fourth aspect, the present Annex may provide a vehicle (e.g. a car or an aeroplane) having a plurality of seat assemblies according to the second aspect of the Annex.

The Annex includes the combination of the aspects and preferred features described except where such a combination is clearly impermissible or expressly avoided.

DETAILED DESCRIPTION

Aspects and embodiments of the present Annex will now be discussed with reference to the accompanying figures. Further aspects and embodiments will be apparent to those skilled in the art. All documents mentioned in this text are incorporated herein by reference.

The present inventors perceive there is a need for a loudspeaker for which the ratio between radiated energy on axis to total radiated energy is as high as possible. When used close to the ear of a listener, e.g. when incorporated into a car headrest, such a loudspeaker may allow for increased listening levels per user (passenger) with an increased distance between the user ears and the loudspeakers associated with their car seat, without disturbing other occupants of the car cabin. It is furthermore desirable that aforementioned ratio of on-axis to off-axis energy radiation is as high as possible over a wide frequency range, especially in the speech band between 300 Hz to 3 kHz where the human ear is very sensitive.

The loudspeaker may be capable reproducing frequencies above and below this classic speech band, e.g. working as a Mid-High unit up to 20 kHz, and would ideally have some low-mid capability down to 100 Hz. To extend the frequency range below the working range it could be combined with a bass (low frequency reproduction) loudspeaker.

It is furthermore desirable that the loudspeaker is compact, can be operated without the need for an additional back-volume and the adverse effects associated with an additional back-volume (and additional back-volume is an additional enclosed volume outside of the loudspeaker support structure, which causes the increased resonance frequency and overshoot of the transfer function as discussed above in relation to a classic closed box design).

It is also desirable that the loudspeaker is capable of being used for loud music playback (in a case where all occupants of the car are listening to the same music and mutual disturbance is no issue) yet remain low cost for mass market applications.

As can be seen from the background discussion above, despite there being existing loudspeaker technologies configured to increase the directivity index of a loudspeaker, all suffer significant drawbacks in the context of them being used in a headrest.

The loudspeakers described herein are intended for use in near-field listening, e.g. with the ear of a user located at a listening position that is 50 cm or less (more preferably 40 cm or less, more preferably 30 cm or less, more preferably 25 cm or less, more preferably 20 cm or less, more preferably 15 cm or less) from the first radiating surface of a diaphragm included in the loudspeaker. The loudspeakers may be used, for example, in a headrest.

Figure 3A:
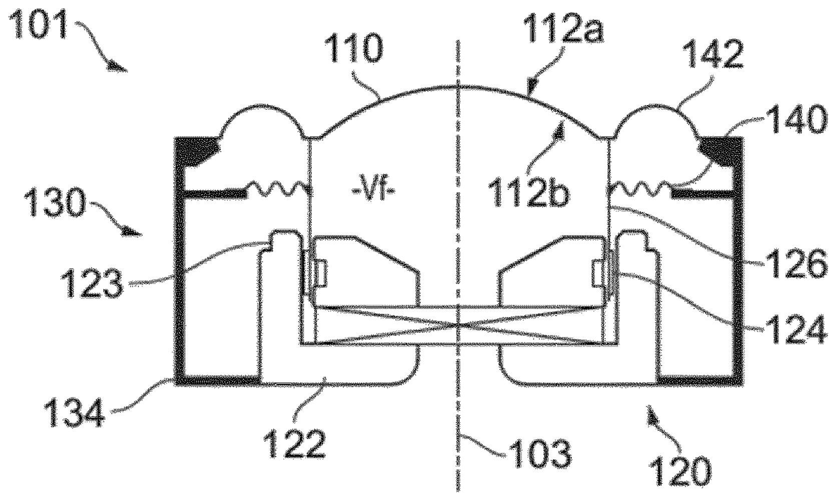
FIGS. 3*a-c* show a first loudspeaker, as described in the Annex (below).
Figure 3B:
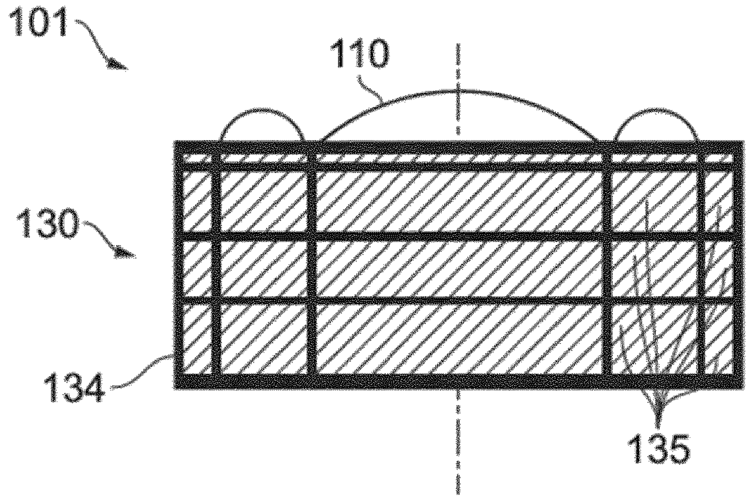
Figure 3C:
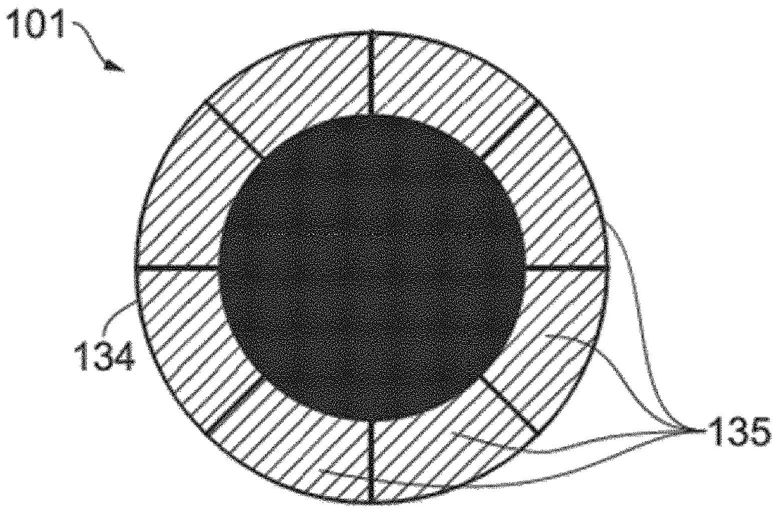

FIGS. 3*a*-*c* show a first loudspeaker 101 according to the present disclosure, with FIG. 3*a* showing a cross-section through the first loudspeaker 101 (side view), FIG. 3*b* showing the exterior of the first loudspeaker 101 (side view), and FIG. 3*c* showing the underside of the first loudspeaker 101 (bottom view).

The loudspeaker 101 includes a diaphragm 110 having a first (forward-facing) radiating surface 112*a* and a second (backward-facing) radiating surface 112*b*, wherein the first radiating surface 112*a* and the second radiating surface 112*b* are located on opposite faces of the diaphragm 110.

The loudspeaker 101 also includes a drive unit 120 configured to move the diaphragm 110 based on an electrical signal.

The drive unit 120 is an electromagnetic drive unit that includes a magnet unit 122 configured to produce a magnetic field in an air gap, and a voice coil 124 attached to the diaphragm 110 via an intermediary coupling element, in this case a voice coil former 126. In use, the voice coil 124 may be energized (have a current passed through it based on the electrical signal) to produce a magnetic field which interacts with the magnetic field produced by the magnet unit 122 and which causes the voice coil 124 (and therefore the diaphragm 110) to move relative to the magnet unit along a principal axis 103 of the loudspeaker 101.

The loudspeaker 101 also includes a loudspeaker support structure 130, wherein the diaphragm 110 is suspended from the loudspeaker support structure 130 via one or more loudspeaker suspension elements 140, 142. The loudspeaker suspension elements 140, 142 are configured to cause the voice coil to sit in the air gap when the diaphragm is at rest. In this example, the loudspeaker suspension elements are a spider 140, and a roll suspension 142.

Together, the diaphragm 110, the voice coil 124 and voice coil former 126 form a 'moving' assembly.

Together, the magnet unit 122 and loudspeaker support structure 130 form a 'non-moving' assembly.

The loudspeaker support structure 130 encloses a volume Vf configured to receive sound produced by the second radiating surface 112*b* of the diaphragm 110.

The first radiating surface 112*a* of the diaphragm 110 is configured to produce sound which is directed out from the loudspeaker 101.

In this example, the loudspeaker support structure 130 includes multiple regions 135 of porous material having a specific airflow resistance in the range 300-5000 Pa·s/m, wherein the regions 135 of porous material are configured to allow sound produced by the second radiating surface 112*b* to exit the volume Vf enclosed by the loudspeaker support structure 130 via the one or more regions 135 of porous material.

The regions 135 of porous material have a specific airflow resistance in the range 300-5000 Pa·s/m, more preferably in the range 500-3000 Pa·s/m.

In this example, the loudspeaker support structure 130 includes a rigid frame 134 from which the diaphragm 110 is suspended via the loudspeaker suspension elements 140, 142. In this example, the magnet unit 122 is directly attached to the rigid frame 134 (rather than, for example, being attached to a cabinet to which the rigid frame 134 is attached). The rigid frame 134 has a generally thin and acoustically transparent mechanical structure, and connects the moving and non-moving assemblies.

In this example, the regions 135 of porous material are formed by a material having a specific airflow resistance in an above-stated range (e.g. 300-5000 Pa·s/m or 500-3000 Pa·s/m) which covers one or more openings in the rigid frame 134.

In this case, the material covering the one or more openings in the rigid frame 134 is a tightly woven cloth having a specific airflow resistance in an above-stated range. The cloth could cover the openings in a variety of ways, as would be understood by a skilled person. For example, the cloth could be ultrasonically welded to the rigid frame 134 (which may e.g. be made of plastic), the rigid frame 134 may be made by overmoulding plastic over the cloth. Heat staking and gluing, with the cloth being inside or outside the rigid frame 134 are all options.

A key difference between the first loudspeaker 101 shown in FIGS. 3*a-c* and a conventional loudspeaker is that the loudspeaker support structure 130 encloses an unusually large volume, in this example ~26 $cm^3$, and has an unusually large external surface area, for the effective radiating area of the diaphragm 110 (and for the chosen magnet unit size), and is covered by the material having a specific airflow resistance in an above-stated range.

The larger volume Vf enclosed by the supporting structure 130 of the first loudspeaker 101 shown in FIGS. 3*a-c* can be visualised by the indent 123 in the magnet unit 122 which was included for use in fixing the magnet unit 122 to a conventional (smaller) frame.

As can be seen from the discussion below, this combination of uncommonly large surface area of the loudspeaker support structure with regions of high flow resistance with respect to the effective radiating area of the diaphragm 110 leads to low flow velocities through the regions of high flow resistance whilst avoiding blowing noises that would be unpleasant for a user whose ear was near to the first radiating surface of the diaphragm 110. Moreover, the surface area of the regions of high flow resistance are chosen to obtain a desired tuning frequency to provide a desired cardioid radiation pattern, without getting blowing noises that would be unpleasant for a user whose ear was near to the first radiating surface of the diaphragm 110.

Figure 2A:
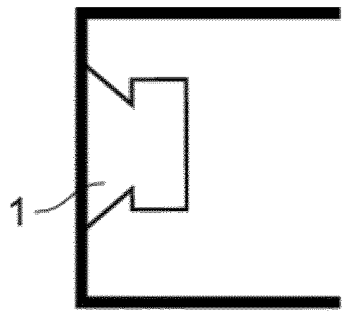
FIG. 2*a* illustrates a loudspeaker mounted without a cabinet, as described in the Annex (below).
Figure 2B:
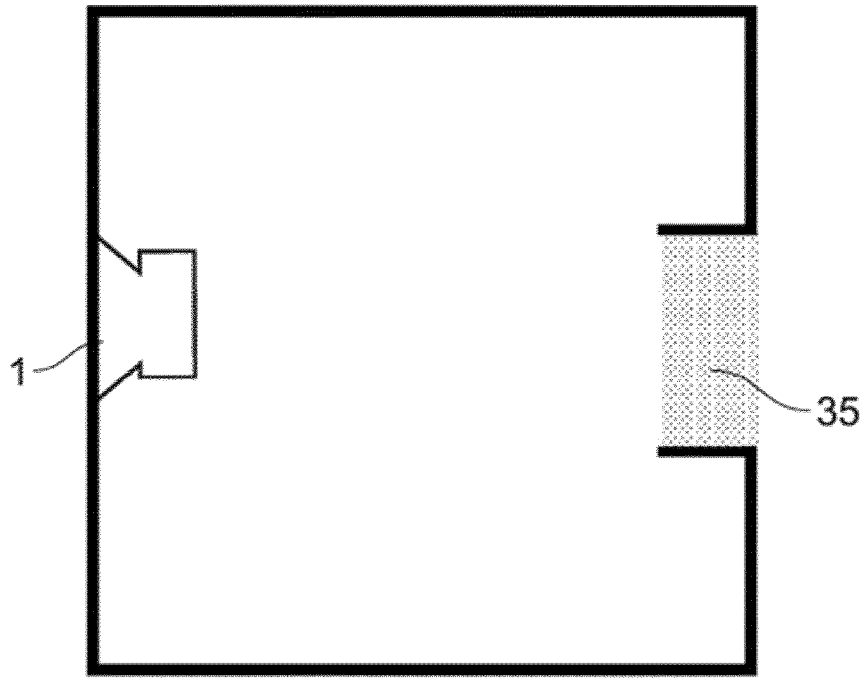
FIG. 2*b* illustrates a loudspeaker mounted in a cabinet with a defined leakage, as described in the Annex (below).

Note that a similar desired tuning frequency (and cardioid pattern) could be achieved with a small hole and low flow resistance, but this would result in unpleasant blowing noises, see e.g. FIG. 2*b* in which a small orifice with relatively low flow resistance produces blowing noises that would be unpleasant to a user were the users to sit close to the loudspeaker (but a user would not sit close to the loudspeaker shown in FIG. 2*b* because it is generally designed for far-field use).

The first loudspeaker 101 is preferably a mid-high frequency loudspeaker configured to produce sound across at least a designated frequency band.

Figure 4A:
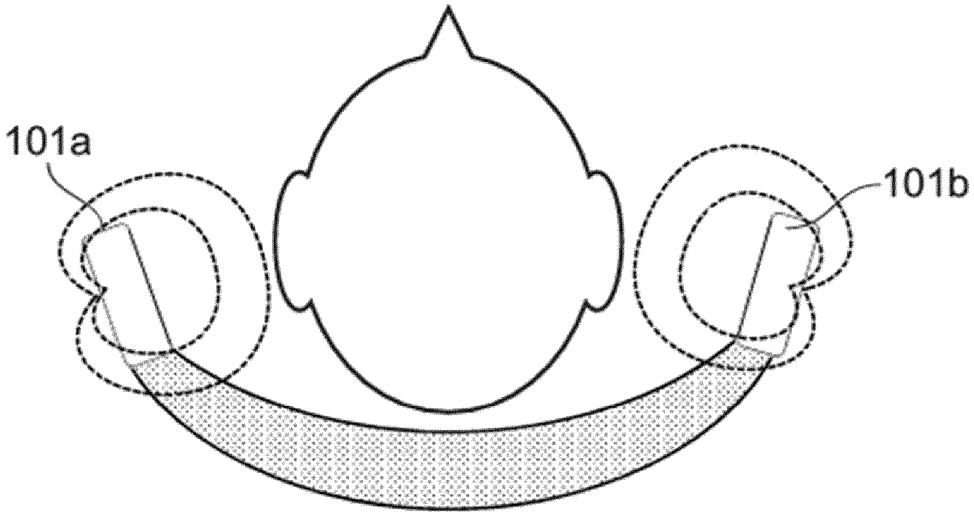
FIGS. 4*a-b* show example headrests including two of the first loudspeakers shown in FIGS. 3*a-c*, as described in the Annex (below).

FIG. 4*a* shows a first example headrest in which two of the first loudspeakers 101*a*, 101*b* are included. In this example, the first loudspeakers 101*a*, 101*b* are used as full-range loudspeakers (designated frequency band=100 Hz-20 kHz).

Figure 4B:
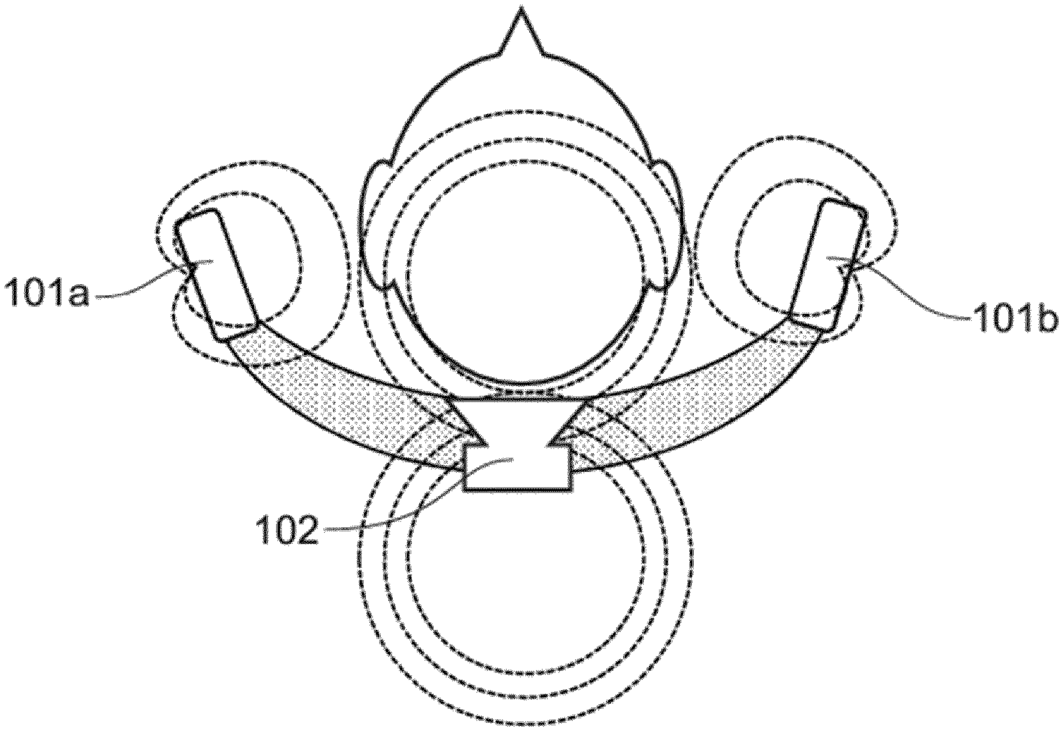

FIG. 4*b* shows a second example headrest in which two of the first loudspeakers 101*a*, 101*b* are included.

In this example, the first loudspeakers 101*a*, 101*b* are used as mid-high loudspeakers (designated frequency band=300 Hz-20 kHz).

In the example shown in FIG. 4*b*, the headrest includes one or more bass loudspeakers 102 (here one bass loudspeaker 102 is shown) for producing sound at bass frequencies, e.g. across the range 50-100 Hz. Example loudspeakers which may be used as the bass loudspeaker 102 within the headrest (or a seat including the headrest) are described, for example, in WO2019/121266, WO2019/192808, WO2019/192816, WO2020/234316, WO2020/234317, in which applications it has been shown that it can be beneficial for a bass loudspeaker incorporated into a headrest to operate as a dipole. Further disclosures relevant to providing a suitable bass loudspeaker are also disclosed in WO2020/126847 and WO2020/239766.

In the example headrests shown in FIGS. 4*a* and 4*b*, the first loudspeakers 101*a*, 101*b* are included in the forward-protruding wings of a car headrest. In these examples, the frames of the loudspeakers 101*a*, 101*b*, 102 may be rigidly attached for a headrest frame, which may itself be configured to be rigidly attached to the frame of a seat (not shown).

The example headrests shown in FIGS. 4*a* and 4*b* may be included in a seat assembly configured to position a user who is sat down in a seat portion of the seat assembly such that a first ear of the user is located at a first listening position as described above whilst a second ear of the same user is located at a second listening position as described above.

Figure 5:
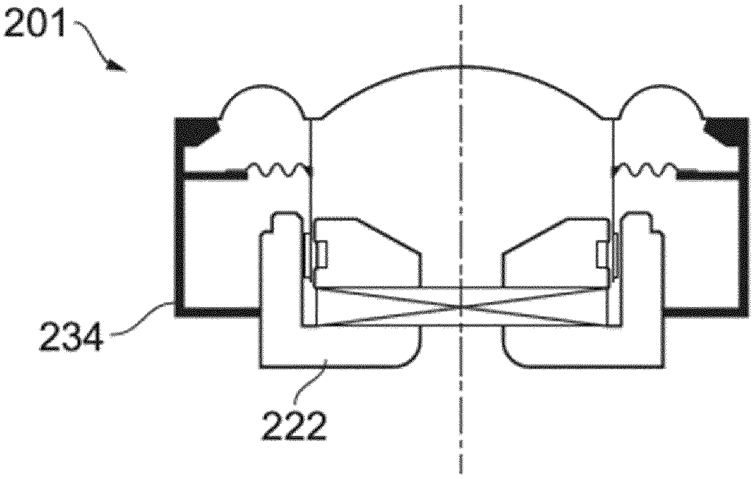
FIG. 5 shows a second loudspeaker, as described in the Annex (below).

FIG. 5 shows a second loudspeaker 201 according to the present disclosure, in cross-section (side view). Alike features corresponding to previous embodiments have been given alike reference numerals.

In the second loudspeaker 201 shown in FIG. 5, the magnet unit 222 protrudes out of the back of the rigid frame 234 (FIG. 5) allowing an increased volume Vf.

Figure 6:
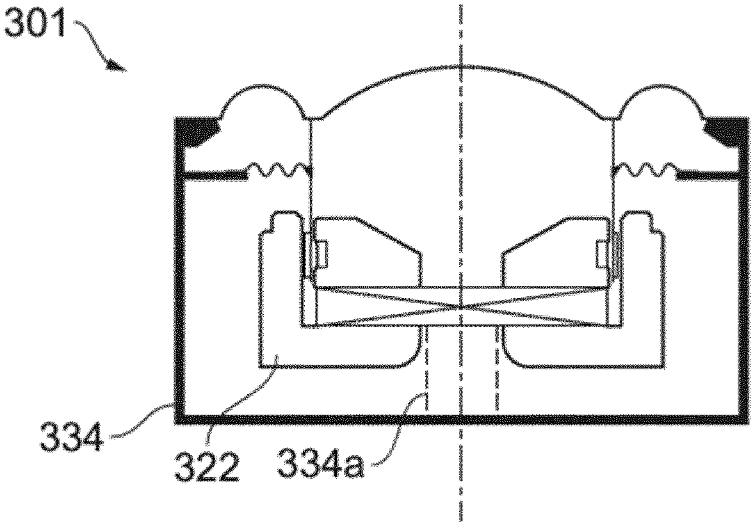
FIG. 6 shows a third loudspeaker, as described in the Annex (below).

FIG. 6 shows a third loudspeaker 301 according to the present disclosure, in cross-section (side view). Alike features corresponding to previous embodiments have been given alike reference numerals.

In the second loudspeaker 201 shown in FIG. 6, the magnet unit 322 is enclosed completely by the rigid frame 334, to allow for an increased surface area of porous material at the base of the loudspeaker. Here, the rigid frame 334 includes a portion 334*a* which holds the magnet unit rigidly in place above the base of the loudspeaker, to allow the base of the loudspeaker unit to include an increased surface area of porous material compared with the example shown in FIG. 3*c*.

Figure 7A:
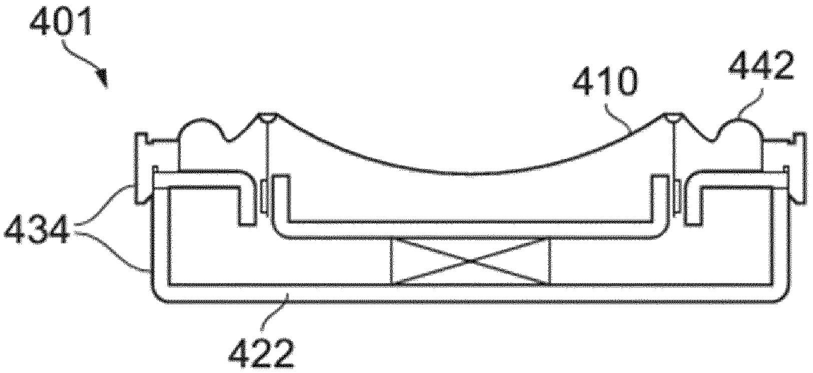
FIGS. 7*a-c* shows a fourth loudspeaker, as described in the Annex (below).
Figure 7B:
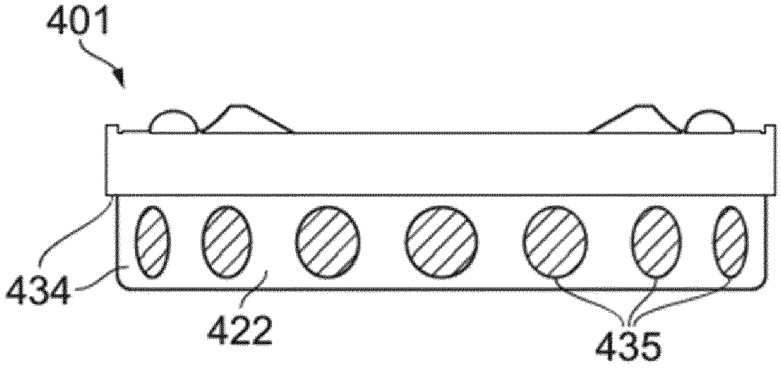
Figure 7C:
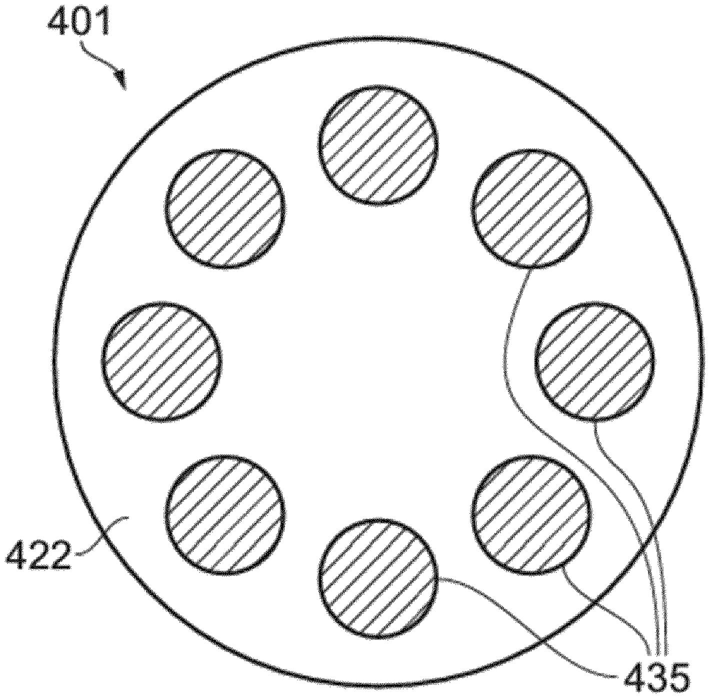

FIGS. 7*a-c* show a fourth loudspeaker 401 according to the present disclosure, with FIG. 7*a* showing a cross-section through the fourth loudspeaker 401 (side view), FIG. 7*b* showing the exterior of the fourth loudspeaker 401 (side view), and FIG. 7*c* showing the underside of the fourth loudspeaker 401 (bottom view). Alike features corresponding to previous embodiments have been given alike reference numerals.

In this example, the magnet unit 422 forms part of the rigid frame 434 from which the diaphragm is suspended via a loudspeaker suspension element 442 (in this example, the spider is omitted for compactness, but the roll suspension 442 is retained). In other words, the frame 434 and the magnet unit 422 are combined.

In this example, the regions 435 of porous material are formed by a material having a specific airflow resistance in an above-stated range (300-5000 Pa·s/m, or 500-3000 Pa·s/m) which covers one or more openings in the magnet unit 422 (note that in this example, the regions of porous material are shaded darker than the rigid frame, which is the opposite of the shading shown in previous figures).

In this example, the diaphragm 410 is chosen to have a low profile, and the volume Vf enclosed by the support structure 430 (the rigid frame 434, which in this example includes the magnet unit 422, covered by the material having the specific airflow resistance in an above-stated range) is ~10 $cm^3$, so this loudspeaker is more compact than that shown in FIGS. 3*a-c*, and the openings of porous material have a reduced surface area compared with the example shown in FIGS. 3*a-c*. Nonetheless, in view of the experimental data below, the present inventors believe that an adequate performance can nonetheless be obtained using such a loudspeaker.

In this example, the flux guiding components of the magnet unit 422 are made from a high permeability material such as soft iron with a cross-section that is large enough that the reluctance remains low despite the magnet unit having openings as described above. In this example, the openings in the magnet unit 422 are covered by the material from the inside, rather than the outside.

In the examples shown in FIGS. 3-7, the regions of porous material are formed by a cloth having a specific airflow resistance in an above-stated range, e.g. 300-5000 Pa·s/m or 500-3000 Pa·s/m, which covers one or more openings in a rigid frame.

The cloth is able to provide three functions: (i) to provide a defined mechanical resistance to allow for a magnet unit with high electrical Q; (ii) to provide a desired directivity (cardioid radiation pattern); and (iii) to prevent dust ingress into the interior volume of the loudspeaker, thereby decreasing the risk of debris in the airgap. In the case of the examples shown in FIGS. 3 and 6, the cloth also helps to protect the back of the loudspeaker.

Cloths having specific airflow resistances from about 5 Pa·s/m up to about 4000 Pa·s/m are commercially available in the field of acoustics, see for example:

- "Fabric solutions for Acoustic devices and components" (Sefar) [full reference below] which discloses the availability of cloths from 5 to 3300 Pa·s/m (noting that units of specific airflow resistance are provided in this disclosure in 'Rayl (MKS)' which is the same as Pa·s/m in SI units).
- "Product News—Acousstex HD" (Saati) [full reference below] which discloses the availability of cloths from 360 to 4000 Pa·s/m (noting that units of specific airflow resistance are provided in this disclosure in 'MKS Rayls' which is the same as Pa·s/m in SI units).

Typically such cloths are filter cloth formed of a very fine mesh.

Cloths having specific airflow resistances in the range 4000-5000 Pa·s/m are not common in the field of acoustics, but this is only because there is presently little commercial demand is for acoustic cloths in this range (the resulting flow is very low). However, such cloths are believed by the present inventor to be available for non-acoustic technical purposes, and in any case the present inventor believes it would be straightforward for a manufacturer of existing cloths to produce a cloth having specific airflow resistances in the range 4000-5000 Pa·s/m using existing techniques.

For completeness, we note that in existing automotive loudspeakers it is known to use a cloth, typically known as 'dust scrim', in order to decrease the risk of dust/debris entering in the airgap, and also to protect the back of the loudspeaker. Dust scrim usually has a very low specific airflow resistance, typically below 100 Pa·s/m, in order to provide acoustic transparency. Whereas for the examples shown in FIGS. 3-7, the cloths are chosen to have a generally higher specific airflow resistance (or a larger surface area) in order to provide a desired directivity (cardioid radiation pattern) without generating unpleasant blowing noises.

EXPERIMENTAL DATA

Unless otherwise stated, the following experimental results were obtained for a loudspeaker having:

- The structure of the first loudspeaker 101 shown in FIGS. 3*a-c* and described above, whose diaphragm had an effective radiating area $S_D$=8.8 cm2 (a radiating diameter of 3.4 cm), a volume Vf of 26 cm3.
- A depth (in the direction of the principle axis 103) of 20 mm An outer cloth diameter of 48 mm Regions of porous material having a defined specific airflow resistance (formed by a cloth covering openings in the rigid frame 134) having a combined surface area of 32 $cm^2$. This combined surface area is taken here to be the sum of the area of the cylindrical outer surface of the cloth covering the rigid frame 134 as shown in FIG. 3*b* plus the area of cloth covering the backward-facing annular opening around the magnet unit (flush with the back of the loudspeaker) as shown in FIG. 3*c*. Note that the thin legs of the rigid frame 134 which can be seen in FIGS. 3*b* and 3*c* have been neglected for this calculation. The defined specific airflow resistance of the cloth used in the experimental results discussed below was varied as described below.

A magnetic flux density in the airgap of 0.55 T (referred to herein as a "strong" magnet unit)

FIGS. 8*a* to 8*d* are simulation results showing the influence of the cloth specific airflow resistance on the radiation pattern, whereby the left side of these plots shows the radiation pattern for 100 Hz, 200 Hz, 400 Hz only, and the right side of these plots shows the radiation pattern for 800 Hz, 1600 Hz, 3150 Hz only. In reality, the left side plots would be mirrored onto the right side (since the radiation patter is rotationally symmetric around the 0° axis), and the right side plots would be mirrored onto the left side, but this is not shown here for clarity.

Figure 8A:
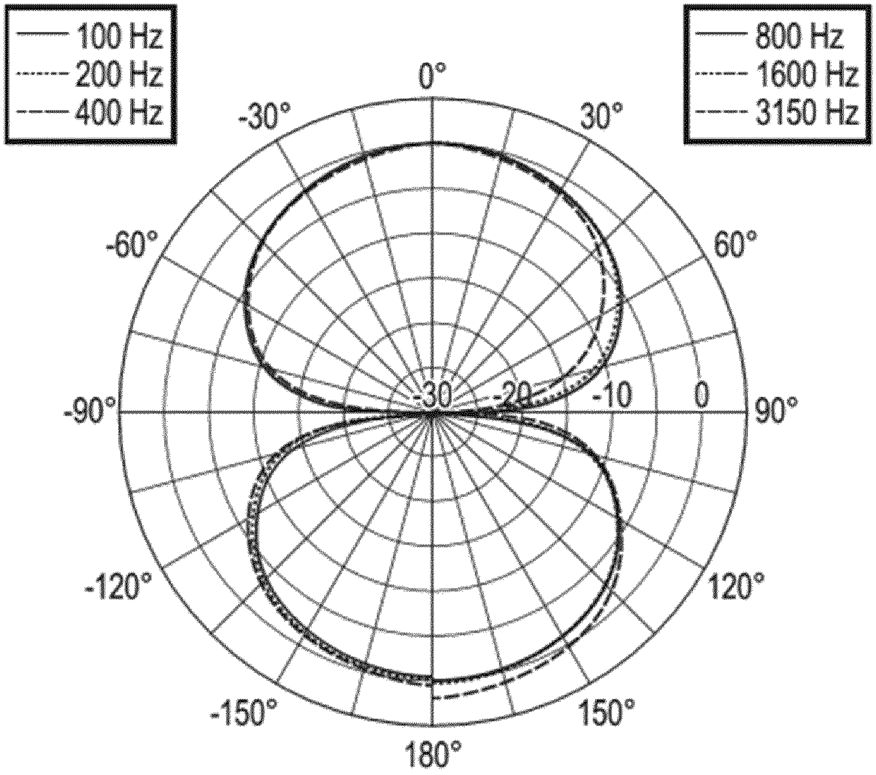
FIGS. 8-17 show experimental results, as described in the Annex (below).

In FIGS. 8*a-d*, the specific flow resistance of the cloth was chosen as follows:

FIG. 8*a* ("dipole" example): 0 Pas/m

Figure 8B:
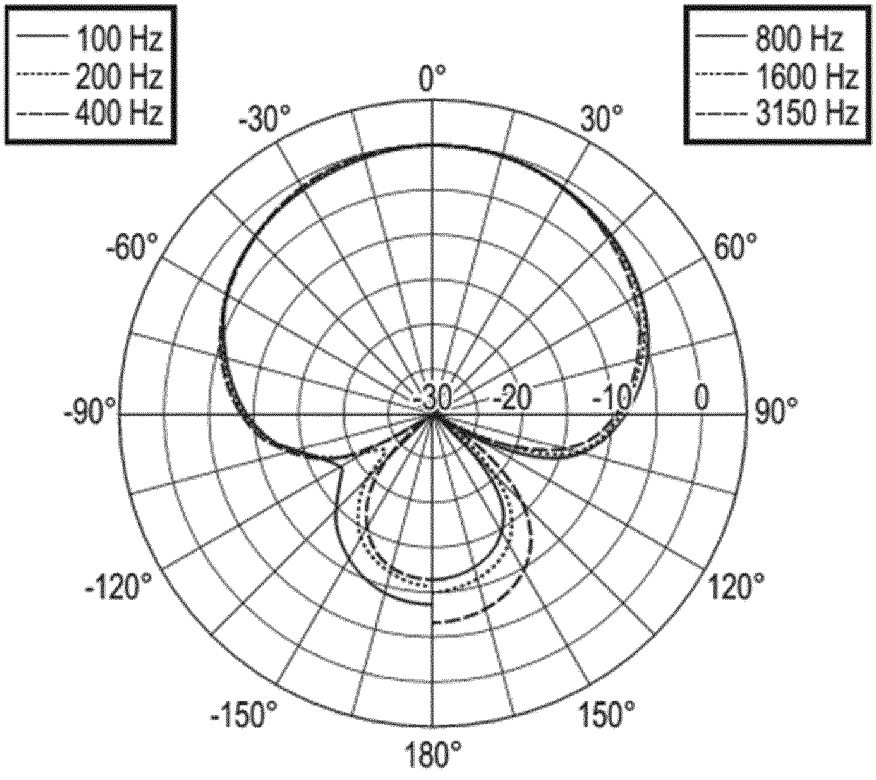

FIG. 8*b* ("hyper cardioid" example): 1000 Pa·s/m

Figure 8C:
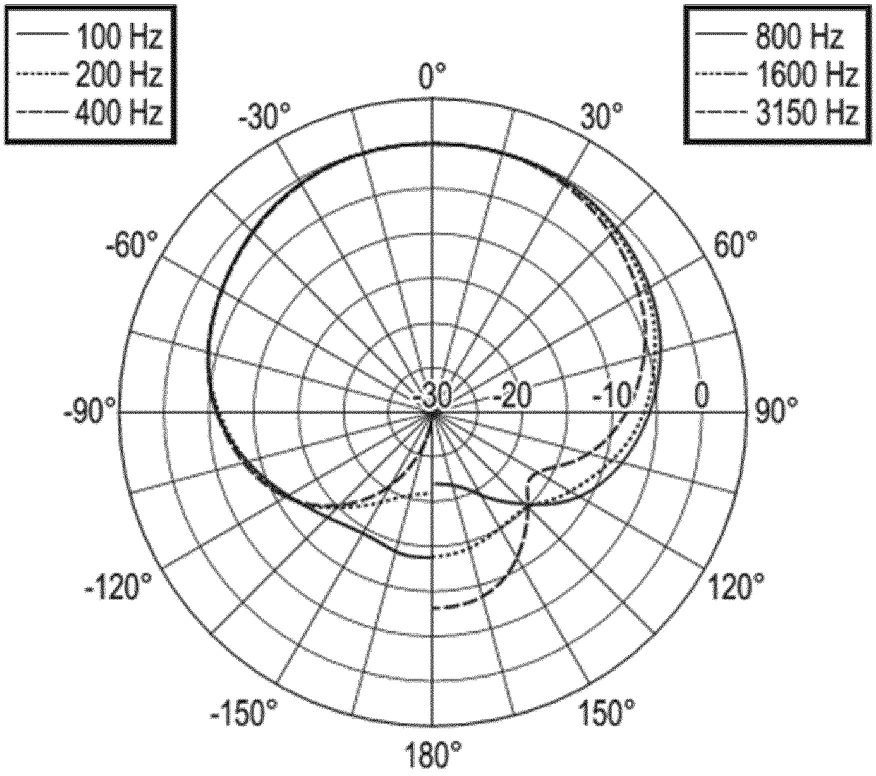

FIG. 8*c* ("cardioid" example): 1600 Pa·s/m

Figure 8D:
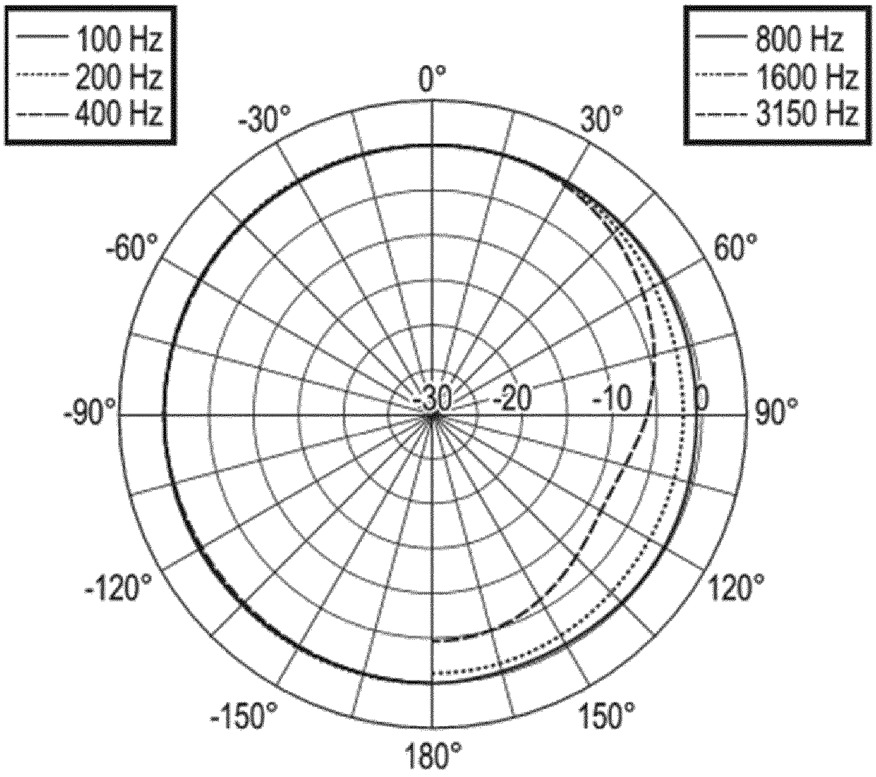

FIG. 8*d* ("closed box" example): 5000 Pa·s/m

For the plot of FIG. 8*a*, the specific airflow resistance (acoustic impedance) of the material is below the ideal range of specific airflow resistance for this particular loudspeaker configuration, meaning the directivity pattern follows the figure of 8 characteristic of a dipole over the whole frequency range. Here, the loudspeaker is effectively acting as a pure dipole with no monopole component as the acoustic impedance is almost negligibly small.

For the plot of FIG. 8*b*, the specific airflow resistance is increased to the range of 0.5-1 kPas/m, which is towards the lower end of the ideal range of specific airflow resistance for this particular loudspeaker configuration. This leads to a hyper cardioid directivity patterns as shown in FIG. 8*b*. Due to the increased acoustic impedance of the cloth the monopole component increases and the dipole component decreases. This directivity pattern may be desired for applications in which it is desired for attenuation at 120° or −120° to be maximized.

For the plot of FIG. 8*c*, the specific airflow resistance is increased to the range of 1-2 kPas/m, which is towards the upper end of the ideal range of specific airflow resistance for this particular loudspeaker configuration. This leads to a cardioid directivity patterns, with some hyper cardioid directivity towards higher frequencies, as shown in FIG. 8*c*. At 400 Hz the cardioid figure is ideal for certain applications, since at this frequency the monopole and dipole component are perfectly balanced, noting that the backward-facing lobe of the dipole is equally strong as the rearward radiation of the monopole but out of phase with respect to each other leading to perfect backwards cancellation.

FIGS. 8*b* and 8*c* show that both the hypercardioid and cardioid examples have, within a designated frequency band (here 100-3150 Hz), an SPL on a principal radiating axis that is at least 6 dB higher than the SPL at the same listening distance at 180° to the principal radiating axis, for substantially the entire designated frequency band The hyper cardioid and cardioid patterns of FIGS. 8*b* and 8*c* are both potentially useful, albeit for different purposes. Here it is noted that the cardioid patterns shown in FIG. 10*c* are generally more preferred, because it radiates the least to the 180° (backwards) direction. But for certain purposes, the hyper cardioid patterns shown in FIG. 10*b* may be more preferred, e.g. if another person (who did not want to hear sound produced by the loudspeaker) were at 120° or −120° with respect to the loudspeaker.

For the plot of FIG. 8*d* the specific airflow resistance is increased beyond 2 kPas/m, which is above the ideal range of specific airflow resistance for this particular loudspeaker configuration. Here, the directivity pattern approaches that of a monopole as shown in FIG. 8*d*. This is because the acoustic impedance of the cloth is so large that the airflow through the cloth becomes negligible and the support structure including the cloth effectively provides a closed box and the associated omnidirectional radiation.

Figure 9:
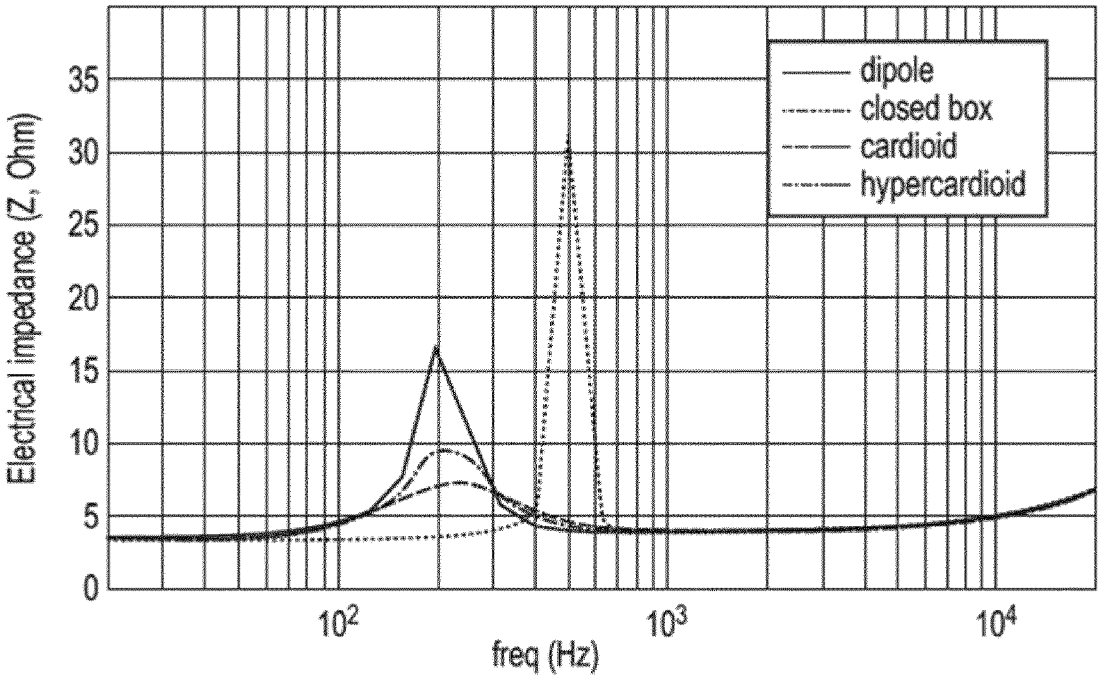

FIG. 9 shows the simulated electrical input impedance vs frequency corresponding to the specific airflow resistance value values discussed in relation to FIGS. 8*a-d*.

As shown here, in the dipole case (corresponding to FIG. 8*a*) the impedance peak corresponds to the loudspeaker free air resonance frequency fs. In the closed box case (corresponding to FIG. 8*d*) the resonance frequency fc is determined according the well-known formula for closed boxes, which is fc=fs*sqrt(Vas/Vb+1), also the total Q factor (Qts, defined above) of resonance shifts by the same factor sqrt(Vas/Vb+1), where Vas is the equivalent air compliance, and Vb is the box volume (which for our purposes corresponds to the internal volume enclosed by the supporting structure, referred to above as Vf). Vb is not trivial to determine as the textbook formula assumes an adiabatic volume whereas the volume inside the supporting structure is small with a large amount of isothermal surface of the magnet unit. The effective acoustic volume is larger than the geometrical volume mentioned above.

The higher resonance frequency and larger amplitude of resonance for the closed box case are not preferred.

In the hyper cardioid case (corresponding to FIG. 8*b*) and the cardioid case (corresponding to FIG. 8*c*), the resonance frequency does not shift up substantially compared to the dipole case, but the total Q factor (Qts) of the resonance is significantly decreased. This is due to the mechanical damping provided by the flow through the acoustic impedance covering the frame.

The cardioid and hyper cardioid cases have similar resonance frequency to the dipole (a good thing) and a lower resonance amplitude compared to dipole (also a good thing).

Figure 10:
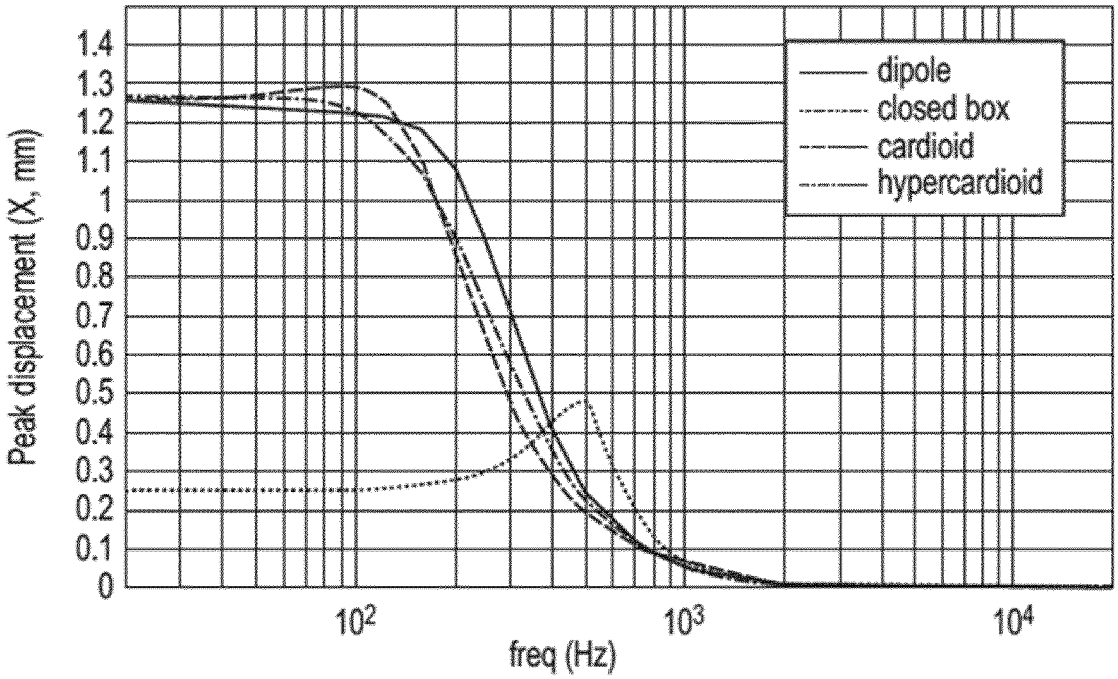

FIG. 10 shows the simulated peak displacement vs frequency for an input voltage of 2V rms corresponding to the specific airflow resistance value values discussed in relation to FIGS. 8*a-d*.

As can be seen from FIG. 10, only the closed box case stands out with the displacement being substantially lower and peaking higher in frequency, at the in-box resonance frequency fc.

Because the cardioid and hyper cardioid cases have larger peak displacement compared with closed box, a loudspeaker in such cases would need to allow for larger excursions, very much like free-air usage (dipole case).

In near-field applications where an ear of a user located at a listening position that is as close as 10 cm to the first radiating surface of the loudspeaker (vs >1 m for far-field applications), the required loudspeaker sensitivity may be substantially smaller, e.g. 90 dB/1 W/1 m (far-field) vs. 90 dB/1 W/10 cm (near-field).

The present inventors have observed that this opens up the possibility of equip the loudspeaker with a much weaker magnet unit as compared to a loudspeaker designed for far-field listening.

Figure 11A:
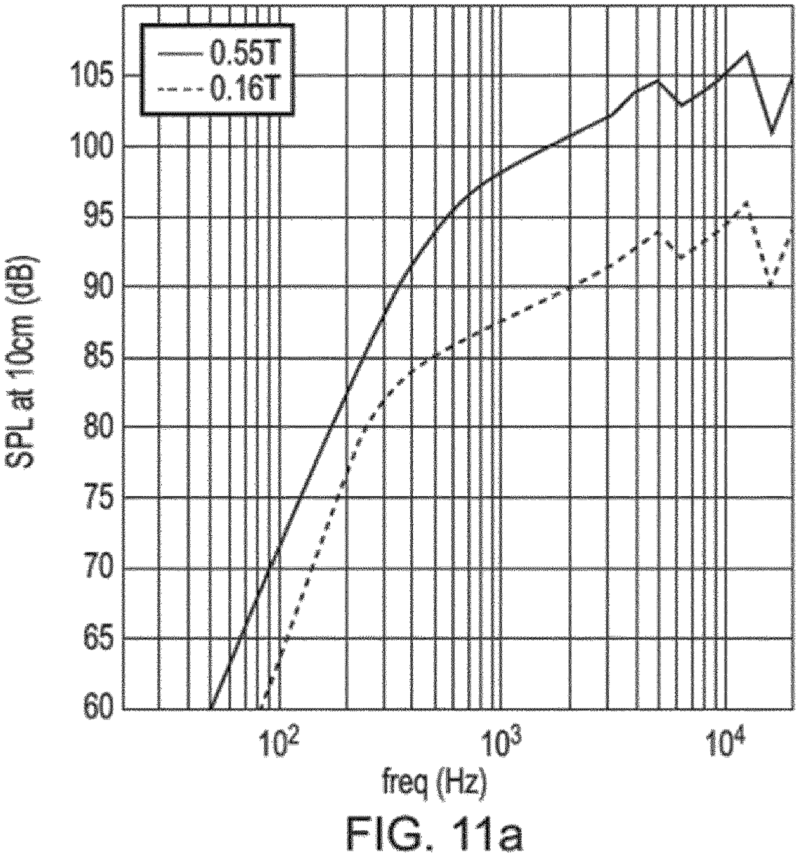
Figure 11B:
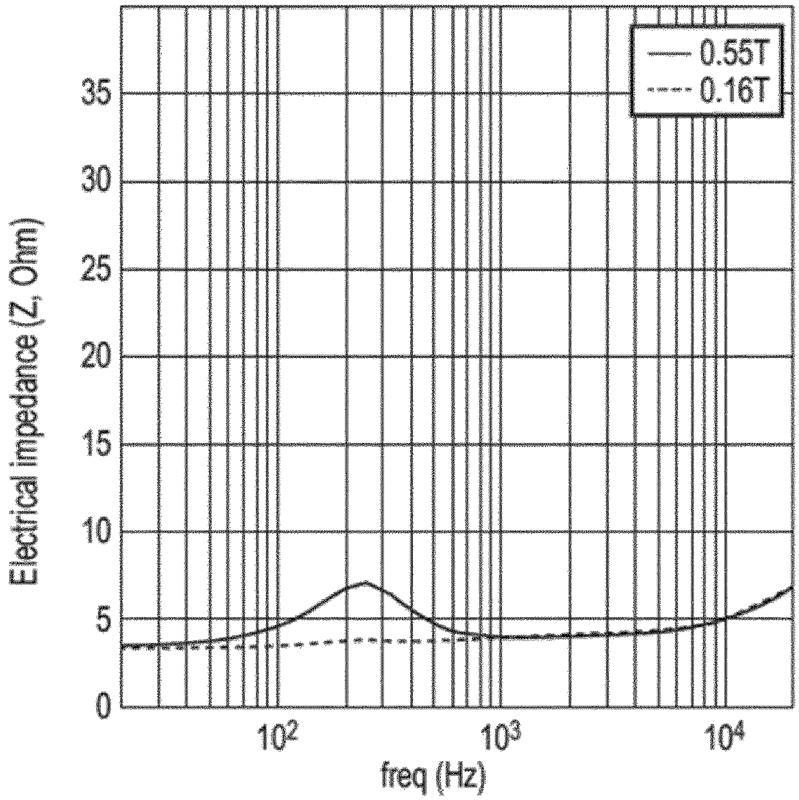

FIG. 11*a* shows the simulated frequency response (SPL) for a listening distance of 10 cm and FIG. 11*b* shows the simulated electrical input impedance with the frame covered with a cloth with specific airflow resistance of 1.8 kPas/m, with two different magnetic flux densities in the airgap: The solid curve corresponds to 0.55 T (referred to herein as a "strong" magnet unit), the dashed curve to a decreased magnetic flux density of only 0.16 T (referred to herein as a "weak" magnet unit). As expected, reducing flux density reduces SPL, particularly at higher frequencies (FIG. 11*a*). But reducing flux density also damps the impedance peak at resonance (FIG. 11*b*).

In more detail, for the weak magnet unit, the sensitivity for mid and high frequencies decrease about 20 dB but at around 200-300 Hz the loss is only 10 dB, due to the decreased electrical Q-factor. This leads to a more balanced frequency response and a very smooth electrical input impedance curve.

Figure 12:
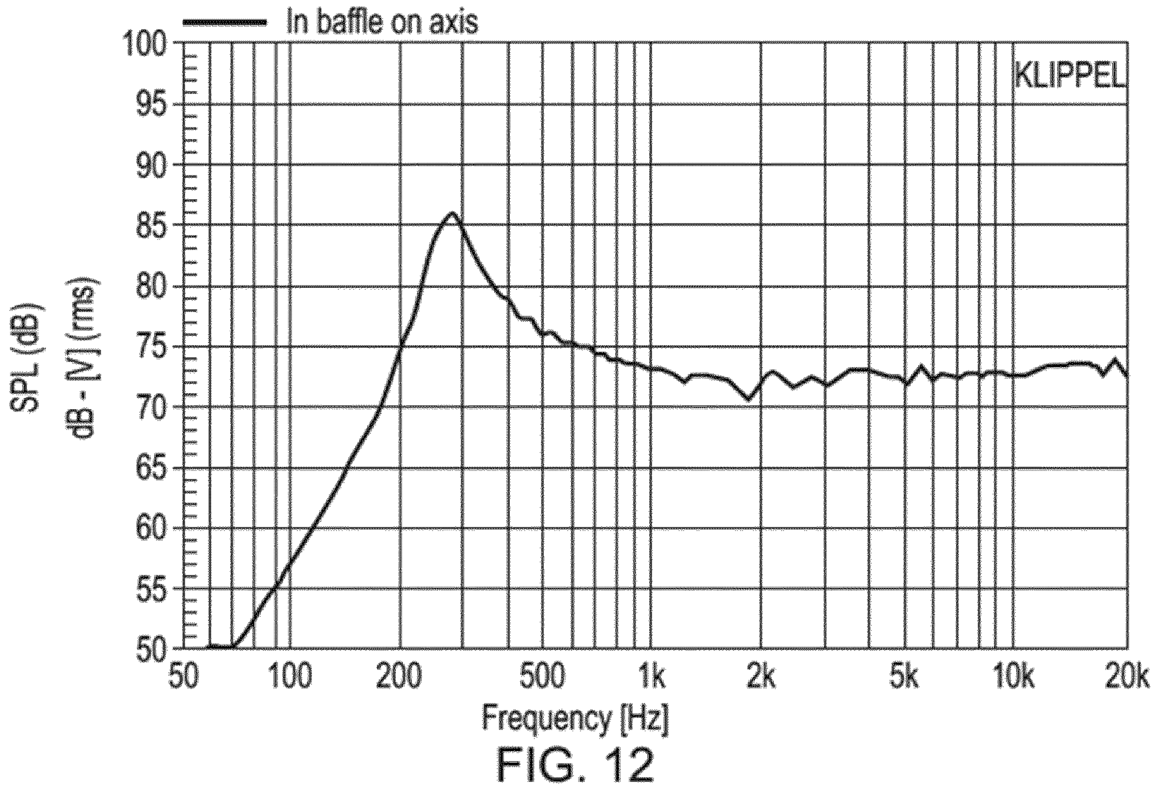

FIGS. 12-17 show (non-simulated) measurements from experimental work FIG. 12 shows, for a loudspeaker including a weak magnet unit as defined in relation to FIG. 11, a measurement carried out at a distance of 1 m with the loudspeaker mounted in an infinite baffle at 2V input voltage with the frame of the loudspeaker not covered with cloth. As can be seen, the weak magnet unit provides almost no back EMF leading to a very high electrical Q-factor and uncontrolled behavior at resonance frequency. Thus a huge peak can be seen at resonance (bad) and a low SPL at higher frequencies (also bad). Such a loudspeaker would be deemed unusable as the sound would be very boomy.

Figure 13:
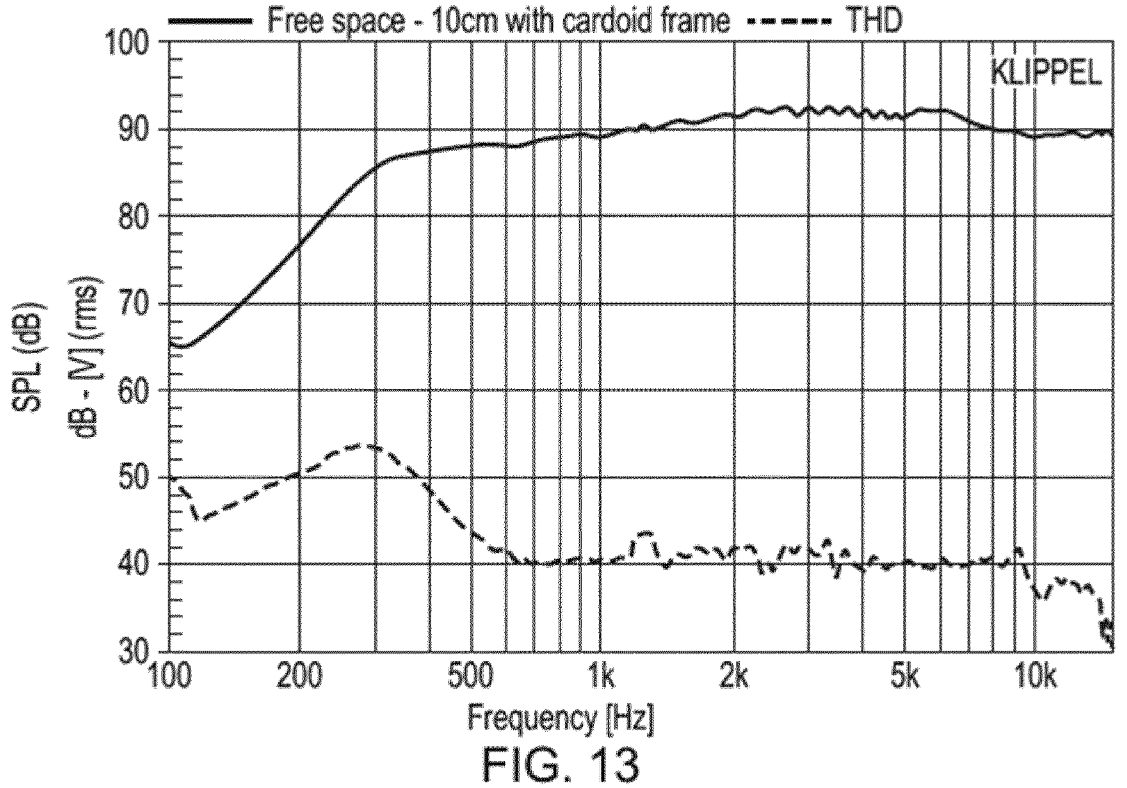

FIG. 13 shows the same loudspeaker (as described above in relation to FIG. 12) measured at 2V input voltage at a listening distance of 10 cm in free space where the frame is covered with a cloth having a specific airflow resistance of 1600 Pas/m (cardioid case). Here, the resulting frequency response is very smooth and total harmonic distortion (THD) is at remarkably low at −50 dB over the whole mid-high frequency band and only increases moderately towards low frequencies. The flow resistance is tuned to decrease the mechanical Q-factor and have it dominate over the back-emf effectively leading to a mainly mechanically damped loudspeaker and a smooth frequency response.

Thus, the combination of a weak magnet system combined with the use of the cloth having a specific airflow resistance of 1600 Pas/m (cardioid case) leads to a loudspeaker that is very useful at close range (though such a loudspeaker would not be particularly useful in far field).

The results for a stronger magnet unit (not shown) would be worse than those shown in FIG. 13 because the frequency response would be unbalanced. Around resonance frequency the stronger back-EMF would lead to additional electrical damping and decrease the output while at high frequencies the stronger motor would increase the sensitivity. So you would end up having too little at 300 Hz and too much at 3 kHz (and above).

Figure 14:
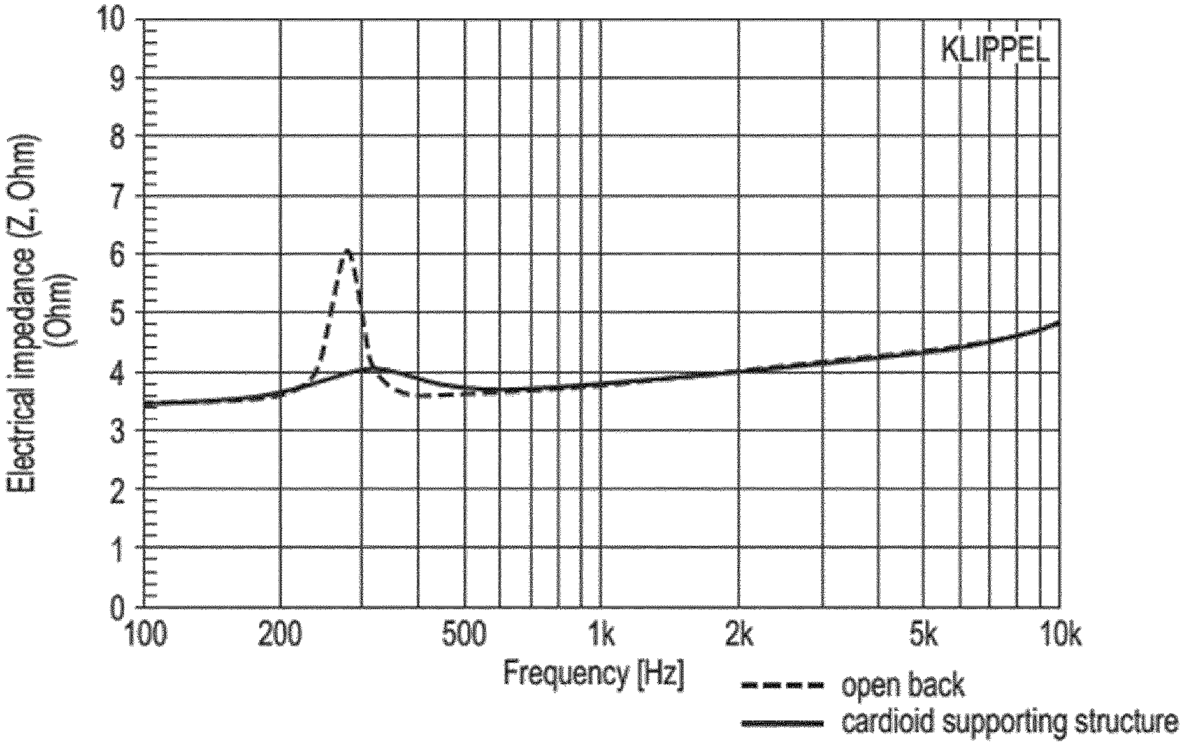

FIG. 14 shows the measured electrical impedance electrical input impedance vs frequency corresponding to the loudspeaker discussed in relation to FIG. 12 ("open back") and the loudspeaker discussed in relation to FIG. 13 ("with cardioid frame").

FIG. 14 illustrates that, due to the mechanical damping the electrical impedance curve of the loudspeaker is effectively flat through use of the cardioid supporting structure ("cardioid supporting structure") even at resonance frequency making it very easy to drive by any amplifier and even use passive filter components, compared with the case where the cardioid supporting structure is open ("open back"). Almost exclusive mechanical damping is not uncommon for small loudspeakers by usage of Ferrofluid, but the viscosity of (and hence the resulting damping provided by) Ferrofluid has a strong temperature dependence, whereas the flow resistance provided by the cardioid supporting structure is temperature independent and does not age.

Now it can easily be appreciated, that the mechanical Q-factor is an indicator for the suitability of the chosen cloth material for the given loudspeaker and open frame area size: If the flow through the cloth (=regions of porous material) is chosen appropriately, the mechanical Q-factor is low leading to strong dampening of the loudspeaker resonance and desired directivity pattern, whilst shifting the resonance frequency moderately upwards due to the additional monopole component.

Figure 15A:
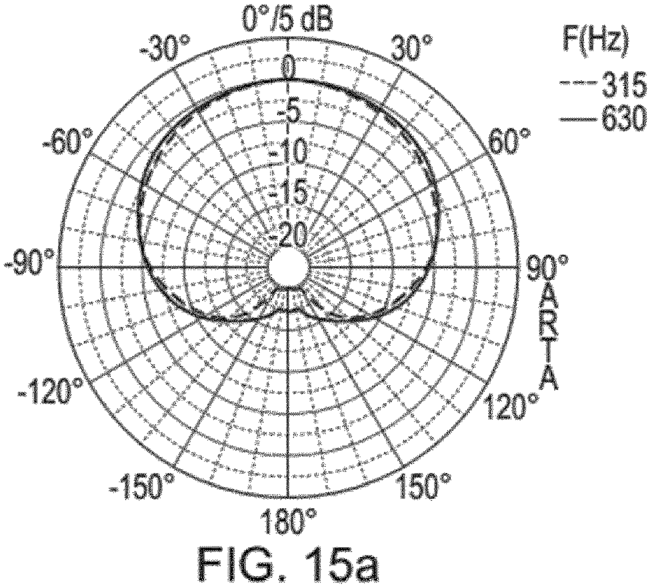
Figure 15B:
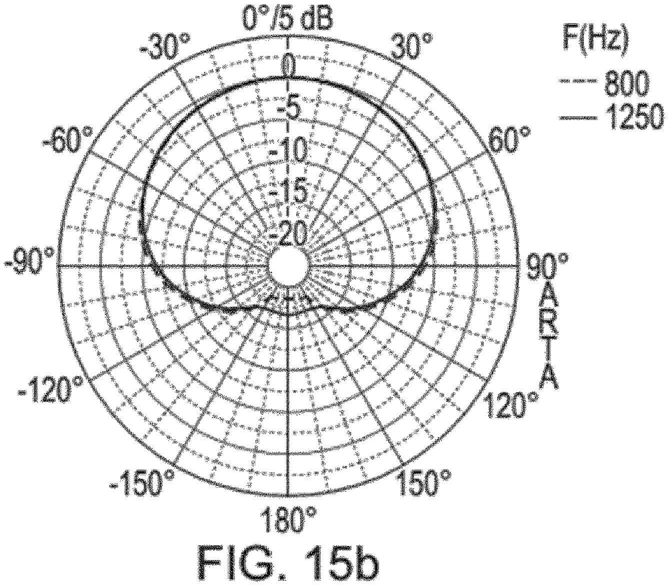
Figure 15C:
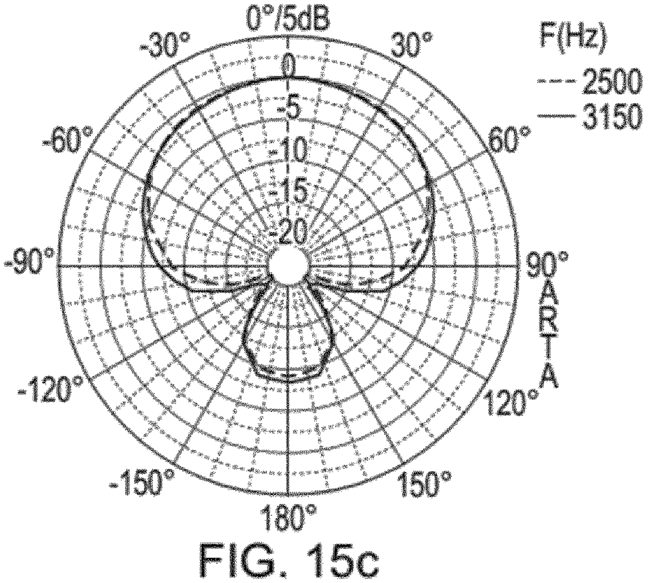

FIGS. 15*a*-*c* shows the measured the far-field directivity (listening distance=1 m) of the loudspeaker already described in relation to FIG. 13 ("cardioid supporting structure") at various frequencies (two frequencies per plot).

As shown by FIGS. 15*a*-*b*, in the frequency range from 300 Hz-1250 Hz (FIGS. 15*a*-*b*) the radiation pattern follows the cardioid characteristic. Towards the upper end of the relevant frequency band at 3150 Hz (FIG. 15*c*), the directivity shows a more hyper cardioid directivity pattern, as expected by simulation. For higher frequencies the directivity of the dome takes over as it becomes large compared to the wavelength and the power spectral density in music and speech decreases anyway. Hence, acoustic contrast from off-axis radiation becomes less of a concern.

FIG. 16 shows the far-field directivity index of the first loudspeaker 101 shown in FIGS. 3*a*-*c*, with a "strong" magnet system of 0.55 T with respect to frequency, at a listening distance (distance to source) of 1 meter with ⅓$^{rd}$ octave smoothing.

As shown here, the directivity index in the designated frequency band of interest, here 300 Hz to 3 kHz, is comfortably above 4 dB for substantially the entire designated frequency band.

In general, it is preferred for there to be maximum backward damping (cardioid characteristic) as shown in FIGS. 15*a*-*b*, rather than a hyper-cardioid (towards the upper end of the frequency band, as shown in FIG. 15*c*) or a dipole characteristic (as shown in FIG. 8*a*). As demonstrated by FIGS. 15-16, if one does not want to have a back-lobe and the diaphragm size is small compared to the wavelength, a directivity index of ~4.8 dB is believed to be about as good as can be achieved.

FIG. 17 shows the far-field directivity index of the first loudspeaker 101 shown in FIG. 7 (i.e. the fourth loudspeaker 401 in which the frame 434 and the magnet unit 422 are combined), at a listening distance (distance to source) of 1 meter. This time, the directivity index is shown at the "standard" centre frequencies within the designated frequency band of interest, here 300 Hz to 3 kHz, for ⅓$^{rd}$ octave bands (i.e. at 315 Hz, 400 Hz, 500 Hz, 630 Hz, 800 Hz, 1 kHz, 1.25 kHz, 1.6 kHz, 2 kHz, and 2.5 kHz).

The flux density for the fourth loudspeaker 401 used for the experimental results shown in FIG. 17 was 0.12 T which is much lower than for the first loudspeaker 101 used to obtain the experimental results shown in FIG. 16, though this is only mentioned for completeness, as the flux density is not believed to have a significant influence on directivity.

Comparing FIG. 16 and FIG. 17 illustrates some trade-offs resulting from using a more compact loudspeaker such as the fourth loudspeaker 401 of FIG. 7. In particular, FIG. 17 vs FIG. 16 shows that the directivity index for the more compact fourth loudspeaker 401 of FIG. 7 (10 $cm^3$) is more directional for higher frequencies compared with the larger first loudspeaker 101 shown in FIGS. 3*a-c* (26 $cm^3$). Further experimental work by the inventor (the results of which are not shown here) also show that the more compact fourth loudspeaker 401 of FIG. 7 has substantially less output at low frequencies compared with the larger first loudspeaker 101 shown in FIGS. 3*a-c*, meaning that the more compact fourth loudspeaker 401 of FIG. 7 is more suitable for use in combination with a mid-bass loudspeaker, whereas the larger first loudspeaker 101 shown in FIGS. 3*a-c* is more suitable for use in combination with a subwoofer.

The invention claimed is:

1. A mid-high frequency loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure comprises a self-supporting porous shell which encloses a volume configured to receive sound produced by the second radiating surface, wherein at least part of the self-supporting porous shell is provided by at least one self-supporting portion of porous material having a specific airflow resistance in the range 500-5000 Pa·s/m so as to allow sound produced by the second radiating surface to exit the volume enclosed by the shell;

wherein the mid-high frequency loudspeaker has, within a frequency band of 500 Hz-2 kHz, a sound pressure level (SPL) measured on a principal radiating axis that is at least 6 dB higher than the SPL measured at the same listening distance at 180° to the principal radiating axis, for substantially the entire frequency band of 500 Hz-2 kHz.

2. The mid-high frequency loudspeaker according to claim 1, wherein the/each self-supporting portion of porous material has a specific airflow resistance in the range 1500-3000 Pa·s/m.

3. The mid-high frequency loudspeaker according to claim 1, wherein the self-supporting porous shell is formed entirely of a single self-supporting portion of porous material.

4. The mid-high frequency loudspeaker according to claim 1, wherein the/each self-supporting portion of porous material is formed from paper.

5. The mid-high frequency loudspeaker according to claim 4, wherein the paper has a density in the range 0.5 $g/cm^3$-1 $g/cm^3$ and a thickness in the range 0.3 mm-2 mm.

6. The mid-high frequency loudspeaker according to claim 1, wherein the/each self-supporting portion of porous material is formed from a felted fabric.

7. The mid-high frequency loudspeaker according to claim 1, wherein the at least one self-supporting portion of porous material includes a portion of porous material which includes one or more corrugations.

8. The mid-high frequency loudspeaker according to claim 7, wherein the one or more corrugations take the form of a plurality of folds or dimples.

9. The mid-high frequency loudspeaker according to claim 1, wherein the loudspeaker support structure comprises a frame from which the diaphragm is suspended, and the self-supporting porous shell, wherein the self-supporting porous shell is attached to the frame.

10. The mid-high frequency loudspeaker according to claim 1, wherein the diaphragm is suspended from the self-supporting porous shell.

11. The mid-high frequency loudspeaker according to claim 1, wherein the volume enclosed by the self-supporting porous shell is 100 $cm^3$ or less.

12. A seat assembly that includes:

a headrest;

one or more mid-high frequency loudspeakers, the one or more mid-high frequency loudspeakers being mounted in the headrest of the seat assembly, wherein the/each mid-high frequency loudspeaker includes:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure comprises a self-supporting porous shell which encloses a volume configured to receive sound produced by the second radiating surface, wherein at least part of the self-supporting porous shell is provided by at least one self-supporting portion of porous material having a specific airflow resistance in the range 500-5000 Pa·s/m so as to allow sound produced by the second radiating surface to exit the volume enclosed by the shell;

wherein the/each mid-high frequency loudspeaker has, within a frequency band of 500 Hz-2 kHz, a sound pressure level (SPL) measured on a principal radiating axis that is at least 6 dB higher than the SPL measured at the same listening distance at 180° to the principal radiating axis, for substantially the entire frequency band of 500 Hz-2 kHz.

13. The seat assembly according to claim 12, wherein the one or more mid-high frequency loudspeakers include:

a first mid-high frequency loudspeaker, wherein the first mid-high frequency loudspeaker is located within the headrest for use with a first ear of a user located at a listening position that 30 cm or less from the first radiating surface of the diaphragm of the first mid-high frequency loudspeaker;

a second mid-high frequency loudspeaker, wherein the second mid-high frequency loudspeaker is located within the headrest for use with a second ear of a user located at a listening position that is 30 cm or less from the first radiating surface of the diaphragm of the second mid-high frequency loudspeaker;

wherein the seat assembly is configured to position a user who is sat down in a seat portion of the seat assembly such that the first ear of the user is located at the first listening position, and such that the second ear of the user is located at the second listening position.

* * * * *